(12) United States Patent
Schechter

(10) Patent No.: US 7,607,503 B1
(45) Date of Patent: Oct. 27, 2009

(54) OPERATING A VEHICLE WITH HIGH FUEL EFFICIENCY

(76) Inventor: Michael Moses Schechter, 31110 Country Ridge Cir., Farmington Hills, MI (US) 48331

( * ) Notice: Subject to any disclaimer, the term of this patent is extended or adjusted under 35 U.S.C. 154(b) by 629 days.

(21) Appl. No.: 11/366,631

(22) Filed: Mar. 3, 2006

(51) Int. Cl.
*B60L 11/16* (2006.01)
*B62M 1/10* (2006.01)
*F02B 19/00* (2006.01)

(52) U.S. Cl. .................. 180/165; 123/255; 123/258

(58) Field of Classification Search .................. 180/165; 123/255, 258
See application file for complete search history.

(56) References Cited

U.S. PATENT DOCUMENTS

| | | | | |
|---|---|---|---|---|
| 3,896,774 A | * | 7/1975 | Siewert | 123/58.8 |
| 3,924,576 A | * | 12/1975 | Siewert | 123/1 R |
| 3,945,345 A | | 3/1976 | Ishikawa | |
| 4,565,167 A | * | 1/1986 | Bryant | 123/70 R |
| 5,529,549 A | * | 6/1996 | Moyer | 477/189 |
| 6,223,846 B1 | | 5/2001 | Schechter | |
| 6,986,342 B2 | * | 1/2006 | Thomas | 123/536 |
| 7,028,648 B2 | * | 4/2006 | Hasegawa et al. | 123/58.8 |
| 7,121,236 B2 | * | 10/2006 | Scuderi et al. | 123/70 R |
| 7,231,998 B1 | * | 6/2007 | Schechter | 180/165 |

OTHER PUBLICATIONS

Michael M. Schechter and Michael B. Levin "Camless Engine", SAE Paper 960581, Feb. 1996.

* cited by examiner

*Primary Examiner*—Christopher P Ellis
*Assistant Examiner*—John R Olszewski

(57) ABSTRACT

High vehicle fuel efficiency is achieved by reducing fuel consumption during driving both in the city and on the highway. During driving in the city, the system accumulates the energy derived from vehicle motion during braking, and uses it to assist in vehicle propulsion at a later time. The energy can be stored either in a compressed-air reservoir or in an electric battery. During cruising on the highway, the engine operates in a two-stage gas-expansion cycle. The engine has primary and secondary cylinders. Only primary cylinders operate in internal-combustion mode. After expansion in primary cylinders, combustion gas is subjected to a second stage of expansion in secondary cylinders. This substantially improves the engine efficiency. Whenever heavy engine load is needed, all cylinders operate in internal-combustion mode.

16 Claims, 26 Drawing Sheets

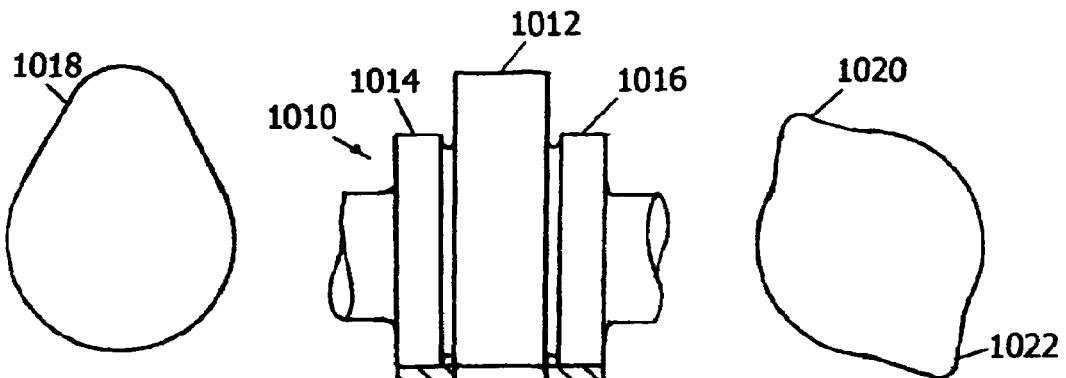
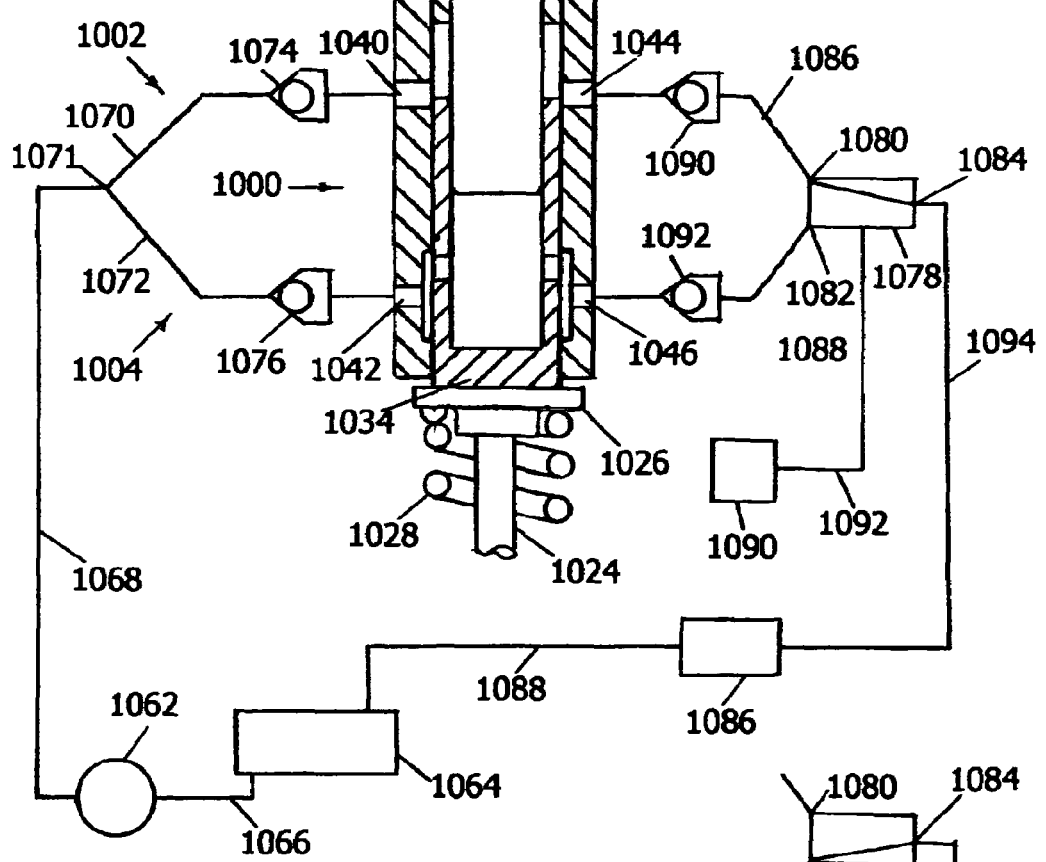
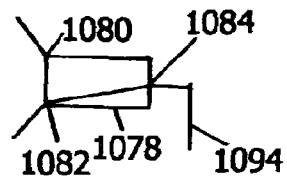

OPERATING A VEHICLE WITH HIGH FUEL EFFICIENCY

CROSS-REFERENCE TO RELATED APPLICATIONS application Ser. No. 10/822,448. Filing Date: Apr. 9, 2004

FEDERALLY SPONSORED RESEARCH

Not applicable

SEQUENCE LISTING OR PROGRAM

Not applicable

FIELD OF THE INVENTION

The present invention relates to vehicle systems capable to accumulate energy derived from vehicle motion during its deceleration or obtained from operation of the vehicle engine, and use the accumulated energy to assist in vehicle acceleration and propulsion at a later time. It also relates to systems that extract additional energy from the engine exhaust gas, and use that energy to reduce the vehicle fuel consumption.

BACKGROUND OF THE INVENTION

Most automotive vehicles are propelled by internal combustion-engines consuming hydrocarbon fuels. Burning these fuels produces exhaust gas containing harmful air pollutants, such as carbon monoxide, nitrogen oxides, and unburned hydrocarbons. It also contains substantial amount of carbon dioxide which, if produced in large quantities worldwide over long period of time, can contribute to an undesirable increase in average global temperature. Concern for clean air and a desire to prevent adverse consequences of man-made global warming dictate a need to substantially improve fuel efficiency of automotive vehicles.

By itself, the internal-combustion engine is a reasonably efficient machine. Unfortunately, the driving pattern of most automotive vehicles is such that a substantial fraction of energy produced by their engines is wasted. Typically, the driving pattern involves frequent accelerations, each followed by a deceleration. Each acceleration involves a significant increase in fuel consumption needed to produce the additional energy necessary to increase the vehicle speed. Then, during a subsequent deceleration, this added energy is absorbed by vehicle brakes and dissipated as heat.

Attempts to overcome such waste of energy led to development of systems, in which the energy of vehicle motion is not dissipated during braking but converted into a form in which it can be temporarily stored and, then, used again to accelerate the vehicle at a later time. Typically, such system includes an internal-combustion engine, an energy storage, and a second machine absorbing the energy of vehicle motion and placing it into the storage during braking. During subsequent acceleration, the second machine receives energy, from the energy storage, and uses it to supplement the work of the internal-combustion engine. Such systems are known as hybrid vehicle systems. An electric hybrid includes an electric generator/motor as a second machine and an electric battery for energy storage. A fluid-power hybrid includes a pump/motor and a pressurized-fluid accumulator. A flywheel hybrid includes a variable-ratio transmission and a flywheel. Another type of a hybrid, an air hybrid, does not require a second machine to absorb the energy of vehicle motion. In the air hybrid, the vehicle engine absorbs the braking energy of the vehicle and puts it in storage in the form of compressed air. Later, the compressed air is used to assist the engine in propelling the vehicle.

A disadvantage, common to all of the above mentioned hybrids, is the fact that the improvement in fuel consumption, they bring about, takes place only during the stop-and-go driving conditions, typical for in-city driving. During highway driving, when the vehicle is cruising on the road with approximately constant speed, a hybrid system offers practically no fuel economy advantage. It is clear that it is highly desirable to have a vehicle system that offers a substantial improvement in fuel consumption during cruising with approximately constant speed on a highway, while retaining all the fuel economy advantages of a hybrid system during stop-and-go driving in a city. Such a system is the subject of the present invention.

PRIOR ART

The concept of saving kinetic energy of a vehicle during braking, storing it as compressed air and, later, using it to assist in vehicle propulsion has been proposed before. A U.S. Pat. No. 6,223,846B to Schechter describes one such concept. A review of the differences between the present invention and its advantages over the above patent is given below.

(1) The above patent describes an air-hybrid vehicle, in which, during braking, the engine operates as a compressor receiving atmospheric air, compressing it, and transferring the compressed air into an air reservoir for storage. Later, during acceleration, the engine uses the previously stored compressed air to help in propelling the vehicle by operating as an internal-combustion engine assisted by compressed air or operating as an air motor. Such system can improve the vehicle fuel economy, but the scope of this improvement is limited by the fact that the improvement takes place mostly during periods of braking and acceleration, and there is no improvement in fuel economy when the vehicle is cruising with approximately constant speed. Because of that, the advantage of hybrid operation is mostly limited to in-city driving, when braking and acceleration take place often. On the highway, when braking is rare, the hybrid system offers practically no fuel economy improvement.

In contrast to the above patent, the present invention contemplates a combination of the hybrid-vehicle principle, which saves fuel during braking and acceleration, with a two-stage gas-expansion principle that can save fuel during other periods of vehicle operation, especially during highway driving. The two-stage gas-expansion concept improves the efficiency of the engine thermodynamic cycle by increasing the amount of useful energy extracted from the engine combustion gas. Combining the hybrid-vehicle and the two-stage gas-expansion concepts creates a vehicle system with substantially reduced fuel consumption during all modes of vehicle operation. A significantly better fuel consumption can be achieved not just during stop-and-go driving conditions in a city, but also during cruising on a highway. Therefore the method and the system of the present invention offer an opportunity for an overall improvement in fuel economy substantially exceeding the improvement achievable in conventional hybrid vehicles. Reduction in fuel consumption leads to reduced emission of harmful exhaust pollutants. The above patent does not contemplate such combination of two systems and hence offers smaller fuel economy advantage.

(2) The present invention contemplates a concept of an engine that can operate with a two-stage combustion-gas expansion. An internal-combustion engine, capable of two-stage gas expansion, can operate either as a conventional engine or in a two-stage gas-expansion mode and it can be switched from one mode to another. When operating in the two-stage gas-expansion mode, some of the engine cylinders, the primary cylinders, perform a conventional four-stroke internal-combustion cycle. Other engine cylinders, the secondary cylinders, perform a two-stroke gas-expansion cycle. There is no pressure blowdown in the primary cylinders at the end of the expansion stroke. Instead, the still pressurized combustion gas is transferred from the primary cylinders into the secondary cylinders. There, it is subjected to a second stage of expansion and exhausted into the exhaust system. In this way, the combustion gas is subjected to expansion that is substantially greater than any gas expansion that can be performed in a single cylinder. Subjecting the gas to a second stage of expansion extracts an additional amount of useful energy. This increases the efficiency of the engine and reduces its fuel consumption. When driving an automobile, the two-stage expansion mode can be used for light and medium loads that prevail during cruising with approximately constant speed, both in the city and on the highway. It can also be used for mild acceleration. For heavy acceleration or for uphill driving, when heavy engine load is required, a switch to the conventional internal-combustion mode is performed. The above patent does not include the concept of an engine operating with two-stage gas expansion.

(3) The above patent describes a compression-braking process, in which, in each engine cylinder during each volume-increasing stroke, a charge of atmospheric air is received into the cylinder chamber and, during a subsequent volume-decreasing stroke, the air charge is compressed and displaced into the air reservoir. The braking torque produced by such process is determined by work of air compression performed by the engine pistons. The maximum work of compression that can be performed in each engine cylinder depends on the engine compression ratio. The compression ratio is a ratio of a maximum cylinder volume to its minimum volume. Unfortunately, the compression ratio of an internal-combustion engine is restricted to a certain limit, beyond which serious operational problems, such as engine knock, may be encountered. This limits the magnitude of the peak braking torque that can be achieved in compression braking and, occasionally, requires the vehicle friction brakes to supplement the compression braking. Also, since the density of the compressed air is relatively low, the required volume of the air reservoir is substantial.

In contrast to the above, the present invention describes a compression-braking process, in which some of the engine cylinders receive atmospheric air, compress it, and displace it into other engine cylinders that receive the compressed air, subject it to additional compression, and displace it into an air reservoir. Using two successive stages of compression offers significant advantages over a single-stage compression used in a compression-braking process described in the above patent. These are a much smaller size of the required air reservoir and a significantly greater peak braking torque. The reduction in the required size of the air reservoir is due to the fact that air is compressed to a very high density and, in addition, each unit of its mass contains a much greater amount of energy. The increase in peak braking torque is due to the fact that, at a comparable compression ratio, the work-per-cycle performed during the second stage of compression is much greater than the work-per-cycle performed during the first stage. This means that an engine using two stages of compression can produce greater torque than an engine using only one stage of compression. This eliminates the need for friction brakes assistance.

Ability to absorb and store kinetic energy of the vehicle in a very small air reservoir is a distinct advantage of the method and the system of the present invention over the method and the system of U.S. Pat. No. 6,223,846B1. Thanks to the two-stage compression, the overall compression ratio of the air pumped into the air reservoir is equal to the compression ratio in the cylinder performing the first compression multiplied by the compression ratio in the cylinder performing the second compression, thus greatly increasing the density of that air. In addition, the energy content in each gram of that air is much higher than in case of single-stage compression, thus reducing the overall mass of air needed to absorb the kinetic energy of the vehicle. This permits to achieve very high air pressures and reduce the required volume of the air reservoir by as much as an order of magnitude, in comparison to an air reservoir required in a single-stage-compression system, such as described in U.S. Pat. No. 6,223,846B1. A much smaller air reservoir also weighs less, which contributes to a reduction in overall vehicle weight. A lighter vehicle consumes less fuel, which contributes to better fuel economy and a reduction in harmful exhaust emissions.

Reduction in the size of the air reservoir offers a significant advantage in packaging the system, since it enables packaging it into any vehicle—even a very small one. It also permits to successfully use the method and the system of the present invention in heavy trucks and buses, where the amount of kinetic energy that needs to be absorbed during braking is very large, without the need for excessively large air reservoir. On the other hand, in small vehicles, such as automobiles used for personal transportation, the required size of the air reservoir becomes so small that it can be integrated with the engine by becoming an integral part of the engine manifolds system. This eliminates the air reservoir as a stand-alone component of the vehicle and reduces the cost and complexity of the vehicle assembly.

Another distinct advantage of the method and the system of the present invention is its ability to produce a peak compression-braking torque of a much greater magnitude than it is possible to achieve in a system using only a single-stage compression. This too is an especially important advantage in heavy trucks and buses, where, due to the huge vehicle mass, the required braking torque is very high.

(3) The present invention contemplates a method for substantial reduction in harmful nitrogen oxide emission in the vehicle engine. The method involves retention of a significant amount of combustion gas in the cylinder, at the end of one engine cycle, and mixing it with pre-cooled intake air at the beginning of the next cycle. To reduce nitrogen oxide emission, a certain amount of exhaust gas is added to the intake air in most internal-combustion engines. This reduces the peak combustion temperature and thus restrains the nitrogen oxide formation. The more exhaust gas is added, the less nitrogen oxide is produced. In most cases, a portion of the exhaust gas is diverted from the exhaust system, cooled in a special exhaust gas cooler, and recirculated back into the engine cylinders. Low pressure of the cooled exhaust gas limits the amount of gas that can be recirculated.

A much simpler concept involves retaining a portion of the combustion gas in the cylinder by closing the exhaust valve early. Unfortunately, in this case, it is the high temperature of the retained combustion gas that limits the amount of gas that can be retained. The present invention offers a way to resolve this problem by cooling the intake air. This method is especially useful when used in conjunction with air-hybrid operation that involves compression of air and its subsequent expansion. Cooling the air while it is still at high pressure and temperature and, then, expanding it in the engine cylinders is an effective method of reducing its heat content. It is especially effective in a system that uses two-stage compression and two-stage expansion. Such system offers an opportunity for a very substantial reduction in the intake air heat content. Mixing the retained hot combustion gas with intake air that has substantially reduced heat content avoids excessively high temperature of the air and combustion gas mixture. The temperature of this mixture can be controlled by controlling the amount of heat taken out of the air. In this way, a substantial amount of combustion gas can be retained and a significant reduction in nitrogen oxide emission can be achieved.

The above patent does not contemplate such method of nitrogen oxide emission control.

(4) In its second alternative embodiment, the present invention contemplates a method and a system that combines a two-stage gas-expansion system with an electric-hybrid system. A control system controls the operation of and assures cooperation between the two systems in accordance with a control program incorporated into its software. The electric hybrid saves fuel during city driving, and the two-stage gas-expansion system saves fuel during driving on a highway. The above patent does not include such method.

(5) The present invention contemplates a method and a system for a camshaft-driven two-mode engine valve operation suitable for use in the two-stage gas-expansion operation. It is used to operate the valves in secondary cylinders. The system and the method of operation are capable to operate an engine valve in two different modes. In the first mode, the engine valve opens once every camshaft revolution for a relatively long period of time—usually slightly longer than the duration of the engine piston stroke. This mode of valve operation is used during the conventional four-stroke internal-combustion mode of the engine operation. In the second mode, the engine valve opens twice, during each camshaft revolution. This mode of valve operation is used during the two-stage gas-expansion mode of the engine operation. The above patent does not contemplate such valve operation.

A U.S. Pat. No. 5,529,549 to Moyer describes another such concept. When compared to the present invention, Moyer's patent exhibits a number of differences and deficiencies that are the same as those listed in the review of Schechter's patent above. Moyer's patent does not include the two-stage gas-expansion concept, and it does not contemplate a combination of an air hybrid with a two-stage gas-expansion system. It does not contemplate a two-stage compression and expansion of air, and it does not consider retention of combustion gas in the engine and mixing it with pre-cooled intake air for better nitrogen oxide emission control. Absent from the above patent is the possibility of combining the two-stage gas expansion with an electric hybrid. Also absent is the concept of the camshaft-based two-mode engine valve operation that permits switching between four-stroke and two-stroke engine operations.

There are also a number of other differences between the above patent and the present invention, which are reviewed below.

(1) The above patent describes an air-hybrid concept, in which the recovery of braking energy is achieved by operating the engine as an air motor. In contrast to that, the present invention supplements the concept of using the air motor with a method, in which the compressed air is used to assist the engine during an internal-combustion cycle. Air motor power capacity is limited, while the peak power of an engine with air-power-assisted combustion is greater than that of a conventional engine.

(2) Moyer's patent describes an internal-combustion operation limited to a four-stroke cycle. The present invention, on the other hand, describes an engine which can selectively operate as a four-stroke, or as a two-stroke internal-combustion engine, quickly switching from one cycle to another whenever needed. Ability to switch from the four-stroke to the two-stroke internal-combustion operation permits a substantial increase in engine torque. It is especially useful during acceleration from low engine speed, when torque produced by a four-stroke engine is often inadequate.

(3) Moyer proposes to control the flow of air from the cylinder to the air tank and back by flowing the air through a variable restriction. As it is well known, throttling airflow in a restriction inevitably leads to a substantial loss of energy. The present invention avoids this type of energy loss. It envisions flowing the air through unrestricted passages and controlling the magnitude of the braking force by varying the volume of the air charge received into the engine cylinder, as well as varying the volume and the degree of compression of the air discharged from the cylinders into the air-reservoir. This is accomplished by varying the timings of the valves openings and closings.

(4) The present invention provides for a compressed-air reservoir with a heating jacket, through which a variable and controllable flow of exhaust gas can be maintained. This prevents heat loss through external walls of the air reservoir and maintains optimum air-temperature level for best engine operation. The above patent does not include any such measures. Without them, substantial energy losses, associated with uncontrolled cooling of compressed air during its storage, will result.

A U.S. Pat. No. 3,945,345 to Ishikawa describes a rotary internal-combustion engine that operates with seven phases including an afterburning or secondary expansion phase. A rotary engine is an ingenious machine, but the unfavorable shape of its working chambers leads to incomplete combustion and a substantial amount of unburned hydrocarbons and carbon monoxide escapes from the engine with its exhaust. To alleviate that deficiency, the above patent describes a design and a method of operation that includes an afterburn of the above gases. The engine includes a rotatable body inside a stationary one that together form four working chambers. During each engine cycle, the volume of a typical chamber expands three times and contracts three times, and it performs two separate exhaust events, each assisted by pressurized scavenging air supplied by a separate air pump. With some shift in timing, the same process takes place in each chamber. An understanding of the engine operation can be acquired by following the process in one of the chambers. A brief summary of that process is given below.

A given chamber V1 becomes connected to an intake port when its volume is the smallest (FIG. 1A) and, during subsequent first expansion of its volume (FIGS. 1B and 1C), it takes in a mixture of air and fuel. Then, during a first contraction, the volume of chamber V1 shrinks, and the mixture is compressed and ignited near a point of its smallest volume (FIGS. 1D and 1E). A second expansion of chamber V1 follows, but before a full expansion of the chamber is achieved, it becomes connected to a preceding chamber V2 through a transfer passage (FIG. 1F). A blowdown of combustion gas from chamber V1 into chamber V2 takes place, while the volume of both chambers increases. At that time, chamber V2 is filled with scavenging air, and the cumulative effect of the blowdown and the presence of additional air cause an afterburn of unburned hydrocarbons and carbon monoxide in chamber V2. The combined volume of the two chambers increases (FIGS. 1G and 1H) until chamber V2 becomes connected to an exhaust port (FIG. 1I). At that time, pressurized scavenging air is supplied to the transfer passage and, during a second contraction of chamber V1; it assists in pushing the combustion gas out of the two chambers into the exhaust port (FIGS. 1J and 1K). Later, chamber V2 becomes separated from chamber V1, and it continues the exhaust process while its volume shrinks. At the same time, chamber V1 becomes connected to a following chamber V4 (FIG. 1L), and a blow-down of partially-expanded combustion gas takes place from chamber V4 into chamber V1 while the chamber V! undergoes a third expansion. After that, chamber V1 becomes connected to the exhaust port, and a second exhaust event, assisted by a second blast of scavenging air, takes place during a third contraction of its volume.

The rotary internal combustion engine, described in the above patent, is very different from the reciprocating-piston-type internal-combustion engine and the method of its operation that is the subject of the present invention. The design and method of operation, described in the above patent are specifically tailored for the rotary engine and are not easily applicable to reciprocating-piston-type engines. Therefore the differences between the above patent and the present invention are very numerous and only some of them are reviewed below.

(1) In the rotary engine, described in the above patent, the same process takes place in each working chamber. There is only one mode of engine operation. In contrast to that, the present patent describes a multi-cylinder engine, in which some of the cylinders, the primary ones, operate in a four-stroke internal combustion cycle, while other cylinders, the secondary ones, operate in a two-stroke gas-motor cycle. The engine, described in the present invention, can operate in variety of operational modes and can be switched from one mode to another by a vehicle control system in response to driver's demands and in accordance with a program contained in the control system software. This permits it to achieve the best fuel economy and exhaust emission for each operating condition. The above patent does not offer such operational flexibility, and therefore it cannot offer a fuel economy improvement comparable to what the present invention can offer.

(2) In the above patent, an increased expansion of gas is achieved by connecting two chambers to each other, increasing their volume, and adding scavenging air. Since the maximum volume in each chamber is achieved at different time, the maximum combined volume of the two chambers is about 50% greater than the peak volume of a single chamber. Therefore the expansion ratio is about 1.5 times the geometric expansion ratio of a single chamber. The geometric expansion ratio in a chamber is the ratio of its maximum and minimum volumes.

The present invention uses an entirely different method, which can achieve significantly grater expansion ratio than it is possible to achieve in the above patent. In the present invention, the combustion gas is subjected to full expansion in primary cylinders that operate in a four-stroke internal combustion cycle. Then, after the maximum geometric expansion ratio was achieved, the expanded gas is transferred to secondary cylinders, where it is subjected to a second expansion in a two-stroke gas-expansion cycle. The expansion of gas, in each cylinder, is completely separate from the expansion in any other cylinder. If the number of primary cylinders is equal to the number of secondary cylinders, a secondary cylinder takes in, during each two-stroke cycle, about half of what a primary cylinder has displaced. The intake of gas into the secondary cylinder takes place during a first part of the piston volume-increasing stroke. During the second part of the same stroke, the second gas expansion takes place. Therefore, if the number of primary and secondary cylinders is equal, an additional 2:1 gas expansion takes place in the secondary cylinder, and the overall expansion ratio of combustion gas is doubled. Even greater increase in the expansion ratio can be achieved if the number of primary cylinders is smaller than the number of secondary cylinders. For example, if an engine has three primary cylinders and five secondary cylinders, a secondary cylinder takes in, during each two-stroke cycle, only about 30% of what a primary cylinder has displaced during a four-stroke cycle, and the resulting increase in the gas expansion ratio is 3.3:1. If an engine has two primary cylinders and four secondary cylinders, the increase in the gas expansion ratio is 4:1. This means that, in the engine of the present invention, expansion of the combustion gas can be extended to a level, at which the gas pressure drops to atmospheric pressure. Since the thermodynamic efficiency of an engine improves with the increase in the expansion ratio, the very substantial increase in expansion ratio, which can be achieved in the engine of the present invention, leads to a very substantial improvement in the engine fuel consumption, an improvement that the above patent cannot match.

(3) The present invention contemplates an engine with electronically controlled valves. In such engine, the ratio of the number of secondary cylinders to the number of primary cylinders can be changed during engine operation. This means that the engine overall expansion ratio can be varied and optimized for best engine performance and fuel consumption during each engine operating condition. The rotary engine of the above patent doesn't offer an opportunity to optimize the expansion ratio during engine operation. Its expansion ratio is fixed.

(4) The present invention contemplates an engine, in which, during a switch to the two-stage gas-expansion mode, operation of the primary cylinders is switched from a relatively light load to a heavy-load operation, where the efficiency of the engine operation is generally higher. This effect is especially pronounced in case of spark-ignition engines, which suffer from a substantial energy loss due to throttling of intake air during part-load operation. Switching operation of the primary cylinders to heavier loads leads to a substantial reduction in intake air throttling. This further reduces the fuel consumption. The rotary engine of the above patent cannot achieve such an improvement, since there is only one mode of operation, and the same internal-combustion cycle always takes place in all its chambers (5) The rotary engine, described in the above patent, requires scavenging air for its operation. This air is delivered by an air pump. Driving the pump consumes energy and increases fuel consumption. The engine described in the present invention does not require scavenging. This contributes to better fuel economy.

(6) In the rotary engine, described in the above patent, intake and exhaust ports are used for the engine gas exchange. Port-based gas-exchange system is inflexible. The engine, described in the present invention, has a variable valve control system. In such system, valve timing can be varied and optimized for better exhaust emissions and fuel economy. For example, a controllable amount of exhaust gas can be retained in the cylinders to improve the nitrogen oxide emission control. It also permits to switch the engine operation from four-stroke to two-stroke cycle, when needed. No such options exist in the above rotary engine.

(7) The present invention contemplates a method for substantial reduction in harmful nitrogen oxide emission in the vehicle engine. The method involves retention of a significant amount of combustion gas in the cylinder, at the end of one engine cycle, and mixing it with pre-cooled intake air at the beginning of the next cycle. The above patent does not include such method of nitrogen oxide control.

(8) In the rotary engine, described in the above patent, each working chamber undergoes three contractions and three expansions during each engine cycle. If such process were applied to a piston-type engine, the engine would operate in a six-stroke cycle. Since engine friction per cycle is proportional to the number of piston strokes per cycle, a six-stroke engine would have 50% more friction than a four-stroke engine. The present invention describes a piston-type engine that can operate in a two-stage gas expansion mode. In such engine, there are two compression and two expansion strokes in each primary cylinder during each four-stroke cycle, and only one expansion stroke in each secondary cylinder during each two-stroke cycle. This minimizes the friction.

(9) The present invention contemplates combining an engine, capable to operate in a two-stage gas-expansion mode, with an air hybrid or with an electric-hybrid system. The above patent does not include such combination. In general, rotary engines are notorious for their poor fuel efficiency, when compared to piston-type engines. That is why they didn't find much acceptance in the marketplace. Therefore combining a hybrid system with a rotary engine would be counterproductive from the point of view of the overall system fuel economy.

OBJECTS AND ADVANTAGES

One object of the present invention is to achieve a substantial improvement in vehicle fuel consumption during driving both in the city and on the highway. This is achieved by combining a hybrid vehicle system, which reduces fuel consumption during periods of frequent braking and acceleration, typical for city driving, with a two-stage gas-expansion system that saves fuel during long periods between acceleration and braking when the vehicle cruises with approximately constant speed, typical for highway driving.

A hybrid vehicle can achieve a significant reduction in fuel consumption, during braking and acceleration, by accumulating the energy derived from the vehicle motion, during its deceleration, and using the accumulated energy to assist in subsequent vehicle acceleration. However, there is no improvement during other periods of vehicle operation, such as cruising, when there is no braking. Because of that, the advantage of hybrid operation is mostly limited to in-city driving, when braking and acceleration take place often. On the highway, when braking is rare, the hybrid system offers practically no fuel economy improvement.

To alleviate the above disadvantage, the present invention contemplates a combination of the hybrid-vehicle principle, which saves fuel during braking and acceleration, with a two-stage gas-expansion principle that can save fuel during other periods of vehicle operation, especially during highway driving. The two-stage gas expansion concept improves the efficiency of the engine thermodynamic cycle by increasing the amount of useful energy extracted from the engine combustion gas.

Another object of the present invention is a concept of an engine that can operate with a two-stage combustion gas expansion. An internal-combustion engine, capable of two-stage gas expansion, can operate either as a conventional engine or in a two-stage gas-expansion mode, and it can be switched from one mode to another. When operating in the two-stage gas-expansion mode, some of the engine cylinders, the primary cylinders, perform a conventional four-stroke internal-combustion cycle. At the end of the expansion stroke, the still pressurized combustion gas is transferred from the primary cylinders into the secondary cylinders. There, it is subjected to a second stage of expansion and exhausted into the exhaust. system. In this way, the combustion gas is subjected to expansion that is substantially greater than any gas expansion that can be performed in a single cylinder. Subjecting the gas to a second stage of expansion extracts an additional amount of useful energy. This increases the efficiency of the engine and reduces its fuel consumption.

A further object of the present invention is a concept of an engine that can be selectively switched from four-stroke to two-stroke operation and vice versa. For this, the engine gas-exchange controlling system comprises a set of deactivatable and variably controllable valves. There is also a selectively deactivatable fuel delivery system. The overall system also includes a control system, which is an on-board computer capable to monitor the vehicle operation and switch the engine operation between the four-stroke and the two-stroke operation as needed, according to a program contained in its software.

Still another object of the present invention is to reduce the size of the air reservoir necessary for storing the vehicle braking energy in compressed air. This can be accomplished by using two-stage air compression. Thanks to a very substantial increase in both mass density and energy density of the stored air, a very significant reduction in the size of the air reservoir can be achieved. In small vehicles, such as automobiles used for personal transportation, the required size of the air reservoir becomes so small that it can be integrated with the engine by becoming an integral part of the engine manifolds system. This eliminates the air reservoir as a stand-alone component of the vehicle and reduces the cost and complexity of the vehicle assembly. It also makes the concept of storing the vehicle braking energy acceptable for heavy-truck application. In heavy trucks, the mass of the vehicle is very large, and the amount of kinetic energy, to be absorbed during braking, is huge. Reduction in the required size of the air reservoir permits to successfully use the above concept in heavy trucks, without the need for excessively large air reservoir.

Another object of the present invention is to reduce the amount of harmful pollutants emitted during vehicle operation. The amount of harmful exhaust emissions depends, to a large extent, on the amount of fuel burned in the engine. Reducing the engine fuel consumption reduces the exhaust emission.

Still another object of the present invention is to achieve a substantial reduction in nitrogen oxide emission. To reduce nitrogen oxide emission, a certain amount of exhaust gas is added to the intake air in most internal-combustion engines. This restrains the nitrogen oxide formation. The more exhaust gas is added, the less nitrogen oxide is produced. In most cases, a portion of the exhaust gas is diverted from the exhaust system, cooled in a special exhaust gas cooler, and recirculated back into the engine cylinders. Low pressure of the cooled exhaust gas limits the amount of gas that can be recirculated. A much simpler concept involves retaining a portion of the combustion gas in the cylinder by closing the exhaust valve early. Unfortunately, in this case, it is the high temperature of the retained combustion gas that limits the amount of gas that can be retained. The present invention offers a way to resolve this problem by cooling the intake air. This method is especially useful when used in conjunction with air-hybrid operation that involves compression of air and its subsequent expansion. Cooling the air while it is still at high pressure and temperature and, then, expanding it in the engine cylinders is an effective method of reducing its heat content. It is especially effective in a system that uses two-stage compression and two-stage expansion. Mixing the retained hot combustion gas with intake air that has substantially reduced heat content avoids excessively high temperature of the air and combustion gas mixture. In this way, a substantial amount of combustion gas can be retained and a significant reduction in nitrogen oxide emission can be achieved.

A further object of the present invention is to reduce or eliminate the need for electric starter, in an air-hybrid system, by starting the engine with compressed air received from the air reservoir. This is a significant cost reduction.

Another object of the present invention is to eliminate the external exhaust gas recirculation system. The variable valve systems employed by the embodiments of the present invention can trap sufficient amount of residual gas in each cylinder at the end of each exhaust stroke to control the amount of nitrogen oxide produced in the next cycle without the need for an external exhaust recirculation. Elimination of the exhaust gas recirculation system leads to a substantial cost reduction.

SUMMARY

In its embodiments, the present invention contemplates a system and a method of operating a vehicle on wheels. The method involves combining a hybrid vehicle system, which reduces fuel consumption during braking and acceleration, with a two-stage gas-expansion system that saves fuel during periods between acceleration and braking when the vehicle cruises with approximately constant speed.

A hybrid vehicle can achieve a significant reduction in fuel consumption, during braking and acceleration, by accumulating the energy derived from the vehicle motion, during its deceleration, and using the accumulated energy to assist in subsequent vehicle acceleration. However, there is no improvement during other periods of vehicle operation, such as cruising, because the hybrid principle is just a better way to use the mechanical work performed by the engine, and it is not associated with an improvement in efficiency of the engine thermodynamic cycle. Because of that, the advantage of hybrid operation is mostly limited to in-city driving, when braking and acceleration take place often. On the highway, when braking is rare, the hybrid system offers practically no fuel economy improvement.

To alleviate the above disadvantage, the present invention contemplates a combination of the hybrid-vehicle principle, which saves fuel during braking and acceleration, with a two-stage gas-expansion principle that can save fuel during other periods of vehicle operation, especially during highway driving. The two-stage gas expansion concept, which itself is a subject of the present invention, improves the efficiency of the engine thermodynamic cycle by increasing the amount of useful energy extracted from the engine combustion gas.

An internal-combustion engine, capable of two-stage gas expansion, can operate either as a conventional engine or in a two-stage gas expansion mode and it can be switched from one mode to another. When operating in the two-stage gas expansion mode, some of the engine cylinders, the primary cylinders, perform a conventional four-stroke internal-combustion cycle. Other engine cylinders, the secondary cylinders, perform a two-stroke gas-expansion cycle. There is no pressure blowdown in the primary cylinders at the end of the expansion stroke. Instead, the still pressurized combustion gas is transferred from the primary cylinders into the secondary cylinders. There, it is subjected to a second stage of expansion and exhausted into the exhaust system. In this way, the combustion gas is subjected to expansion that is substantially greater than any gas expansion that can be performed in a single cylinder. Subjecting the gas to a second stage of expansion extracts an additional amount of useful energy. This increases the efficiency of the engine and reduces its fuel consumption. When driving an automobile, the two-stage expansion mode can be used for light and medium loads that prevail during cruising with approximately constant speed, both in the city and on the highway. It can also be used for mild acceleration. For heavy acceleration or for uphill driving, when heavy engine load is required, a switch to the conventional internal-combustion mode is performed.

In its preferred embodiment, the present invention contemplates combining a two-stage gas-expansion system with an air hybrid system. The system includes an air reservoir capable to receive, store, and discharge compressed air. It also includes a reciprocating-piston engine capable to selectively operate as an internal combustion engine, as a compressor, and as an air motor. The engine can also operate concurrently as an internal-combustion engine and an air motor, or concurrently as an internal-combustion engine and a gas motor. During the internal-combustion operation, the engine can selectively operate either as a four-stroke, or as a two-stroke internal-combustion engine. The engine gas exchange controlling system comprises a set of deactivatable and variably controllable valves. The engine also has a system of manifolds, connecting ducts and flow-switching arrangements that can selectively connect individual engine cylinders to outside atmosphere, to the air reservoir, and to each other. There is also a deactivatable fuel delivery system. The overall system also includes a control system, which is an on-board computer capable to monitor the vehicle driver's demands and respond to them by controlling the operation of the engine and other vehicle components according to a program contained in its software.

During vehicle braking, the fuel delivery system is deactivated, and the engine operates as a compressor receiving air from outside atmosphere, compressing it and transferring it into the air reservoir for storage. The engine can operate either as a two-stage or as a single-stage compressor. In the two-stage mode, some of the engine cylinders compress atmospheric air and transfer it to other cylinders, where it is subjected to a second compression and transferred to the air reservoir. Thanks to the two-stage compression, the air density, in the air reservoir, can be very high, and the size of the air reservoir can be very small. In the single-stage mode, all engine cylinders pump the compressed air directly into the air reservoir.

During subsequent vehicle acceleration, fuel delivery is reactivated, and the engine valves activity is such, that the engine operates as an internal-combustion engine receiving air, needed for its operation, from the air reservoir. The engine can operate either as a four-stroke or as a two-stroke internal-combustion engine and, in either case; there can be two modes of operation. In a first mode, a combustion process takes place in all engine cylinders. In a second mode, some of the cylinders operate as an air motor expanding the air received from the air reservoir and transferring it to other cylinders, where it is used for combustion. In either mode, the energy of compressed air supplements the energy released in combustion. This reduces the fuel consumption necessary to produce the required engine torque. In this way, a significant fraction of the braking energy is reclaimed during acceleration. Changing the schedule of the engine valves operation and doubling the frequency of fuel delivery can switch the engine operational cycle from a four-stroke to a two-stroke cycle, or vice versa.

During acceleration, the engine can also operate as an air motor receiving compressed air from the air reservoir, expanding it and exhausting it into outside atmosphere. In this case, the vehicle is driven by air power only, and no fuel is used. Both single-stage and two-stage air expansion can be used. Air-motor operation can also be used instead of electric starter.

To save fuel, the engine operation can be completely deactivated during vehicle coasting, when the driver depresses neither the acceleration pedal nor the brake pedal. The same can be done whenever the vehicle stops. To restart the engine after a brief stop, it can be brought up to speed by operating it as an air motor receiving compressed air from the air reservoir.

During cruise, the engine operates with a fraction of its full-power capability and the two-stage gas-expansion mode is used. The two-stage gas expansion can also be used during mild acceleration, sometimes combining it with the compressed-air-assisted operation.

The control system receives information, relevant to vehicle control, from a variety of sensors installed on the engine and in the vehicle. It also monitors the driver's demands for a specific braking or propulsion force. On the basis of this information, the control system determines the required mode of the engine operation and controls the engine and the vehicle in accordance with a control program incorporated into its software.

Combining the hybrid-vehicle and the two-stage gas-expansion concepts creates a vehicle system with substantially reduced fuel consumption during all modes of vehicle operation. A significantly better fuel consumption can be achieved not just during the stop-and-go driving conditions in a city, but also during cruising on a highway. Therefore the method and the system of the present invention offer an opportunity for an overall improvement in fuel economy substantially exceeding an improvement achievable in conventional hybrid vehicles. Reduced fuel consumption leads to reduced emission of harmful exhaust pollutants.

Some vehicles are intended to be used mostly for inter-state and inter-city transportation. In such vehicles, use of hybrid-vehicle systems is often economically unwarranted, since their exposure to driving in a city is very limited. They can, however, benefit from a two-stage gas-expansion system. In its first alternative embodiment, the present invention contemplates a vehicle and an engine that can operate in two modes—a two-stage gas-expansion mode and a conventional internal combustion mode. During cruising, which is a prevailing mode of operation in such vehicles, the engine operates mostly in the two-stage gas-expansion mode, achieving very good fuel economy. If there is a sudden need to increase the engine torque above the level that can be handled by the two-stage gas-expansion mode, the control system can switch the engine operation to the conventional internal-combustion mode.

Since there are only two modes of engine operation, the engine valve-actuation system can be simplified. The present invention contemplates a two-mode camshaft-based valve actuation system for the engine two-stage gas-expansion system. A special camshaft, with special actuators, is used to operate the valves in secondary cylinders that can operate alternatively either in the four-stroke internal-combustion mode or in the two-stroke gas-expansion mode. The primary cylinders always operate in the four-stroke internal combustion mode, and they use a conventional camshaft.

The two-stage gas-expansion system can be combined with other types of hybrid-vehicle systems. In its second alternative embodiment, the present invention contemplates a method and a system that combines a two-stage gas-expansion system with an electric-hybrid system. A control system controls the operation of and assures cooperation between the two systems in accordance with a control program incorporated into its software.

BRIEF DESCRIPTION OF THE DRAWINGS

FIG. 27 is a schematic diagram illustrating a camshaft-driven two-mode engine valve actuation system suitable for use in the first alternative mode.

FIG. 27A is a schematic diagram illustrating the shape of a first camlobe suitable for use in the camshaft-driven two-mode engine valve actuation system.

FIG. 27B is a schematic diagram illustrating the shape of a second camlobe suitable for use in the camshaft-driven two-mode engine valve actuation system.

FIG. 27C is a schematic diagram illustrating an alternative position of a control valve used in the camshaft-driven two-mode engine valve actuation system.

Note: Some of the above listed drawings can be used to illustrate more than one specific mode of operation.

DESCRIPTION OF THE PREFERRED EMBODIMENT

FIGS. 1 to 5A and 5B

Figure 1:
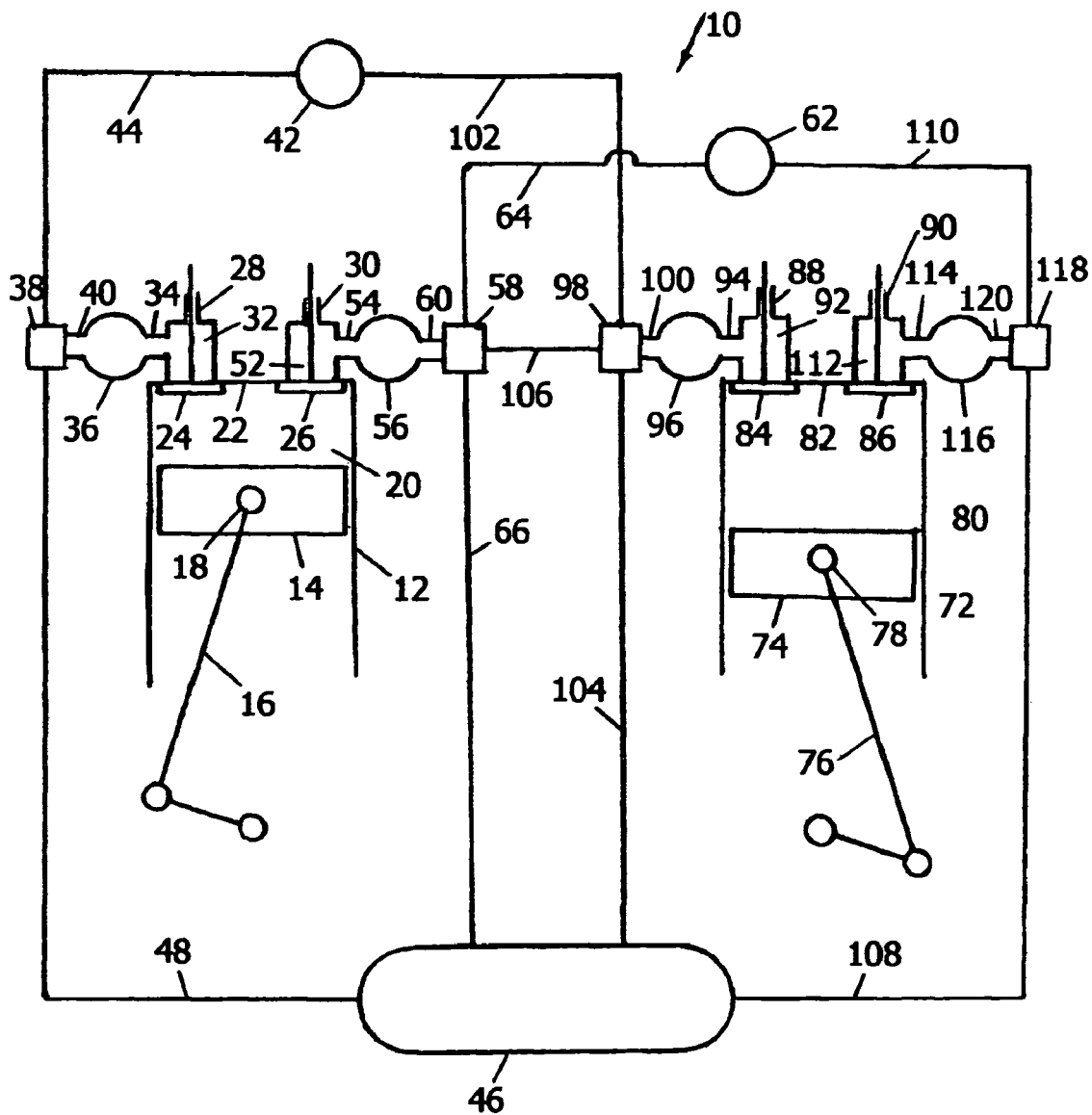
FIG. 1 is a schematic, cross-sectional side-view of two engine cylinders and their gas-flow connections to outside atmosphere, to compressed-air reservoir, and to each other in the preferred embodiment.

A preferred embodiment of the present invention is illustrated in FIGS. 1 to 5A and 5B. FIG. 1 is a schematic, cross-sectional side-view of two engine cylinders and their gas-flow connections to outside atmosphere, to compressed-air reservoir, and to each other. An engine 10 has at least two cylinders, including at least one primary cylinder 12 and at least one secondary cylinder 72. The design of the primary and secondary cylinders is identical, but they may perform different functions, depending on the mode of the engine operation.

Primary cylinder 12 contains a piston 14 that is mounted upon a connecting rod 16 by a wrist pin 18 and can reciprocate in cylinder 12, thus varying the volume of a cylinder chamber 20 enclosed between piston 14 and a cylinder head 22 attached to the top of cylinder 12. There are two types of normally-closed valves in cylinder 12, a first valve 24 and a second valve 26. Valves 24 and 26 are installed in cylinder head 22 and are slideably mounted in guides 28 and 30, respectively. Depending on the needs of the engine, there may be more than one valve of each type in each cylinder.

Figure 3:
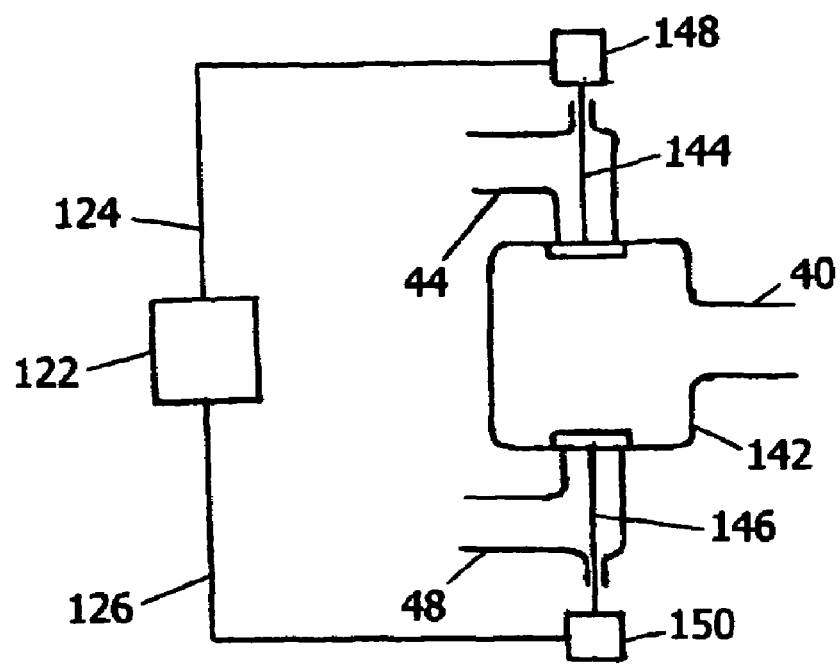
FIG. 3 is a diagram of a typical two-way switching arrangement that can be used in the present invention.

First valve 24 is shown in its closed position in which it separates cylinder chamber 20 from a first port 32 that opens into a first passage 34. First passage 34 connects to a first primary manifold 36, to which all first ports and all first passages from all primary cylinders are connected. First primary manifold 36 connects to a two-way switching arrangement 38, via a passage 40. Switching arrangement 38 can be selectively connected either to an intake system 42, via a duct 44, or to a compressed-air reservoir 46, via a duct 48. Intake system 42 is connected to outside atmosphere, usually through a system that includes an air filter and, sometimes, a turbocharger and an air cooler. The concept of two-way switching arrangement 38 is described in a later text and is illustrated in FIG. 3.

Figure 4:
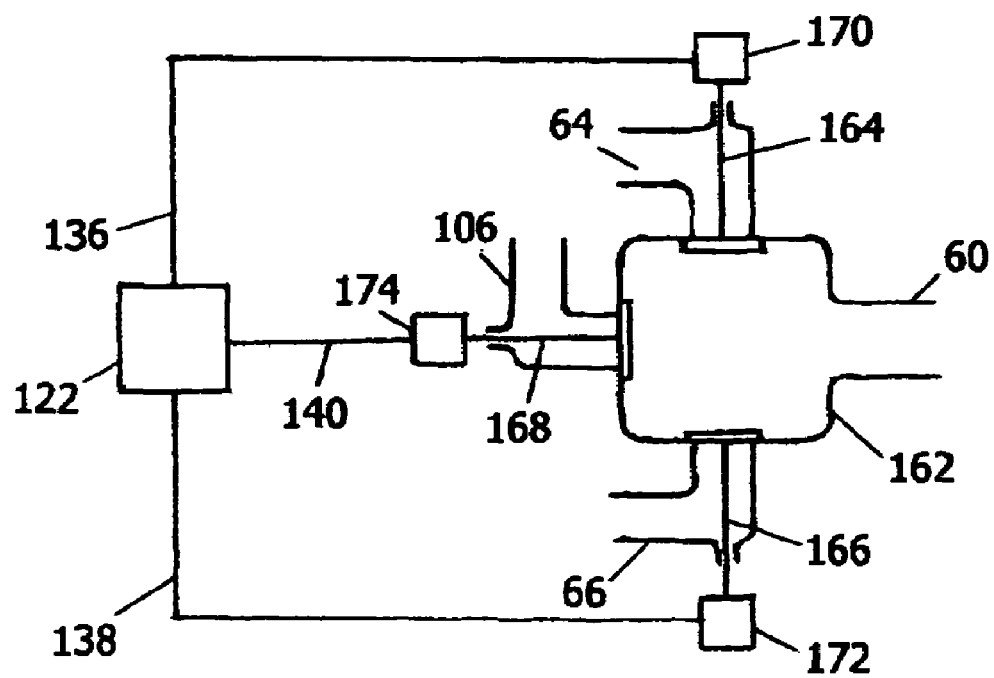
FIG. 4 is a diagram of a typical three-way switching arrangement that can be used in the present invention.

Second valve 26 is shown in its closed position in which it separates cylinder chamber 20 from a second port 52 that opens into a second passage 54. Second passage 54 connects to a second primary manifold 56, to which all second ports and all second passages from all primary cylinders are connected. Second primary manifold 56 connects to a three-way switching arrangement 58, via a passage 60. Switching arrangement 58 can be selectively connected either to an exhaust system 62, via a duct 64, or to compressed-air reservoir 46, via a duct 66, or to a three-way switching arrangement 98, via a transfer conduit 106. Exhaust system 62 is connected to outside atmosphere, usually through a system of exhaust pipes, a muffler, a catalyst, etc, and may also include a turbocharger. The concept of three-way switching arrangement 58 is described in a later text and is illustrated in FIG. 4.

Secondary cylinder 72 contains a piston 74, which is mounted upon a connecting rod 76 by a wrist pin 78 and can reciprocate in cylinder 72, thus varying the volume of a cylinder chamber 80 enclosed between piston 74 and a cylinder head 82 attached to the top of cylinder 72. If cylinders 12 and 72 belong to the same bank of cylinders, cylinder head 82 can be same head as cylinder head 22. There are two types of normally-closed valves in cylinder 72, a first valve 84 and a second valve 86. Valves 84 and 86 are installed in cylinder head 82 and are slideably mounted in guides 88 and 90, respectively. Depending on the needs of the engine, there may be more than one valve of each type in each cylinder.

First valve 84 is shown in its closed position in which it separates cylinder chamber 80 from a first port 92 that opens into a first passage 94. First passage 94 connects to a first secondary manifold 96, to which all first ports and all first passages from all secondary engine cylinders are connected. First secondary manifold 96 connects to a three-way switching arrangement 98 via a passage 100. Switching arrangement 98 can be selectively connected either to intake system 42, via a duct 102, or to compressed-air reservoir 46, via a duct 104, or to three-way switching arrangement 58, via transfer conduit 106. The concept of three-way switching arrangement 98 is described in a later text and is illustrated in FIG. 4.

Second valve 86 is shown in its closed position in which it separates cylinder chamber 80 from a second port 112 that opens into a second passage 114. Second passage 114 connects to a second secondary manifold 116, to which all second ports and all second passages from all secondary cylinders are connected. Second secondary manifold 116 connects to a two-way switching arrangement 118 via a passage 120. Switching arrangement 118 can be selectively connected either to exhaust system 62, via a duct 110, or to compressed-air reservoir 46, via a duct 108. The concept of two-way switching arrangement 118 is described in a later text and is illustrated in FIG. 3.

Figure 2:
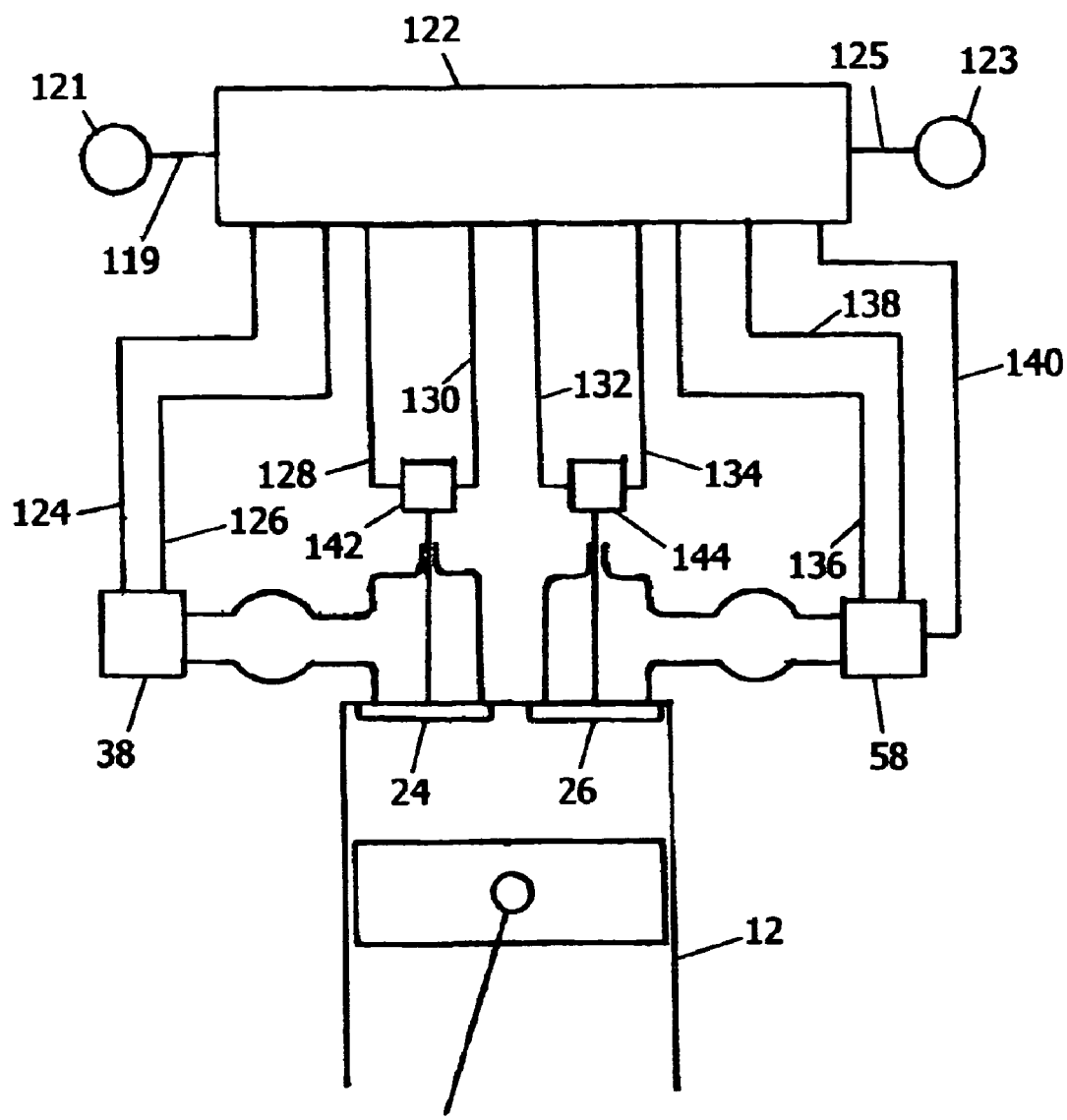
FIG. 2 is a schematic cross-sectional side-view of an engine cylinder illustrating a typical schematic of electrical connections controlling operation of valves and switching arrangements under the control of a control system in the preferred embodiment.

FIG. 2 is a schematic cross-sectional side-view of an engine cylinder illustrating a typical schematic of electrical connections controlling operation of valves and switching arrangements under the control of a control system 122. It is shown as applied to primary cylinder 12, but all other cylinders are controlled in the same or in similar way.

Control system 122 is an on-board computer programmed to control operation of various components of the engine and the vehicle in accordance with a strategy program incorporated into its software. It receives input signals from a system of sensors, installed in the engine and in the vehicle, and sends out output signals to actuators controlling operation of various components of the system. The signals generated by the sensors inform the control system about vehicle driver's demands for specific vehicle propulsion or braking force, as the case may be. A sensor 121, installed on the vehicle accelerator pedal and connected to control system 122 via electric line 119, supplies a variable magnitude signal representing the magnitude of the propulsion force demanded by the vehicle driver. A sensor 123, installed on the vehicle brake pedal and connected to control system 122 via electric line 125, supplies a variable magnitude signal representing the magnitude of the braking force demanded by the vehicle driver. Propulsion force is force acting on the vehicle in a direction of its motion. Braking force is force acting on the vehicle in a direction opposite to its motion. Other input signals (not shown in the drawing) carry information on physical and operational conditions in various parts and components of the engine and the vehicle. The control system evaluates the received information and, in accordance with its internal logic, controls operation of the engine and other vehicle components, so as to satisfy the driver's demands while maintaining optimum fuel consumption efficiency.

Control system 122 controls operation of first valve 24 and second valve 26 by sending control signals to valve actuators 142 and 144, respectively, which effectuate opening and closing of their respective valves. It also controls all valves in all other engine cylinders. The engine employs a camless valvetrain that uses electrohydraulic actuators instead of a camshaft. Such system can provide a fully variable valve timing, lift and event duration. It can also selectively deactivate individual valves and switch the engine operation from four-stroke to two-stroke and back. Such system was developed at Ford Motor Co., and it was described in an SAE paper entitled "Camless Engine".

Each valve actuator includes two solenoid valves, one controlling the engine valve opening and another one for controlling the valve closing. Accordingly, each valve actuator receives two separate control signals, one for valve opening and one for valve closing. Actuator 142 receives signals for valve opening and closing via lines 128 and 130, respectively. Actuator 144 receives signals for valve opening and closing via lines 132 and 134, respectively. Timing of each valve opening and closing is determined by timing of respective control signals received by its actuator. Varying duration of the signals can vary valve lift.

Those skilled in art will appreciate in view of this disclosure that other methods and systems for variable engine valves actuation may be used according to the present invention. These may include electromechanical or pneumatic camless systems, as well as variety of camshaft-based variable systems, such as hydraulic lost motion, variable mechanism, and other systems.

Control system 122 controls two-way switching arrangement 38, via lines 124 and 126, and three-way switching arrangement 58, via lines 136, 138, and 140. It also controls all the switching arrangements in all other engine cylinders. FIG. 3 illustrates a typical two-way switching arrangement that can be used in the present embodiment. The arrangement is described as applied to the case of switching arrangement 38 (FIG. 1), but it can also be used in the case of switching arrangement 118 (FIG. 1) and in other cases. A housing 142 contains two valves, 144 and 146, which can be operated by actuators 148 and 150, respectively. In the drawing, both valves are shown in closed position. Various electrical, pneumatic, or hydraulic devices can be used as the above actuators. Control system 122 can selectively open or close the two valves, 144 and 146, by sending control signals to actuators 148 and 150, respectively, via electric lines 124 and 126, respectively. The switching arrangement can be in one or another of two positions: In one, valve 144 is open while valve 146 is closed. In this position, passage 40 (FIG. 1) is connected to duct 44 (FIG. 1). In the second position, valve 146 is open while valve 144 is closed. In this position, passage 40 is connected to duct 48 (FIG. 1).

FIG. 4 illustrates a typical three-way switching arrangement that can be used in the present embodiment. The arrangement is described as applied to the case of switching arrangement 58 (FIG. 1), but it can also be used in the case of switching arrangement 98 (FIG. 1) and in other cases. A housing 162 contains three valves, 164, 166 and 168, which can be operated by actuators 170, 172, and 174, respectively. In the drawing, all three valves are shown in closed position. Various electrical, pneumatic, or hydraulic devices can be used as the above actuators. Control system 122 can selectively open or close the three valves, 164, 166, and 168, by sending control signals to actuators 170, 172, and 174, respectively, via electric lines 136, 138, and 140, respectively. The switching arrangement can be in one or another of three positions: In one, valve 164 is open while valves 166 and 168 are closed. In this position, passage 60 (FIG. 1) is connected to duct 64 (FIG. 1). In the second position, valve 166 is open while valves 164 and 168 are closed. In this position, passage 60 is connected to duct 66 (FIG. 1). In the third position, valve 168 is open while valves 164 and 166 are closed. In this position, passage 60 is connected to transfer conduit 106 (FIG. 1).

Figure 5A:
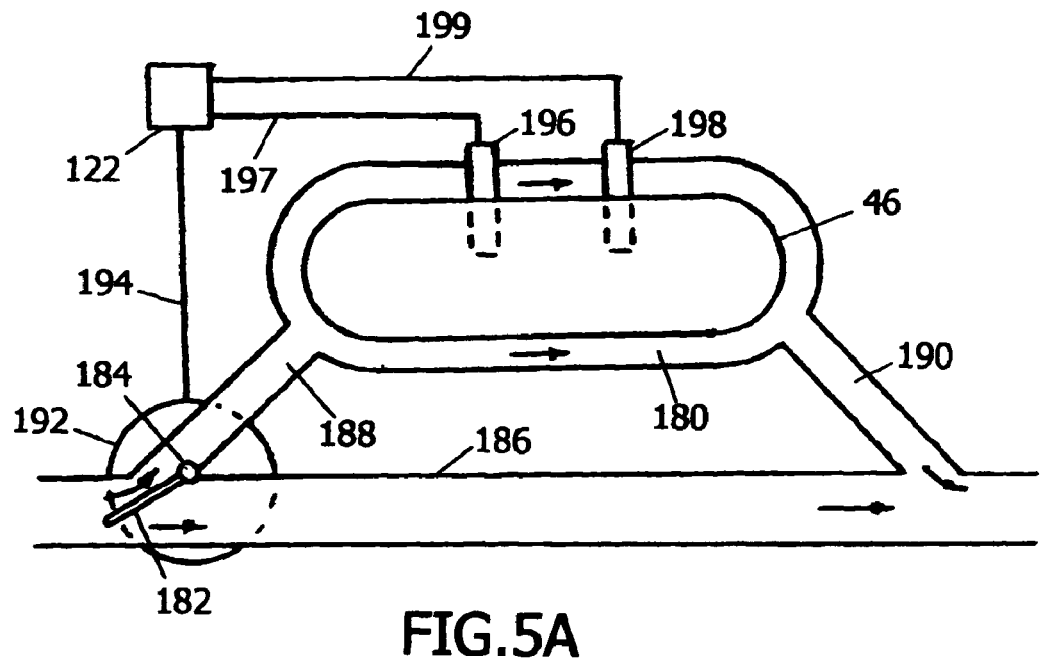
FIG. 5A is a schematic diagram illustrating automatic air-temperature control in a compressed-air reservoir useable with the present invention.

For good engine operation, it is desirable to control the temperature of compressed air in the air reservoir. FIG. 5A is a schematic diagram illustrating automatic air-temperature control in a compressed-air reservoir useable with the present invention. In this case, the air-temperature control has two objectives. The first one is to insure that relationship between the temperature and the pressure of compressed air in the air reservoir is within limits determined by an algorithm contained in the control system software. This is to insure that the engine gets air that is neither too cold, nor too hot for proper engine operation. If the air entering the engine cylinders is too cold, this may adversely affect the combustion process. If the air is too hot, this may lead to engine knock.

As shown in FIG. 5A, outer surface of air-reservoir 46 has a double wall forming a heating jacket 180 through which hot exhaust gas can be circulated during engine operation. A plate valve 182 is rotatably installed on a pivot 184 inside an exhaust pipe 186. Depending on its position, plate valve 182 can divert a variable fraction of total exhaust-gas flow into an inlet duct 188 leading into heating jacket 180. After circulating through heating jacket 180, the exhaust gas returns through an outlet duct 190 back into exhaust pipe 186. Arrows in the drawing illustrate the flow of exhaust gas.

An actuator 192, which, typically, is a stepper-motor, can vary the position of plate-valve 182, thus varying the exhaust-gas flow through heating jacket 180. Actuator 192 is controlled by a variable signal from control system 122, via an electric line 194. Control system 122 receives information on pressure and temperature of air inside air reservoir 46 from a pressure sensor 196 and a temperature sensor 198, respectively, via electric lines 197 and 199, respectively. On the basis of this information, it controls the exhaust-gas flow through heating jacket 180 to insure that the temperature of the air inside air reservoir 46 is a proper function of its pressure, as dictated by the algorithm contained in the control system software. Increasing or decreasing the exhaust-gas flow through heating jacket 180 increases or decreases, respectively, the temperature of compressed air in air reservoir 46.

In other cases, a controllable cooling of the compressed air may be desirable. For example, cooling the air may be very useful to reduce the amount of harmful nitrogen oxide produced in the engine during combustion. To reduce nitrogen oxide emission, a certain amount of exhaust gas is added to the engine intake air. This reduces the peak combustion temperature and thus restrains the nitrogen oxide formation. The more exhaust gas is added, the less nitrogen oxide is produced. In most cases, a portion of the exhaust gas is diverted from the exhaust system, cooled in a special exhaust gas cooler, and recirculated back into the engine cylinders. Low pressure of the cooled exhaust gas limits the amount of gas that can be recirculated.

A much simpler concept involves retaining a portion of the combustion gas in the cylinder by closing the exhaust valve early. Unfortunately, in this case, it is the high temperature of the retained combustion gas that limits the amount of gas that can be retained. Cooling the intake air can resolve this problem. Cooling the air while it is still at high pressure and temperature and, then, expanding it in the engine cylinders is an especially effective method of reducing its heat content. Mixing the retained hot combustion gas with intake air that has substantially reduced heat content avoids excessively high temperature of the air and combustion gas mixture. The temperature of this mixture can be controlled by controlling the amount of heat taken out of the air. In this way, a substantial amount of combustion gas can be retained and a significant reduction in nitrogen oxide emission can be achieved.

Figure 5B:
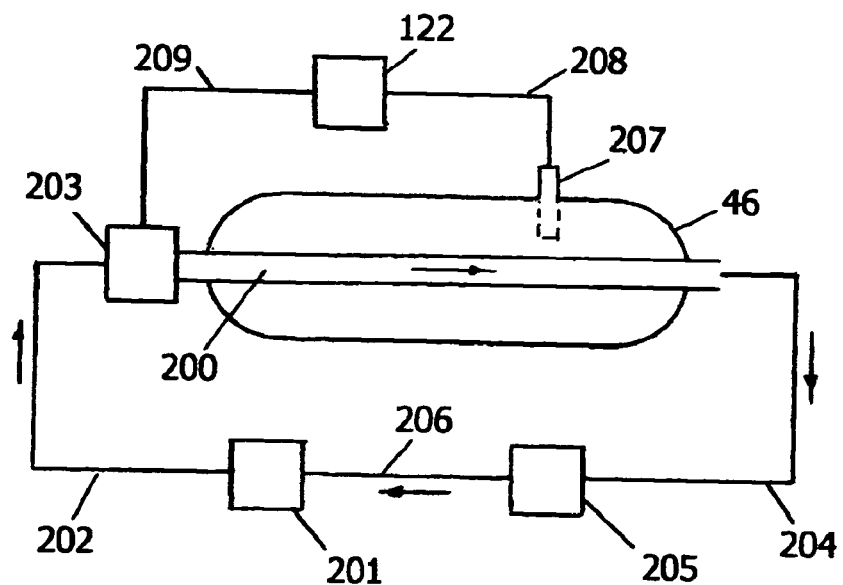
FIG. 5B is a schematic diagram illustrating an example of a system for controlled cooling of compressed air directly in the compressed-air reservoir.

Cooling the compressed air can be performed either in the compressed-air reservoir or outside the reservoir, in a separate heat exchanger. FIG. 5B is a schematic diagram illustrating an example of a system for controlled cooling of compressed air directly in the compressed-air reservoir. A fluid conduit 200, carrying cooling fluid, is installed inside air reservoir 46. The temperature of the cooling fluid is substantially lower than the temperature of the air contained in air reservoir 46. Fluid conduit 200 may be a single pipe, or it may be a set of pipes. A source of cooling fluid 201 supplies the cooling fluid to fluid conduit 200 through a pipe 202 and a flow control valve 203. The cooling fluid flows through fluid conduit 200 and returns to source of cooling fluid 201 through a pipe 204, a heat rejection device 205, and a pipe 206. In most cases, the engine cooling system can serve as the source of the cooling fluid, the engine coolant can serve as the cooling fluid, and the vehicle radiator can serve as the heat rejection device.

Fluid conduit 200 is in direct contact with the air in air reservoir 46, and the cooling fluid absorbs some of the heat, contained in that air, and carries it to heat rejection device 205, where it is rejected into outside air. This reduces the heat content of the air in air reservoir 46. A temperature sensor 207, installed in air reservoir 46, monitors the air temperature inside the reservoir. Control system 122 receives information on temperature of air inside air-reservoir 46 from temperature sensor 207, via an electric line 208. On the basis of this information, it controls the flow of cooling fluid, through fluid conduit 200, by sending control signals to flow control valve 203, through an electric line 209, to insure that the temperature of the air inside air-reservoir 46 is reduced to within a desirable range, as dictated by the algorithm contained in the control system software.

Those skilled in art will appreciate in view of this disclosure that other engine valves arrangements and alternative methods of gas exchange in the engine, other arrangements for supplying the control system with necessary information, other methods of actuation of the key components of the system, possibly including other types of sensors and actuators, other means of signal transmission, and other methods of heat retention in or extraction from the air may be used according to the present invention. Rotary valves, plate valves, and other types of valves can be used instead of poppet-type valves in the switching arrangements, and these valves may be located far apart instead of being in close proximity to each other.

DESCRIPTION OF OPERATION OF THE PREFERRED EMBODIMENT

FIG. 2 and FIGS. 6 to 21

The system described in the Description of the Preferred Embodiment can operate in a variety of braking and propulsion modes. Some of them are described below.

Compression Braking

FIG. 2 and FIGS. 6 to 9

Vehicle braking is performed whenever the vehicle driver signals a demand for a braking force by pressing on the brake pedal. It can be used to slow down the motion of the vehicle or to restrict its speed in a downhill drive. Compression braking is a preferred type of braking and is used whenever possible. Friction brakes are used only when needed to supplement compression braking, or when compression braking can not be used. Compression braking can be used only when the engine is coupled to the vehicle wheels and the vehicle is in motion.

In a moving vehicle with the engine coupled to the vehicle wheels, control system 122 (FIG. 2) responds to the driver's demand for a vehicle braking force by operating the engine in the compression-braking mode. If the vehicle is not in motion, or if the engine is not coupled to the wheels, control system 122 responds to the driver's demand for a vehicle braking force by activating the vehicle friction brake system.

During compression braking, no fuel is supplied into the engine cylinders, and the engine operates as a reciprocating-piston compressor driven from the vehicle wheels by vehicle motion. Air is received from outside atmosphere into the engine cylinders, compressed there, and displaced into compressed-air reservoir 46 (FIG. 1). Work performed by the engine pistons absorbs the kinetic energy of the vehicle and slows it down or restricts its motion. In this way, the energy of the vehicle motion is transformed into energy of compressed air stored in compressed-air reservoir 46. Later, this energy can be used to assist in vehicle propulsion.

There are two different modes of compression braking, a two-stage compression braking and a single-stage compression braking. The engine can operate in either of the two modes.

1. Two-Stage Compression Braking.

Figure 6:
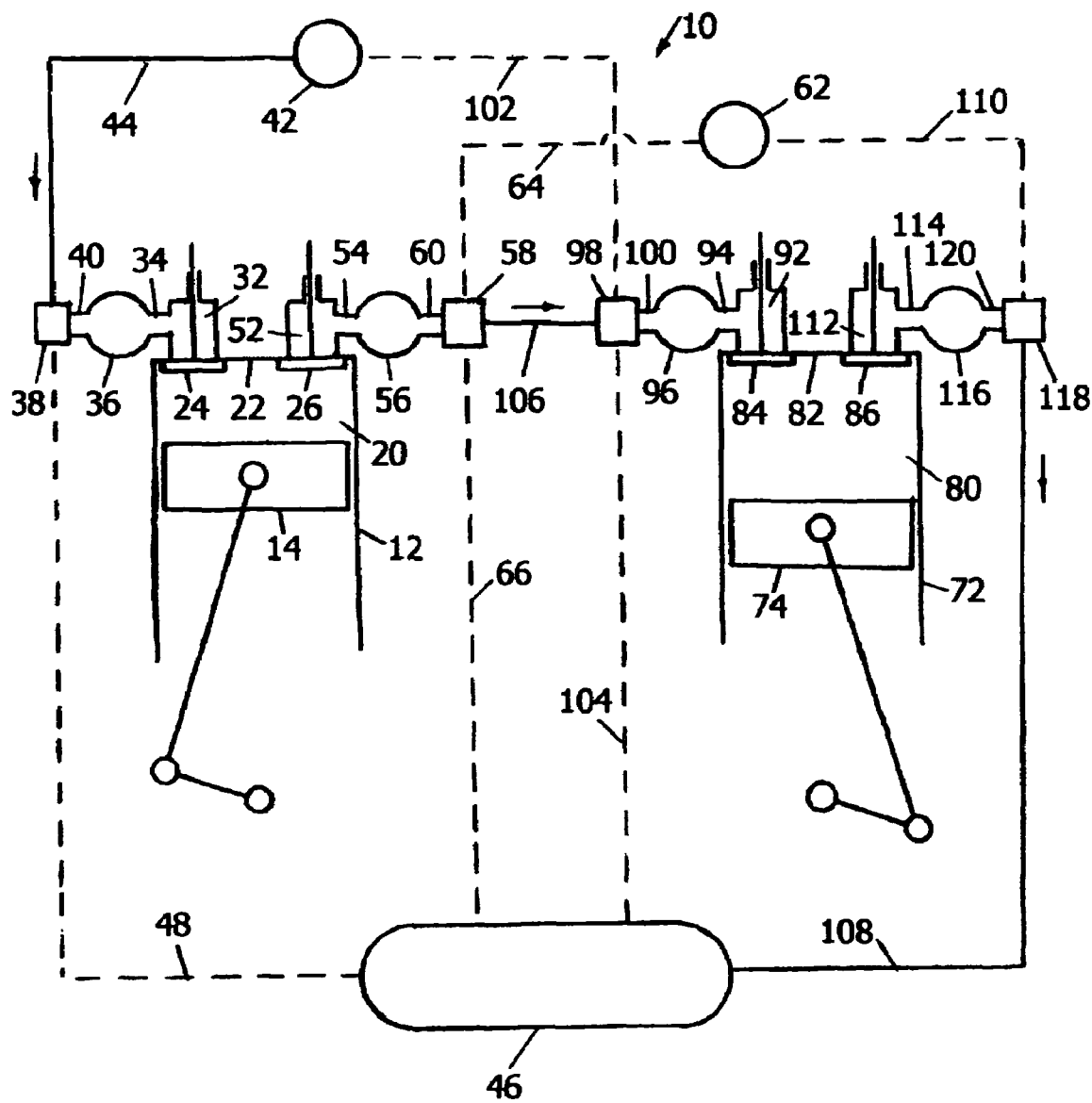
FIG. 6 is a schematic diagram illustrating the engine operation in the two-stage compression-braking mode.

FIG. 6 is a schematic diagram illustrating the engine operation in the two-stage compression braking mode. In the drawing, the ducts carrying the airflow are shown in solid lines, while the ducts not carrying the airflow are shown in dashed lines. Arrows in the drawing show the overall direction of the airflow. The engine operates as a two-stage compressor. Although the design of all engine cylinders is identical, functionally the cylinders can be divided into two types: primary cylinders that perform a first stage of air compression, and secondary cylinders that perform a second stage of air compression. The number of primary cylinders in the engine may be equal to or unequal to the number of secondary cylinders. It should be stressed that the division of the cylinders into the two types is for the purpose of description only. Every engine cylinder can operate either as a primary or as a secondary cylinder, and its function is determined by control system 122 (FIG. 2).

Control system 122 sets the connections of the engine switching arrangements into a specific pattern required for operation in the two-stage compression-braking mode. Switching arrangement 38 is connected to duct 44 and disconnected from duct 48. Switching arrangement 58 is connected to transfer conduit 106 and disconnected from ducts 64 and 66. Switching arrangement 98 is connected to transfer conduit 106 and disconnected from ducts 102 and 104. Switching arrangement 118 is connected to duct 108 and disconnected from duct 110.

During each two-stroke cycle in primary cylinder 12, piston 14 performs a volume-increasing stroke, when it moves away from cylinder head 22, followed by a volume-decreasing stroke, when it moves towards cylinder head 22. Each stroke can be divided into several parts, according to different processes occurring during each part of the stroke. During a first part of the volume-increasing stroke, both first and second valves, 24 and 26, remain closed, and expansion of residual air, left in cylinder chamber 20 after the previous cycle, takes place. During a second part of the volume-increasing stroke, first valve 24 is open, and primary cylinder 12 receives air from outside atmosphere. The air flows through intake system 42, duct 44, switching arrangement 38, passage 40, first primary manifold 36, first passage 34, first port 32, and through open first valve 24 into cylinder chamber 20. During a first part of the volume-decreasing stroke, both first and second valves, 24 and 26, remain closed, and compression of air trapped in cylinder chamber 20 takes place. During a second part of the volume-decreasing stroke, second valve 26 is open, and compressed air is expelled from primary cylinder 12 into transfer conduit 106. The air flows from cylinder chamber 20, through open second valve 26, second port 52, second passage 54, second primary manifold 56, passage 60, and switching arrangement 58 into transfer conduit 106.

During each two-stroke cycle in secondary cylinder 72, piston 74 performs a volume-increasing stroke, when it moves away from cylinder head 82, followed by a volume-decreasing stroke, when it moves towards cylinder head 82. During a second part of the volume-increasing stroke, both first and second valves, 84 and 86, remain closed, and expansion of residual air, left in cylinder chamber 80 after the previous cycle, takes place. During a third part of the volume-increasing stroke, first valve 84 is open, and secondary cylinder 72 receives compressed air from transfer conduit 106. The air flows through switching arrangement 98, passage 100, first secondary manifold 96, first passage 94, first port 92, and through open first valve 84 into cylinder chamber 80. During a first part of the volume-decreasing stroke, both first and second valves, 84 and 86, remain closed, and a second compression of compressed air, trapped in cylinder chamber 80, takes place. During a second part of the volume-decreasing stroke, second valve 86 is open, and compressed air is expelled from secondary cylinder 72 into compressed-air reservoir 46. The air flows from cylinder chamber 80, through open second valve 86, second port 112, second passage 114, second secondary manifold 116, passage 120, switching arrangement 118, and duct 108 into compressed-air reservoir 46. Second valve 86 remains open during a first part of the volume-increasing stroke, and some of the air, previously expelled from secondary cylinder 72, returns back into cylinder chamber 80.

Figure 8:
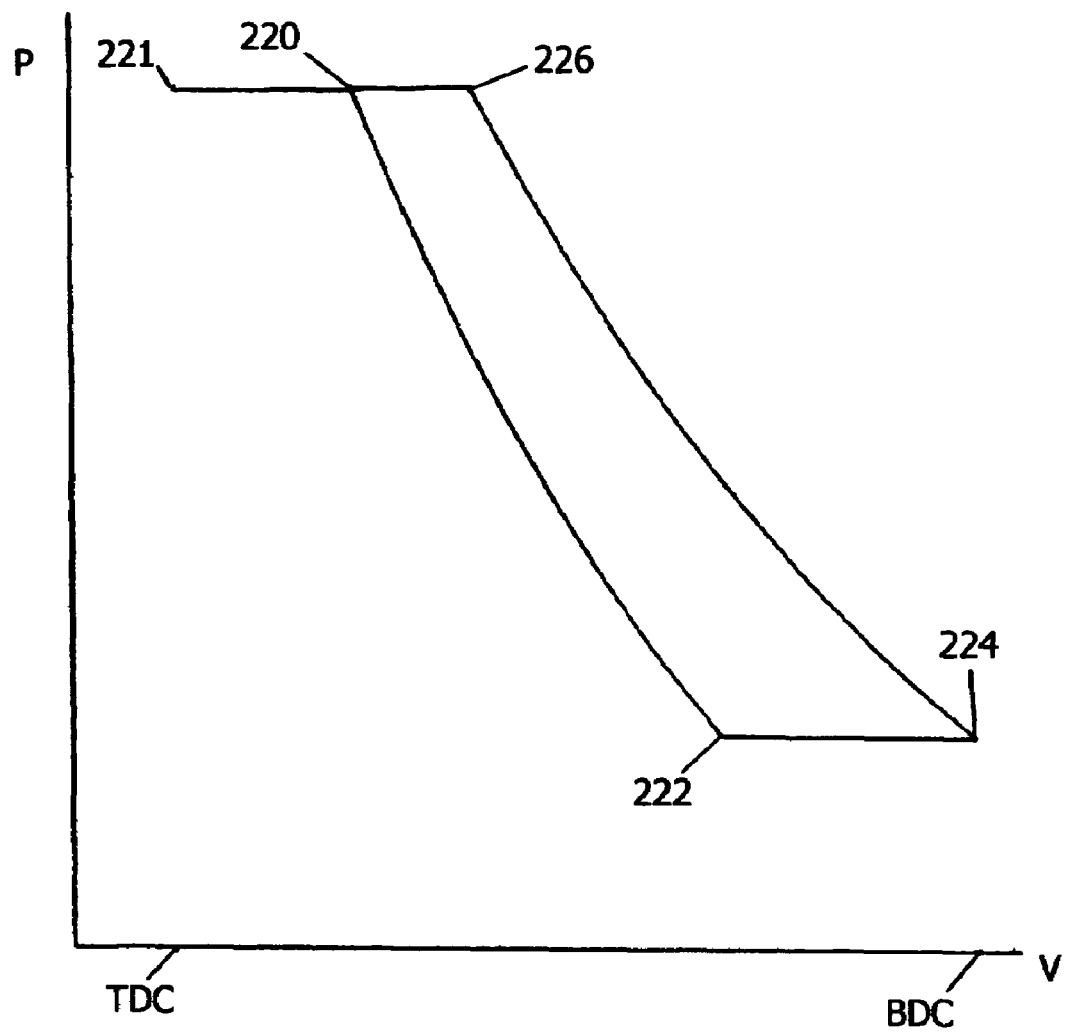
FIG. 8 is a pressure-volume diagram illustrating a single cycle of compression braking in one of the secondary engine cylinders.
Figure 7:
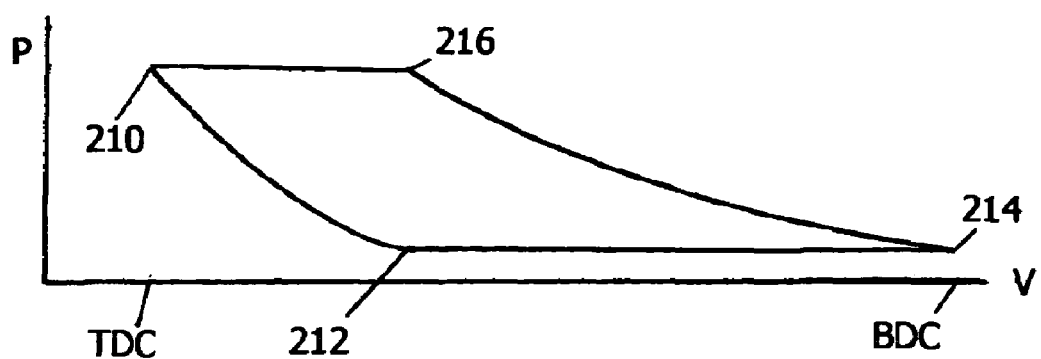
FIG. 7 is a pressure-volume diagram illustrating a single cycle of compression braking in one of the primary engine cylinders.

A more detailed insight into the above-described compression braking process and its control can be acquired by examining a pressure-volume diagram of its cycle. Pressure-volume diagrams are frequently used to illustrate operation of reciprocating-piston machinery. Each diagram is a plot of pressure inside a cylinder as a function of the cylinder chamber volume, which varies with change in piston position. FIGS. 7 and 8 show pressure-volume diagrams, each illustrating a single cycle of compression braking in one of the primary and one of the secondary engine cylinders, respectively. In each diagram, the cylinder chamber volume and the pressure are plotted along the horizontal and vertical axes, respectively. The pressure and volume axes in each diagram are labeled by letters P and V, respectively. The minimum volume at the top-dead-center and the maximum volume at the bottom-dead-center are marked on the horizontal axes by labels TDC and BDC, respectively. Each is an idealized diagram that assumes instantaneous valves opening and closing, and instantaneous air filling into and discharge from the cylinder chamber.

A typical pressure-volume diagram of compression braking cycle taking place in primary cylinder 12 (FIG. 6) is shown in FIG. 7. From a point 210 to a point 212, all valves are closed, and the fraction of the air-charge, left in cylinder chamber 20 from the previous cycle, expands, preferably until its pressure drops to the level of pressure in intake system 42 (FIG. 6) at point 212. This period takes place during a first part of the volume-increasing stroke.

First valve 24 (FIG. 6) opens at variable point 212 and later closes at a variable point 214. During this period, atmospheric air is received into cylinder chamber 20 (FIG. 6) at constant pressure. This process takes place during a second part of the volume-increasing stroke.

From point 214 to a variable point 216, all valves are closed, and the air charge is compressed until its pressure becomes equal to pressure in transfer conduit 106 (FIG. 6). This takes place during a first part of the volume-decreasing stroke.

At point 216, second valve 26 (FIG. 6) opens and remains open until its closure at point 210. From point 216 to point 210, air is displaced from cylinder chamber 20 into transfer conduit 106 at nearly constant pressure. This process takes place during a second part of the volume-decreasing stroke.

A typical pressure-volume diagram of compression braking cycle taking place in secondary cylinder 72 is shown in FIG. 8. From a point 220 to a point 222, all valves are closed, and the fraction of the air-charge, left in the cylinder chamber from the previous cycle, expands, preferably until its pressure becomes equal to pressure in transfer conduit 106 (FIG. 6). This process takes place during a second part of the volume-increasing stroke.

First valve 84 (FIG. 6) opens at variable point 222 and later closes at a variable point 224. During this period, previously compressed air is received from transfer conduit 106 into cylinder chamber 80 (FIG. 6) at approximately constant pressure. This period takes place during a third part of the volume-increasing stroke.

From point 224 to a variable point 226, all valves are closed, and the air-charge is compressed until its pressure becomes equal to pressure in compressed-air reservoir 46 (FIG. 6). This takes place during a first part of the volume-decreasing stroke.

At point 226, second valve 86 (FIG. 6) opens and remains open until its closure at point 220, which is already after the top-dead-center. From point 226 to a point 221, air is displaced from cylinder chamber 80 into compressed-air reservoir 46 (FIG. 46) at nearly constant pressure. This process takes place during a second part of the volume-decreasing stroke.

From point 221 to point 220 the engine piston is already on its downstroke, and some of the air displaced into compressed-air reservoir 46 flows back into the cylinder chamber. This takes place during a first part of the volume-increasing stroke. The net volume of air displaced into compressed-air reservoir 46 is equal to the difference between the volume expelled out of cylinder 72 between points 226 and 221 and the volume returning back into cylinder 72 between points 221 and 220. This permits longer duration of valve opening for more effective opening and closing of valve 86.

2. Single-Stage Compression Braking

Figure 9:
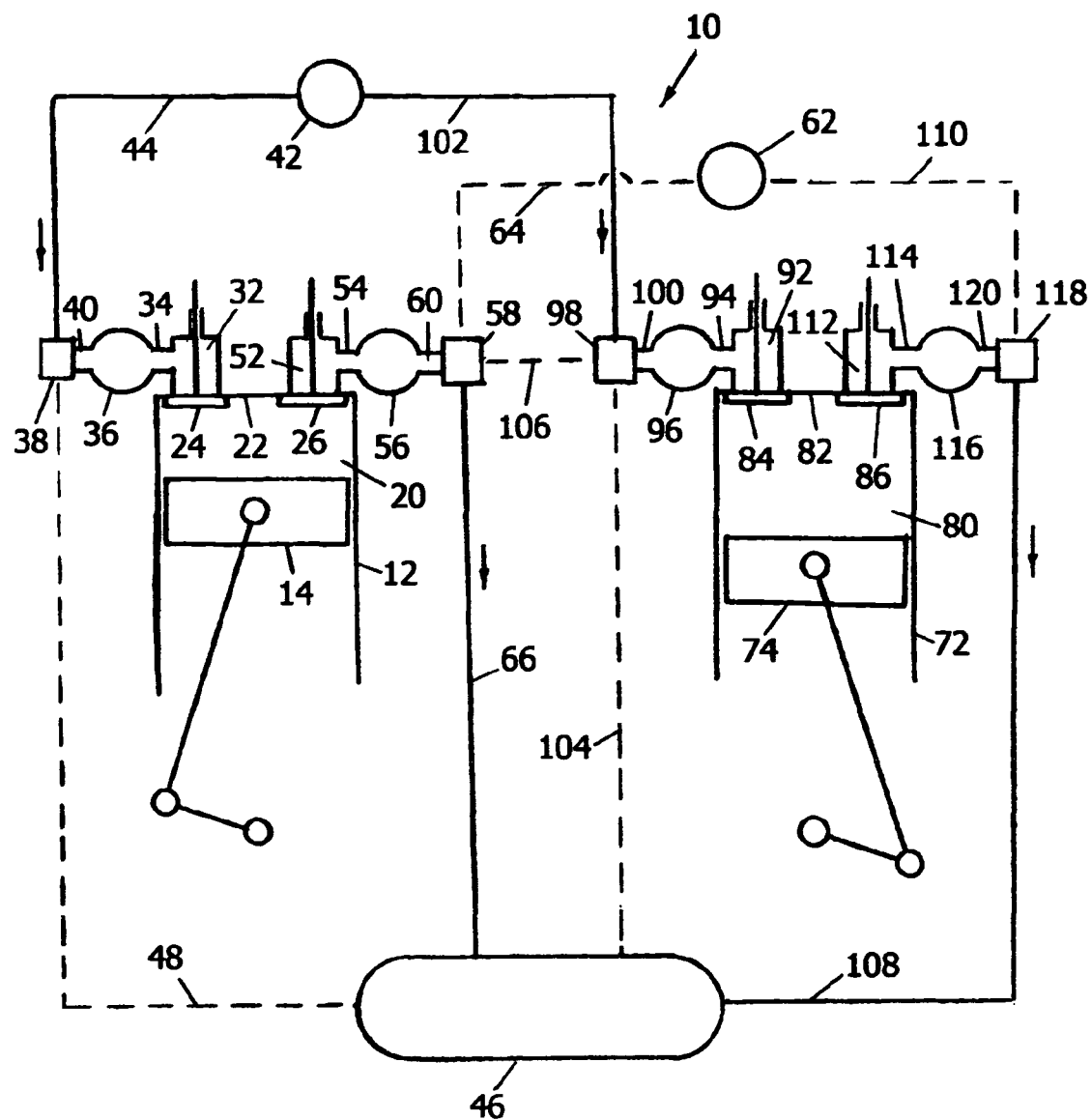
FIG. 9 is a schematic diagram illustrating the engine operation in the single-stage compression-braking mode.

FIG. 9 is a schematic diagram illustrating the engine operation in the single-stage compression-braking mode. In the drawing, the ducts carrying the airflow are shown in solid lines, while the ducts not carrying the airflow are shown in dashed lines. Arrows in the drawing show the overall direction of the airflow. The engine operates as a single-stage compressor, and both primary and secondary cylinders operate in identical manner.

Control system 122 sets the connections of the engine switching arrangements into a specific pattern required for operation in the single-stage compression-braking mode. Switching arrangement 38 is connected to duct 44 and disconnected from duct 48. Switching arrangement 58 is connected to duct 66 and disconnected from duct 64 and transfer conduit 106. Switching arrangement 98 is connected to duct 102 and disconnected from transfer conduit 106 and duct 104. Switching arrangement 118 is connected to duct 108 and disconnected from duct 110.

During each two-stroke cycle in primary cylinder 12, piston 14 performs a volume-increasing stroke, when it moves away from cylinder head 22, followed by a volume-decreasing stroke, when it moves towards cylinder head 22. During a first part of the volume-increasing stroke, both first and second valves, 24 and 26, remain closed, and expansion of residual air, left in cylinder chamber 20 after the previous cycle, takes place. During a second part of the volume-increasing stroke, first valve 24 is open, and primary cylinder 12 receives air from outside atmosphere. The air flows through intake system 42, duct 44, switching arrangement 38, passage 40, first primary manifold 36, first passage 34, first port 32, and through open first valve 24 into cylinder chamber 20. During a first part of the volume-decreasing stroke, both first and second valves, 24 and 26, remain closed, and compression of air trapped in cylinder chamber 20 takes place. During a second part of the volume-decreasing stroke, second valve 26 is open, and compressed air is expelled from primary cylinder 12 into air-reservoir 46. The air flows from cylinder chamber 20, through open second valve 26, second port 52, second passage 54, second primary manifold 56, passage 60, switching arrangement 58, and duct 66 into compressed-air reservoir 46.

During each two-stroke cycle in secondary cylinder 72, piston 74 performs a volume-increasing stroke, when it moves away from cylinder head 82, followed by a volume-decreasing stroke, when it moves towards cylinder head 82. During a first part of the volume-increasing stroke, both first and second valves, 84 and 86, remain closed, and expansion of residual air, left in cylinder chamber 80 after the previous cycle, takes place. During a second part of the volume-increasing stroke, first valve 84 is open, and secondary cylinder 72 receives air from outside atmosphere. The air flows through intake system 42, duct 102, switching arrangement 98, passage 100, first secondary manifold 96, first passage 94, first port 92, and through open first valve 84 into cylinder chamber 80. During a first part of the volume-decreasing stroke, both first and second valves, 84 and 86, remain closed, and compression of air trapped in cylinder chamber 80 takes place. During a second part of the volume-decreasing stroke, second valve 86 is open, and compressed air is expelled from secondary cylinder 72 into compressed-air reservoir 46. The air flows from cylinder chamber 80, through open second valve 86, second port 112, second passage 114, second secondary manifold 116, passage 120, switching arrangement 118, and duct 108 into compressed-air reservoir 46.

The pressure-volume diagram shown in FIG. 7 can be used to illustrate the operation of both primary and secondary cylinders in single-stage compression braking.

In primary cylinder 12, from point 210 to point 212, all valves are closed, and the fraction of the air-charge, left in cylinder chamber 20 from the previous cycle, expands, preferably until its pressure drops to the level of pressure in intake system 42 (FIG. 9) at point 212. This process takes place during a first part of the volume-increasing stroke.

First valve 24 (FIG. 9) opens at variable point 212 and later closes at variable point 214. During this period, atmospheric air is received into cylinder chamber 20 (FIG. 9) at approximately constant pressure. This period, takes place during a second part of the volume-increasing stroke.

From point 214 to variable point 216, all valves are closed, and the air-charge is compressed preferably until its pressure becomes equal to pressure in compressed-air reservoir 46 (FIG. 9). This takes place during a first part of the volume-decreasing stroke.

At point 216, second valve 26 (FIG. 9) opens and remains open until its closure at point 210. From point 216 to point 210, air is displaced from cylinder chamber 20 into compressed-air reservoir 46 at nearly constant pressure. This process takes place during a second part of the volume-decreasing stroke.

In secondary cylinder 72, from point 210 to point 212, all valves are closed, and the fraction of the air-charge, left in cylinder chamber 80 from the previous cycle, expands, preferably until its pressure drops to the level of pressure in intake system 42 (FIG. 9) at point 212. This process takes place during a first part of the volume-increasing stroke.

First valve 84 (FIG. 9) opens at variable point 212 and later closes at variable point 214. During this period, atmospheric air is received into cylinder chamber 80 (FIG. 9) at approximately constant pressure. This process, takes place during a second part of the volume-increasing stroke.

From point 214 to variable point 216, all valves are closed, and the air charge is compressed preferably until its pressure becomes equal to pressure in compressed-air reservoir 46 (FIG. 9). This takes place during a first part of the volume-decreasing stroke.

At point 216, second valve 86 (FIG. 9) opens and remains open until its closure at point 210. From point 216 to point 210, air is displaced from cylinder chamber 80 into compressed-air reservoir 46 at nearly constant pressure. This process takes place during a second part of the volume-decreasing stroke.

Control system 122 (FIG. 2) is programmed to control the process of compression braking in a manner, which assures that the process generates a braking force of required magnitude, as determined by the magnitude of the signal generated by sensor 123 (FIG. 2). The magnitude of the braking force produced by compression braking increases or decreases with an increase or a decrease, respectively, in the rate at which the engine uses energy when it operates as a compressor. Therefore the braking force increases or decreases with an increase or a decrease, respectively, in the net negative work-per-cycle performed by the piston in each of the engine cylinders participating in the compression-braking process. It also increases or decreases with an increase or a decrease, respectively, in frequency of the cycles repetition, and therefore it increases or decreases with an increase or a decrease, respectively, in the transmission ratio. Thus the braking force produced by compression braking can be varied by varying the work-per-cycle, or by varying the transmission ratio, or by varying both. It should be noted that, in this description, work-per-cycle is referred to as net negative work, if it produces a braking force. If, on the other hand, it produces a propulsion force, it is referred to as net positive work.

Thanks to operational flexibility offered by ability to quickly activate and deactivate the engine valves, the frequency of the cycles repetition can also be reduced, whenever needed, by selectively omitting some of the cycles. For example, the cycle can be performed once every other engine revolution, while during the in-between-cycle revolutions the valves are deactivated. This reduces the compression braking force in half, without any change in the work-per-cycle and the transmission ratio. Omission of some of the cycles is an additional method that the control system can use to control the magnitude of the braking force.

Compression braking is a preferable method for the braking force generation and control. However, if the compression braking can not produce the required braking force even at the maximum work-per-cycle and at the highest transmission ratio, control system 122 (FIG. 6) activates the vehicle friction brake system, which then works in-parallel with compression braking.

The above described process of compression braking, coupled with transfer of the compressed air into an air-reservoir, is a substantial improvement over conventional braking involving friction brakes, which absorb the kinetic energy of the vehicle and dissipate it as heat. It is also an improvement over other types of compression braking, in which the compressed air is exhausted into outside atmosphere. Instead, the energy of the vehicle motion is transformed into energy of compressed air and stored in the compressed-air reservoir. Later, the stored energy can be used to assist in vehicle propulsion and acceleration.

Using air as a medium for energy storage has a distinct advantage over using other media, since air, even when compressed to a high pressure, is very light. This reduces the weight of the hybrid system. In addition, compressing air in a cylinder and, then, reversing this event by expanding the air in the same cylinder of a fast operating engine is a very efficient process.

Another advantage of the above-described method of vehicle braking is reduced usage of friction brakes. This improves their reliability and extends their life, thus reducing the costs associated with their repair and replacement.

The two-stage compression braking has a distinct advantage in is its ability to absorb and store kinetic energy of the vehicle in a very small air reservoir. Thanks to a two-stage compression, the overall compression ratio of the air pumped into compressed-air reservoir 46 (FIG. 6) is equal to the compression ratio in a primary cylinder multiplied by the compression ratio in a secondary cylinder, thus greatly increasing the density of that air. In addition, the energy content in each gram of that air is much higher than in case of single-stage compression, thus reducing the overall mass of air needed to absorb the kinetic energy of the vehicle. This permits to achieve very high air pressures and reduce the required volume of the high-pressure air reservoir by as much as an order of magnitude, in comparison to an air reservoir required in a single-stage-compression system. A much smaller air-reservoir also weighs less, which contributes to a reduction in overall vehicle weight. A lighter vehicle consumes less fuel, which contributes to better fuel economy and a reduction in harmful exhaust emissions.

Reduction in the size of the air-reservoir offers a significant advantage in packaging the system, since it enables packaging it into any vehicle—even a very small one, such as a motorcycle. It also permits to successfully use the method and the system of the present invention in heavy trucks and buses, where the amount of kinetic energy, which needs to be absorbed during braking, is very large, without the need for excessively large air reservoir. On the other hand, in small vehicles, such as automobiles used for personal transportation, the required size of the air reservoir becomes so small that it can be integrated with the engine by becoming an integral part of the engine manifolds system. This eliminates the air reservoir as a stand-alone component of the vehicle and reduces the cost and complexity of the vehicle assembly.

Another distinct advantage of the two-stage compression braking is its ability to produce a peak compression-braking torque of a much greater magnitude than it is possible to achieve in a system using only a single-stage compression. This too is an especially important advantage in heavy trucks and buses, where, due to the huge vehicle mass, the required braking torque is very high. However, when the pressure in the compressed-air reservoir becomes very low, two-stage compression becomes less efficient, and use of the single-stage compression becomes appropriate.

The above description of compression braking emphasized an engine operating as a two-stage compressor. However, those skilled in art will appreciate that, with some modifications, the engine can also operate as a multi-stage compressor using three or a greater number of compression stages. While two compression stages are likely to be sufficient in most cases, the possibility of using a greater number of compression stages should not be precluded and should remain the prerogative of the system designer.

The work-per-cycle in each cylinder is a function of the timing of the engine valves openings and closings. These timings control various parameters contributing to the amount of work-per-cycle performed, such as the quantity of air received into the cylinder chamber, the ratio of air compression, the quantity of air displaced into the transfer conduit or into the compressed-air reservoir, and the ratio of residual air expansion.

In the primary cylinders, changing the timing of first valve 24 (FIG. 6) closing varies the quantity of air received from atmosphere. Changing the timing of second valve 26 opening varies the air compression ratio. Changing the timing of second valve 26 closing varies the quantity of compressed air displaced either into transfer conduit 106 or into compressed-air reservoir 46, depending on the mode of operation. Changing the timing of first valve 24 opening varies the residual-air expansion ratio.

In the secondary cylinders, changing the timing of first valve 84 (FIG. 6) closing varies the quantity of compressed air received either from transfer conduit 106 or from atmosphere, depending on the mode of operation. Changing the timing of second valve 86 opening varies the second stage compression ratio. Changing the timing of second valve 86 closing varies the quantity of compressed air displaced into compressed-air reservoir 46. Changing the timing of first valve 84 opening varies the residual-air expansion ratio.

Control system 122 (FIG. 2) controls and varies the braking force, produced by compression braking, by varying any, some, or all of the above valve timings and the transmission ratio according to a program contained in the control system software. In vehicles with manual transmission control, it is the vehicle driver who varies the transmission ratio.

Two-Stage Gas Expansion

FIG. 2 and FIGS. 10 to 14

The two-stage gas expansion is a vehicle propulsion mode intended to minimize the engine fuel consumption. When operating in the two-stage gas-expansion mode, some of the engine cylinders, the primary cylinders, perform a conventional internal combustion cycle. Other engine cylinders, the secondary cylinders, perform a two-stroke gas-expansion cycle. There is no pressure blowdown in the primary cylinders at the end of expansion stroke. Instead, the still pressurized combustion gas is transferred from the primary cylinders into the secondary cylinders. There, it is subjected to a second stage of expansion and exhausted into the exhaust system. Subjecting the gas to a second stage of expansion extracts an additional amount of useful energy. This increases the efficiency of the engine and reduces its fuel consumption.

The timing of opening and closing of the first valves in the secondary cylinders is such that the volume of gas received into the secondary cylinders, during two engine revolutions, is preferably not greater than the displacement of the primary cylinders. The displacement of an engine cylinder is equal to the cylinder volume less its clearance volume.

When operating in the two-stage gas-expansion mode, the engine can receive air either from the outside atmosphere or from the compressed-air reservoir. Accordingly, there are two types of the two-stage gas-expansion mode, a first one, in which air comes from outside atmosphere, and a second one, in which air comes from the compressed-air reservoir.

1. First Two-Stage Gas-Expansion Mode.

Figure 10:
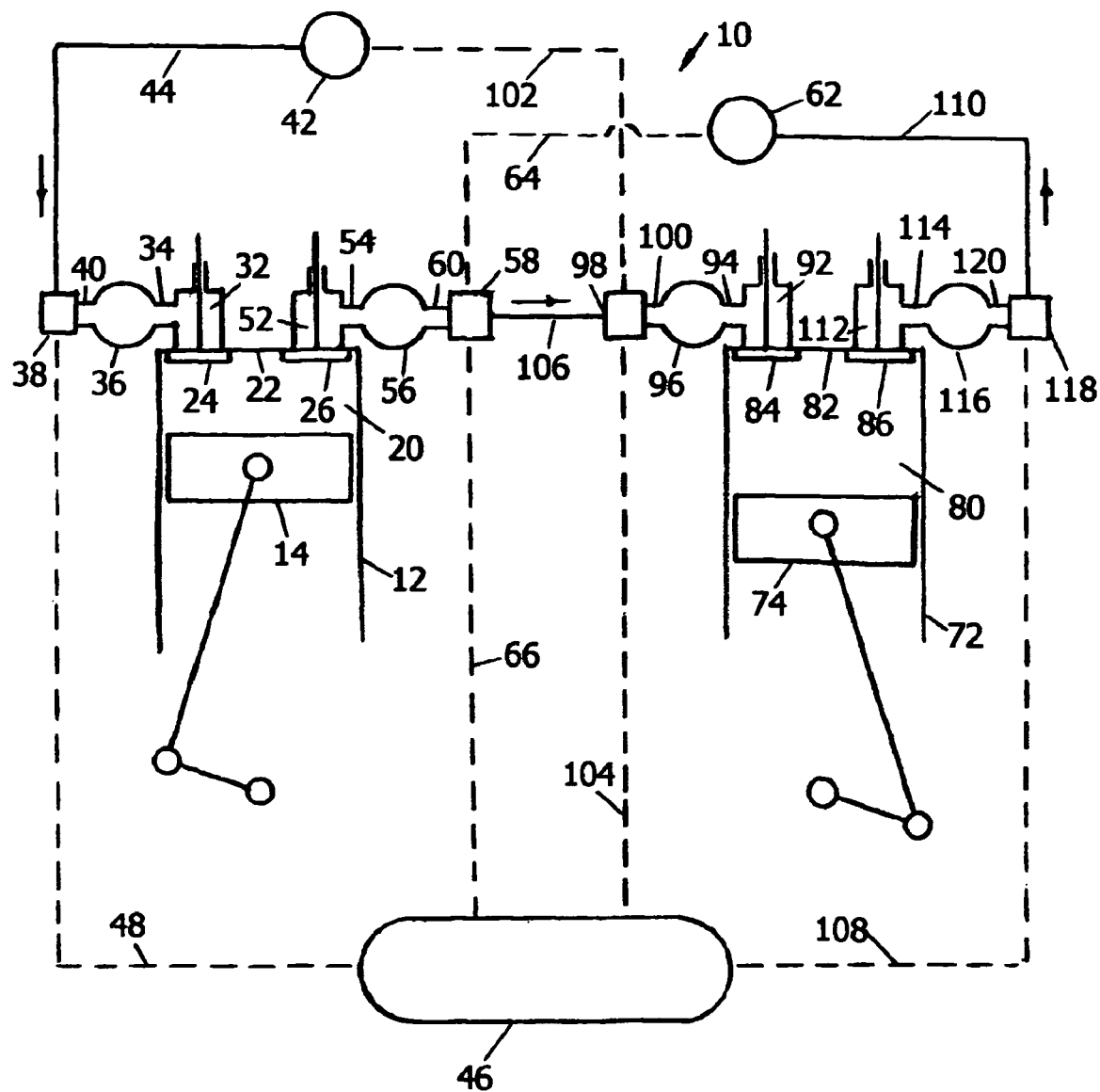
FIG. 10 is a schematic diagram illustrating the engine operation in the first two-stage gas-expansion mode.

FIG. 10 is a schematic diagram illustrating the engine operation in the first two-stage gas-expansion mode, with air coming to the engine from outside atmosphere. In the drawing, the ducts carrying the airflow and the gas flow are shown in solid lines, while the ducts not carrying the flow are shown in dashed lines. Arrows in the drawing show the overall direction of the air and gas flow.

Control system 122 (FIG. 2) sets the connections of the engine switching arrangements into a specific pattern required for operation in the first two-stage gas-expansion mode. Switching arrangement 38 is connected to duct 44 and disconnected from duct 48. Switching arrangement 58 is connected to transfer conduit 106 and disconnected from ducts 64 and 66. Switching arrangement 98 is connected to transfer conduit 106 and disconnected from ducts 102 and 104. Switching arrangement 118 is connected to duct 110 and disconnected from duct 108.

During each four-stroke cycle in primary cylinder 12, piston 14 performs a first volume-increasing stroke, when it moves away from cylinder head 22, followed by a first volume-decreasing stroke, when it moves towards cylinder head 22, followed by a second volume-increasing stroke, and followed by a second volume-decreasing stroke. During the first volume-increasing stroke, first valve 24 is open, while the second valve 26 remains closed, and air intake from outside atmosphere takes place. The air flows through intake system 42, duct 44, switching arrangement 38, passage 40, first primary manifold 36, first passage 34, first port 32, and through open first valve 24 into cylinder chamber 20. Fuel is added to the air either before or after its entrance into cylinder 12. During the first volume-decreasing stroke, both first and second valves, 24 and 26, remain closed, and compression of air trapped in cylinder chamber 20 takes place. Ignition of the air/fuel mixture takes place close to the end of that stroke. During the second volume-increasing stroke, both first and second valves, 24 and 26, remain closed, and combustion of the air/fuel mixture and expansion of the combustion gas takes place in cylinder chamber 20. During a second volume-decreasing stroke, second valve 26 is open, and pressurized combustion gas is expelled from primary cylinder 12 into transfer conduit 106. The gas flows from cylinder chamber 20, through open second valve 26, second port 52, second passage 54, second primary manifold 56, passage 60, and switching arrangement 58 into transfer conduit 106. Each four-stroke cycle lasts two engine revolutions.

Secondary cylinder 72 operates in a two-stroke cycle. During each two-stroke cycle piston 74 performs a volume-increasing stroke, when it moves away from cylinder head 82, followed by a volume-decreasing stroke, when it moves towards cylinder head 82. During a first part of the volume-increasing stroke, first valve 84 is open, and secondary cylinder 72 receives pressurized combustion gas from transfer conduit 106. The gas flows through switching arrangement 98, passage 100, first secondary manifold 96, first passage 94, first port 92, and through open first valve 84 into cylinder chamber 80. During a second part of the volume-increasing stroke, both first and second valves, 84 and 86, remain closed, and a second expansion of the combustion gas takes place in cylinder chamber 80. During the volume-decreasing stroke, second valve 86 is open, and exhaust of combustion gas from secondary cylinder 72 into exhaust system 62 takes place. The gas flows from cylinder chamber 80, through open second valve 86, second port 112, second passage 114, second secondary manifold 116, passage 120, switching arrangement 118, and duct 110 into exhaust system 62. Two two-stroke cycles in cylinder 72 take place during time it takes for one four-stroke cycle in cylinder 12.

Figure 11:
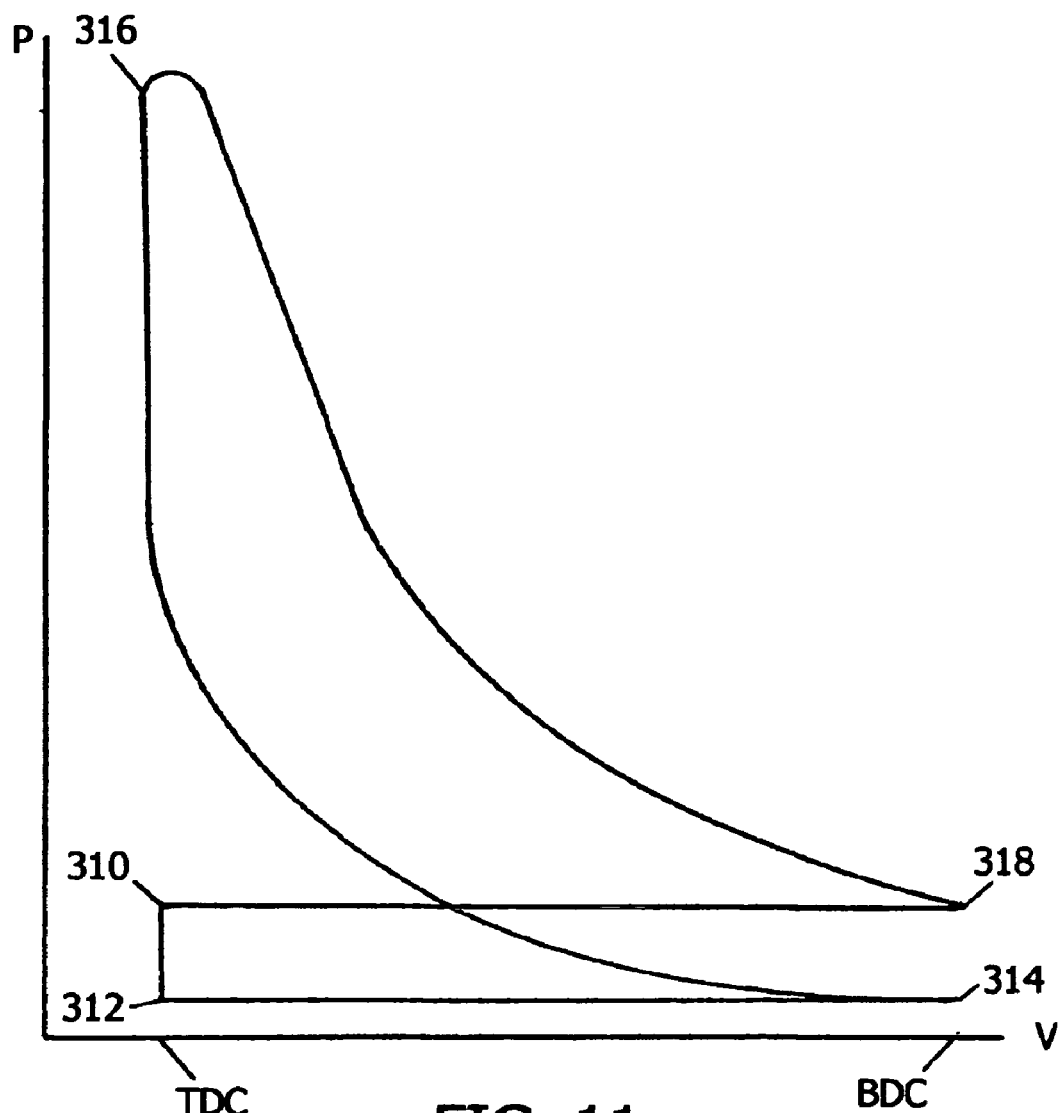
FIG. 11 is a pressure-volume diagram illustrating the four-stroke internal-combustion cycle taking place in a primary cylinder in the first two-stage gas-expansion mode.
Figure 12:
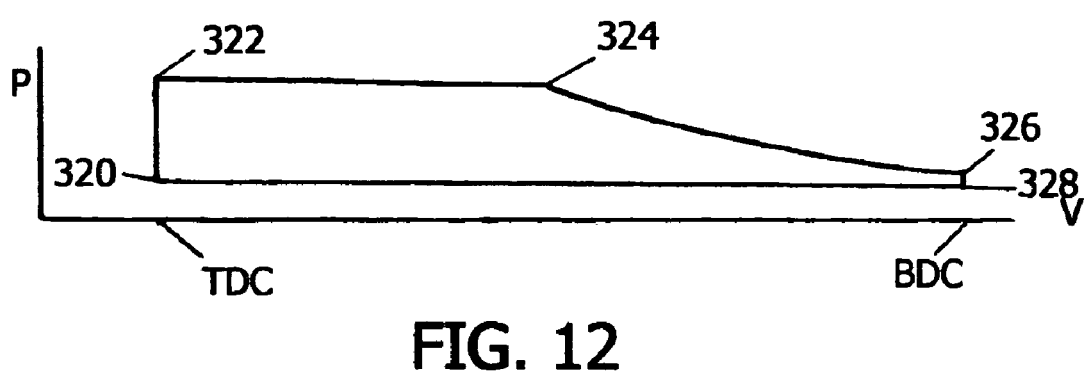
FIG. 12 is a pressure-volume diagram illustrating the two-stroke gas-expansion cycle taking place in a secondary cylinder in the first two-stage gas-expansion mode.

The above described first two-stage gas-expansion mode using air from outside atmosphere is further illustrated in pressure-volume diagrams in FIGS. 11 and 12. FIG. 11 illustrates the four-stroke internal-combustion cycle taking place in primary cylinder 12 (FIG. 10). First valve 24 (FIG. 10) opens at a point 310, and from point 310 to a point 312 pressure in cylinder chamber 20 (FIG. 10) drops to the level of pressure in intake system 42 (FIG. 10). From point 312 to a point 314, first valve 24 remains open, and cylinder chamber 20 receives air from intake system 42. This takes place during a first volume-increasing stroke. Fuel can be added to the air before or after the air enters the cylinder, depending on the type of the engine.

At point 314, first valve 24 closes, and from point 314 to a point 316, all valves are closed. Air compression, air/fuel mixture formation, and ignition take place during that period. This process takes place during a first volume-decreasing stroke.

From point 316 to a point 318, all valves are still closed, and combustion and combustion-gas expansion is performed. This takes place during a second volume-increasing stroke.

At point 318, second valve 26 (FIG. 10) opens and remains open until its closure at point 310. During that period, pressurized combustion gas is expelled from cylinder chamber 20 into transfer conduit 106 (FIG. 10). This takes place during a second volume-decreasing stroke.

Pressure-volume diagram in FIG. 12 further illustrates the two-stroke gas-expansion cycle taking place in secondary cylinder 72 (FIG. 10). First valve 84 (FIG. 10) opens at a point 320, and from point 320 to a point 322 pressure in cylinder chamber 80 (FIG. 10) rises to the level of pressure in transfer conduit 106 (FIG. 10). From point 322 to a point 324, first valve 84 remains, open, and cylinder chamber 80 receives pressurized combustion gas from transfer conduit 106. This takes place during a first part of the volume-increasing stroke.

At point 324, first valve 84 closes, and from point 324 to a point 326, all valves are closed.

A second stage of combustion-gas expansion takes place during that period. This process takes place during a second part of the volume-increasing stroke.

At point 326, second valve 86 (FIG. 10) opens and remains open until its closure at point 320. From point 326 to a point 328, gas pressure drops to the level of pressure in exhaust system 62 (FIG. 10). Then, from point 328 to point 320, the twice-expanded combustion gas is expelled from cylinder chamber 80 into exhaust system 62 (FIG. 10). This takes place during a volume-decreasing stroke.

The above-described pressure-volume diagrams illustrate ideal cycles, in which opening and closing of the valves and filling and emptying of the cylinders take place instantaneously. In real cycles, timing of valve opening and closing must be optimized for best filling and emptying of the cylinders.

2. Second Two-Stage Gas-Expansion Mode.

Figure 13:
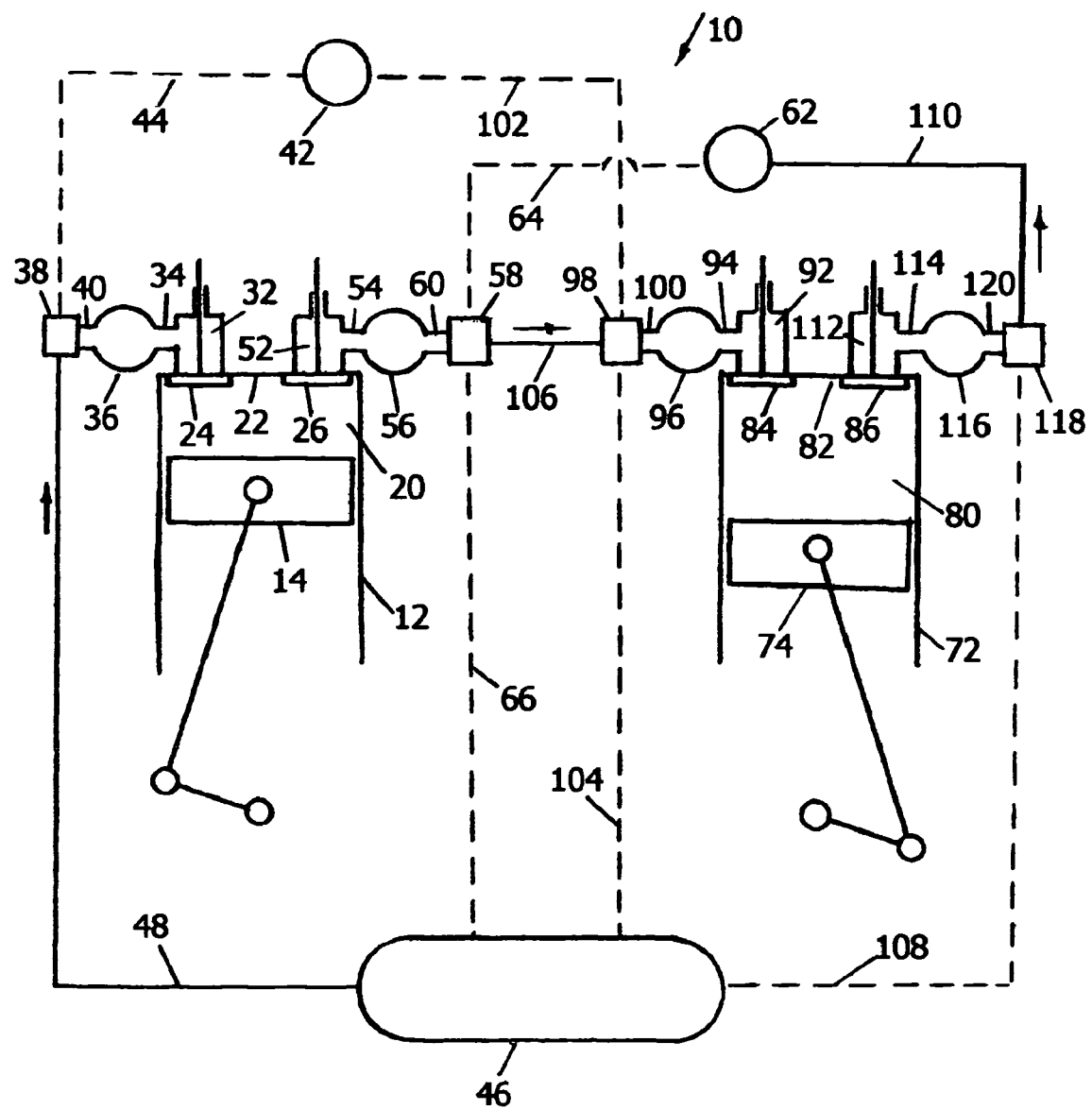
FIG. 13 is a schematic diagram illustrating the engine operation in the second two-stage gas-expansion mode.

FIG. 13 is a schematic diagram illustrating the engine operation in the second two-stage gas-expansion mode, with air coming to the engine from a compressed-air reservoir. In the drawing, the ducts carrying the airflow and the gas flow are shown in solid lines, while the ducts not carrying the flow are shown in dashed lines. Arrows in the drawing show the overall direction of the air and gas flow.

Control system 122 (FIG. 2) sets the connections of the engine switching arrangements into a specific pattern required for operation in the second two-stage gas-expansion mode receiving air from compressed-air reservoir. Switching arrangement 38 is connected to duct 48 and disconnected from duct 44. Switching arrangement 58 is connected to transfer conduit 106 and disconnected from ducts 64 and 66. Switching arrangement 98 is connected to transfer conduit 106 and disconnected from ducts 102 and 104. Switching arrangement 118 is connected to duct 110 and disconnected from duct 108.

During each four-stroke cycle in primary cylinder 12, piston 14 performs a first volume-increasing stroke, when it moves away from cylinder head 22, followed by a first volume-decreasing stroke, when it moves towards cylinder head 22, followed by a second volume-increasing stroke, and followed by a second volume-decreasing stroke. During the first part of the first volume-increasing stroke, first valve 24 is open, while the second valve 26 remains closed, and compressed air is received from compressed-air reservoir 46 into cylinder chamber 20. The air flows through duct 48, switching arrangement 38, passage 40, first primary manifold 36, first passage 34, first port 32, and through open first valve 24 into cylinder chamber 20. Fuel is added to the air either before or after its entrance into cylinder 12. During a second part of the first volume-increasing stroke, both first and second valves, 24 and 26, are closed, and expansion of compressed air takes place in cylinder chamber 20. During the first volume-decreasing stroke, both first and second valves, 24 and 26, remain closed, and compression of air trapped in cylinder chamber 20 takes place. Ignition of the air/fuel mixture takes place close to the end of that stroke. During the second volume-increasing stroke, both first and second valves, 24 and 26, remain closed, and combustion of the air/fuel mixture and expansion of the combustion gas takes place in cylinder chamber 20. During a first part of the second volume-decreasing stroke, second valve 26 is open, and pressurized combustion gas is expelled from primary cylinder 12 into transfer conduit 106. The gas flows from cylinder chamber 20, through open second valve 26, second port 52, second passage 54, second primary manifold 56, passage 60, and switching arrangement 58 into transfer conduit 106. During a second part of the second volume-decreasing stroke, second valve is closed, and a certain amount of residual combustion gas is trapped in cylinder chamber 20. Each four-stroke cycle lasts two engine revolutions.

Secondary cylinder 72 operates in a two-stroke cycle. During each two-stroke cycle piston 74 performs a volume-increasing stroke, when it moves away from cylinder head 82, followed by a volume-decreasing stroke, when it moves towards cylinder head 82. During a first part of the volume-increasing stroke, first valve 84 is open, and secondary cylinder 72 receives pressurized combustion gas from transfer conduit 106. The gas flows through switching arrangement 98, passage 100, first secondary manifold 96, first passage 94, first port 92, and through open first valve 84 into cylinder chamber 80. During a second part of the volume-increasing stroke, both first and second valves, 84 and 86, remain closed, and a second expansion of the combustion gas takes place in cylinder chamber 80. During the volume-decreasing stroke, second valve 86 is open, and exhaust of combustion gas from secondary cylinder 72 into exhaust system 62 takes place. The gas flows from cylinder chamber 80, through open second valve 86, second port 112, second passage 114, second secondary manifold 116, passage 120, switching arrangement 118, and duct 110 into exhaust system 62. Two two-stroke cycles in cylinder 72 take place during time it takes for one four-stroke cycle in cylinder 12.

Figure 14:
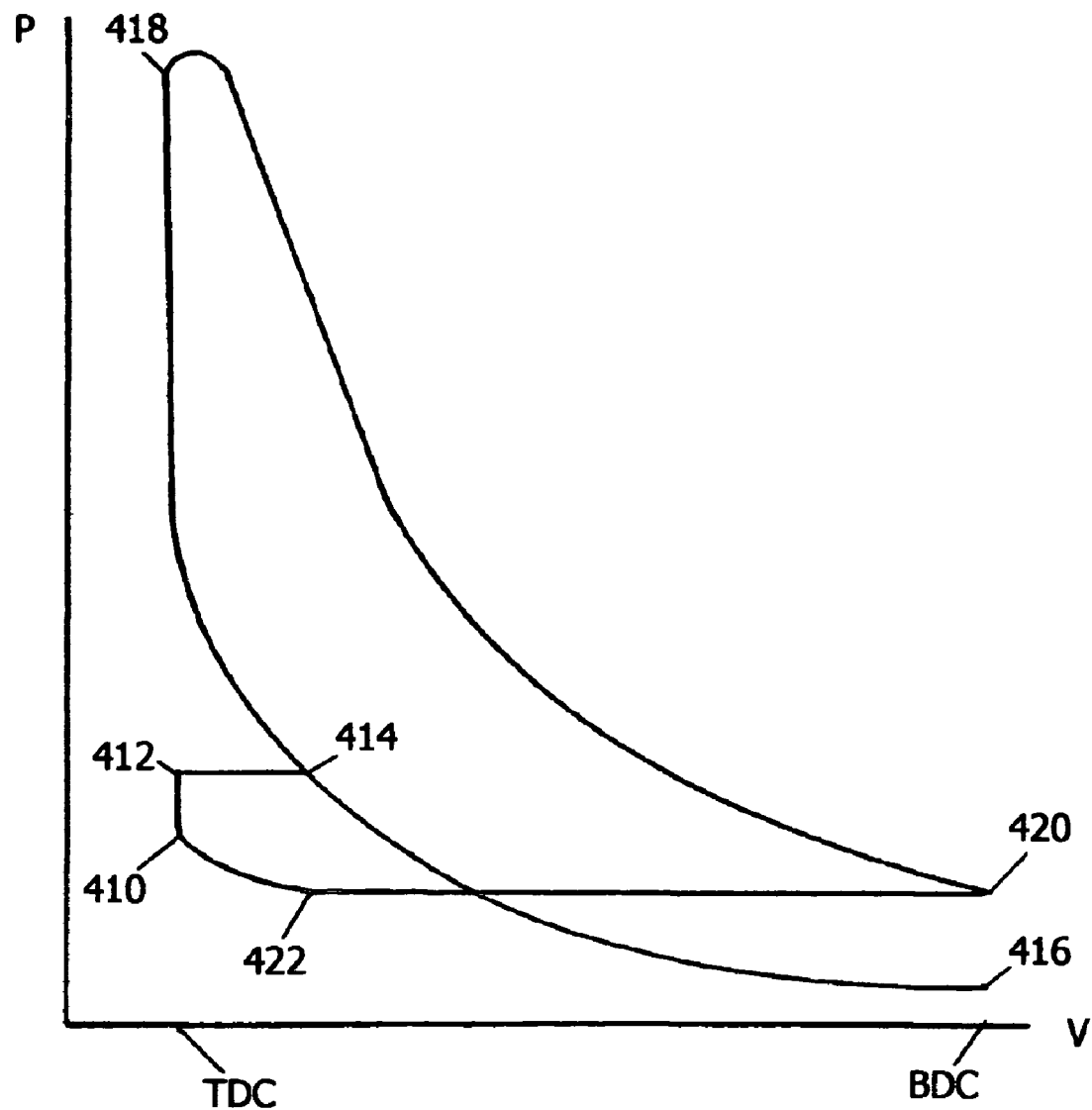
FIG. 14 is a pressure-volume diagram illustrating the four-stroke internal-combustion cycle taking place in a primary cylinder in the second two-stage gas-expansion mode.

A pressure-volume diagram in FIG. 14 further illustrates the four-stroke internal-combustion cycle taking place in primary cylinder 12 (FIG. 13). First valve 24 (FIG. 13) opens at a point 410, and from point 410 to a point 412 pressure in cylinder chamber 20 (FIG. 13) rises to the level of pressure in compressed-air reservoir 46 (FIG. 13). From point 412 to a point 414, first valve 24 remains open, and cylinder chamber 20 receives air from compressed-air reservoir 46. This takes place during a first part of the first volume-increasing stroke. Fuel can be added to the air before or after the air enters the cylinder, depending on the type of the engine.

At point 414, first valve 24 closes, and from point 414 to a point 416, all valves are closed, and air expansion takes place in cylinder chamber 20 (FIG. 13). This takes place during a second part of the first volume-increasing stroke.

At point 416, first valve 24 closes, and from point 416 to a point 418, all valves are closed. Air compression, air/fuel mixture formation, and ignition take place during that period. This process takes place during a first volume-decreasing stroke.

From point 418 to a point 420, all valves are still closed, and combustion and combustion-gas expansion is performed. This takes place during a second volume-increasing stroke.

At point 420, second valve 26 (FIG. 13) opens and remains open until its closure at a point 422. During that period, pressurized combustion gas is expelled from cylinder chamber 20 into transfer conduit 106 (FIG. 13). This takes place during a first part of the second volume-decreasing stroke.

From point 422 to point 410, all valves are closed, and a certain amount of residual combustion gas is trapped and compressed in cylinder chamber 20. This takes place during a second part of the second volume-decreasing stroke.

The pressure-volume diagram in FIG. 12 can be used to illustrate the two-stroke gas-expansion cycle taking place in secondary cylinder 72 (FIG. 13). First valve 84 (FIG. 13) opens at a point 320, and from point 320 to a point 322 pressure in cylinder chamber 80 (FIG. 13) rises to the level of pressure in transfer conduit 106 (FIG. 13). From point 322 to a point 324, first valve 84 remains open, and cylinder chamber 80 receives pressurized combustion gas from transfer conduit 106. This takes place during a first part of the volume-increasing stroke.

At point 324, first valve 84 closes, and from point 324 to a point 326, all valves are closed. A second stage of the combustion-gas expansion takes place during that period. This process takes place during a second part of the volume-increasing stroke.

At point 326, second valve 86 (FIG. 13) opens and remains open until its closure at point 320. From point 326 to a point 328, gas pressure drops to the level of pressure in exhaust system 62 (FIG. 13). Then, from point 328 to point 320, the twice-expanded combustion gas is expelled from cylinder chamber 80 into exhaust system 62 (FIG. 13). This takes place during a volume-decreasing stroke.

Control system 122 (FIG. 2) is programmed to control the two-stage gas-expansion operation in a manner that assures that the process generates a propulsion force of required magnitude, as determined by the magnitude of the signal generated by sensor 121 (FIG. 2). The magnitude of the propulsion force increases or decreases with an increase or a decrease, respectively, in the net positive work-per-cycle performed on the piston in each of the engine cylinders. It also depends on frequency with which the cycles are repeated, and therefore it increases or decreases with an increase or a decrease, respectively, in the transmission ratio. Thus, the propulsion force can be varied by varying the work-per-cycle, or by varying the transmission ratio, or by varying both.

In the first two-stage gas-expansion mode, the work-per-cycle is determined by work performed by combustion gas in both the primary and secondary cylinders. This work depends on the quantity of fuel added to the air in primary cylinder 12 (FIG. 10). Thus, the work-per-cycle can be varied by varying the quantity of fuel added to the air in primary cylinder 12. Control system 122 (FIG. 2) controls the propulsion force by varying the quantity of fuel delivered into primary cylinder 12 and by varying the transmission ratio according to a program contained in the control system software. In vehicles with manual transmission control, it is the vehicle driver who varies the transmission ratio.

In the second two-stage gas-expansion mode, two key contributors to the work-per-cycle are work performed by compressed air in the primary cylinder and work performed by combustion gas in the primary and secondary cylinders. Work performed by compressed air is a function of the timing of opening and closing of first valve 24 in primary cylinder 12 (FIG. 13), which determine the quantity of air received into primary cylinder 12. Work performed by combustion gas depends on the quantity of fuel added to the air in the primary cylinder. Thus, the work-per-cycle can be varied by varying three parameters: timings of first valve 24 opening and closing, and the quantity of fuel added to the air charge. Control system 122 (FIG. 2) controls the propulsion force by varying any, some, or all of the above parameters and by varying the transmission ratio according to a program contained in the control system software. In vehicles with manual transmission control, it is the vehicle driver who varies the transmission ratio.

The transfer conduit is a key component of the system, and its design strongly influences the system efficiency. To minimize loss of heat, during gas transfer, the transfer conduit should be well insulated. It is also desirable that the length and the flow area of the transfer conduit be calculated and optimized for best ram effect in charging the secondary cylinders. A ram effect takes advantage of kinetic energy of gas, flowing into a cylinder, to improve filling the cylinder with that gas.

The two-stage gas-expansion operation offers significant advantages in fuel economy and exhaust emissions when only a fraction of full engine power is required. It involves shutting down fuel delivery to the secondary cylinders and employing them to perform a second expansion of the combustion gas produced in the primary cylinders. The second expansion extracts additional useful energy from the combustion gas, in addition to the energy extracted from the gas during its first expansion in the primary cylinders. As a result, the engine operates with an exceptionally high thermodynamic efficiency, and its fuel consumption is substantially reduced. An improvement in fuel consumption leads to reduced emission of harmful exhaust pollutants.

The number of primary cylinders, in the engine, may be equal to or it may be unequal to the number of secondary cylinders. The ratio of the number of secondary cylinders to the number of primary cylinders influences the overall effective expansion ratio of the combustion gas. If the number of primary cylinders is equal to the number of secondary cylinders, a secondary cylinder takes in, during each two-stroke cycle, about half of what a primary cylinder has displaced. The intake of gas into the secondary cylinder takes place during a first part of the piston volume-increasing stroke. During the second part of the same stroke, the second gas expansion takes place. Therefore an additional 2:1 gas expansion takes place in the secondary cylinder, and the overall expansion ratio of combustion gas is doubled. If the geometric expansion ratio in the primary cylinder is 10:1, the overall effective expansion ratio becomes 20:1. Even greater increase in the expansion ratio can be achieved if the number of primary cylinders is smaller than the number of secondary cylinders. For example, if an engine operates with three primary cylinders and five secondary cylinders, a secondary cylinder takes in, during each two-stroke cycle, only about 300% of what a primary cylinder has displaced during a four-stroke cycle. Hence the resulting increase in the gas expansion ratio is 3.3:1, and the overall effective expansion ratio becomes 33:1. If an engine has two primary cylinders and four secondary cylinders, the increase in the gas expansion ratio is 4:1, and the overall effective expansion ratio becomes 40:1. This means that the expansion of the combustion gas can be extended to a level, at which the gas pressure drops to atmospheric pressure. Since the thermodynamic efficiency of an engine improves with an increase in the expansion ratio, the very substantial increase in expansion ratio, which can be achieved in the above described engine, leads to a very substantial improvement in the engine fuel consumption.

The above cited values of expansion ratios are approximate. A precise value of the gas expansion ratio in a secondary cylinder depends on the mass of residual gas retained in the cylinder clearance volume. Depending on that mass, the expansion ratio, in each case, may be slightly higher or slightly lower than the above cited value.

The above described engine operates with electronically controlled valves. In such engine, the ratio of the number of secondary cylinders to the number of primary cylinders can be changed during engine operation. At very light engine load, a smaller number of primary cylinders may be sufficient to achieve the required engine torque. At higher load, a greater number of primary cylinders may be needed. The control system can change the ratio of the number of secondary cylinders to the number of primary cylinders as a function of the required engine load in accordance with its program. This means that the engine overall expansion ratio can be varied and optimized for best engine performance and fuel consumption during each engine operating condition.

Another factor contributing to improved fuel economy is the fact that, in the two-stage gas-expansion mode, operation of the primary cylinders is switched from a relatively light load to a heavy-load operation, where the efficiency of the engine operation is generally higher. This effect is especially pronounced in case of spark-ignition engines, which suffer from a substantial energy loss due to throttling of intake air during part-load operation. Switching operation of the primary cylinders to heavier loads leads to a substantial reduction in intake air throttling. This further reduces the fuel consumption.

The two-stage gas-expansion operation is especially effective when a vehicle is cruising on a highway with approximately constant speed. Such operation usually requires only a fraction of the full engine power and thus it is well suited for application of the two-stage gas expansion. This can lead to a substantial reduction in amount of fuel consumed by trucks and cars traveling long distances on inter-state highways.

Air-Power-Assisted Mode

FIGS. 2, 5B, 13, and FIGS. 15 to 17

The air-power-assisted mode is a vehicle propulsion mode, in which the engine receives air from the compressed-air reservoir and takes advantage of its potential energy, but there is no second stage of combustion-gas expansion ratio. In this mode, the engine can achieve a significant fuel consumption improvement and, in addition, it should be able to produce a higher torque and lower exhaust emission.

When operating in the air-power-assisted mode, the air received from the compressed-air reservoir can be subjected either to a single-stage or to a two-stage expansion. Accordingly, there are two types of the air-power assisted mode: a first one, with a single-stage air expansion; and a second one, with a two-stage air expansion.

1. First Air-Power-Assisted Mode.

Figure 15:
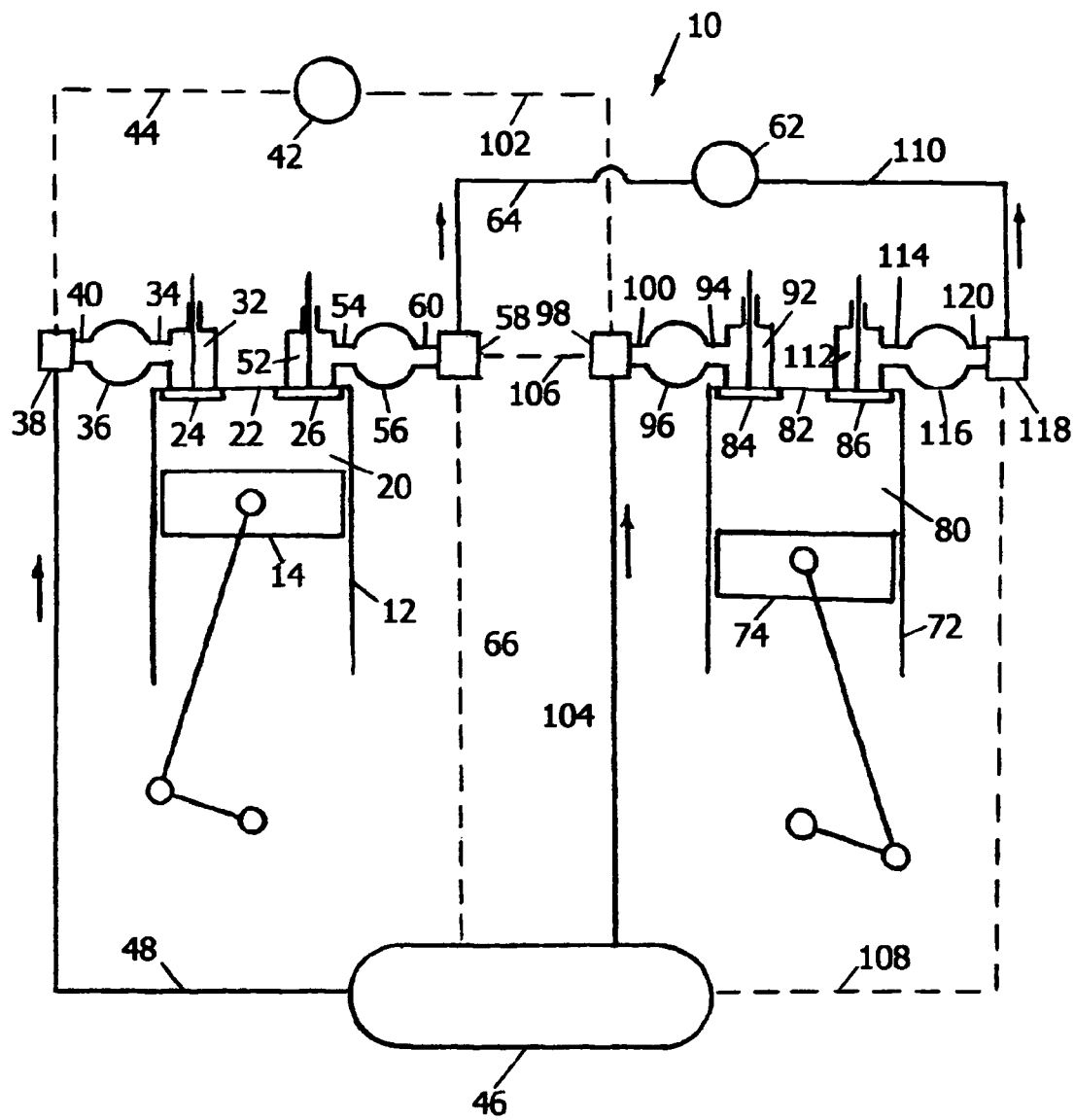
FIG. 15 is a schematic diagram illustrating the engine operation in the first air-power-assisted mode with a single-stage air expansion.

FIG. 15 is a schematic diagram illustrating the engine operation in the first air-power-assisted mode with a single-stage air expansion. In the drawing, the ducts carrying the airflow and the gas flow are shown in solid lines, while the ducts not carrying the flow are shown in dashed lines. Arrows in the drawing show the overall direction of the air and gas flow.

Control system 122 sets the connections of the engine switching arrangements into a specific pattern required for operation in the first air-power-assisted mode. Switching arrangement 38 is connected to duct 48 and disconnected from duct 44. Switching arrangement 58 is connected to duct 64 and disconnected from duct 66 and transfer conduit 106. Switching arrangement 98 is connected to duct 104 and disconnected from transfer conduit 106 and duct 102. Switching arrangement 118 is connected to duct 110 and disconnected from duct 108.

During each four-stroke cycle in primary cylinder 12, piston 14 performs a first volume-increasing stroke, when it moves away from cylinder head 22, followed by a first volume-decreasing stroke, when it moves towards cylinder head 22, followed by a second volume-increasing stroke, and followed by a second volume-decreasing stroke. During the first part of the first volume-increasing stroke, first valve 24 is open, while the second valve 26 remains closed, and compressed air is received from compressed-air reservoir 46 into cylinder chamber 20. The air flows through duct 48, switching arrangement 38, passage 40, first primary manifold 36, first passage 34, first port 32, and through open first valve 24 into cylinder chamber 20. Fuel is added to the air either before or after its entrance into cylinder 12. During the second part of the first volume increasing stroke, both first and second valves, 24 and 26, are closed, and expansion of compressed air takes place in cylinder chamber 20. During the first volume-decreasing stroke, both first and second valves, 24 and 26, remain closed, and compression of air trapped in cylinder chamber 20 takes place. Ignition of the air/fuel mixture takes place close to the end of that stroke. During the second volume-increasing stroke, both first and second valves, 24 and 26, remain closed, and combustion of the air/fuel mixture and expansion of the combustion gas takes place in cylinder chamber 20. During a first part of the second volume-decreasing stroke, second valve 26 is open, and combustion gas is expelled from primary cylinder 12 into exhaust system 62. The gas flows from cylinder chamber 20, through open second valve 26, second port 52, second passage 54, second primary manifold 56, passage 60, switching arrangement 58, and duct 64 into exhaust system 62. During a second part of the second volume-decreasing stroke, second valve 26 is closed, and a certain amount of residual combustion gas is trapped in cylinder chamber 20. Each four-stroke cycle lasts two engine revolutions.

Secondary cylinder 72 operates in the same way as primary cylinder 12. During each four-stroke cycle in secondary cylinder 72, piston 74 performs a first volume-increasing stroke, when it moves away from cylinder head 82, followed by a first volume-decreasing stroke, when it moves towards cylinder head 82, followed by a second volume-increasing stroke, and followed by a second volume-decreasing stroke. During the first part of the first volume-increasing stroke, first valve 84 is open, while the second valve 86 remains closed, and compressed air is received from compressed-air reservoir 46 into cylinder chamber 80. The air flows through duct 104, switching arrangement 98, passage 100, first secondary manifold 96, first passage 94, first port 92, and through open first valve 84 into cylinder chamber 80. Fuel is added to the air either before or after its entrance into cylinder 72. During the second part of the first volume increasing stroke, both first and second valves, 84 and 86, are closed, and expansion of compressed air takes place in cylinder chamber 80. During the first volume-decreasing stroke, both first and second valves, 84 and 86, remain closed, and compression of air, trapped in cylinder chamber 80, takes place. Ignition of the air/fuel mixture takes place close to the end of that stroke. During the second volume-increasing stroke, both first and second valves, 84 and 86, remain closed, and combustion of the air/fuel mixture and expansion of the combustion gas takes place in cylinder chamber 80. During a first part of the second volume-decreasing stroke, second valve 86 is open, and combustion gas is expelled from secondary cylinder 72 into exhaust system 62. The gas flows from cylinder chamber 80, through open second valve 86, second port 112, second passage 114, second secondary manifold 116, passage 120, switching arrangement 118, and duct 110 into exhaust system 62. During a second part of the second volume-decreasing stroke, second valve 86 is closed, and a certain amount of residual combustion gas is trapped in cylinder chamber 80. Each four-stroke cycle lasts two engine revolutions.

Figure 16:
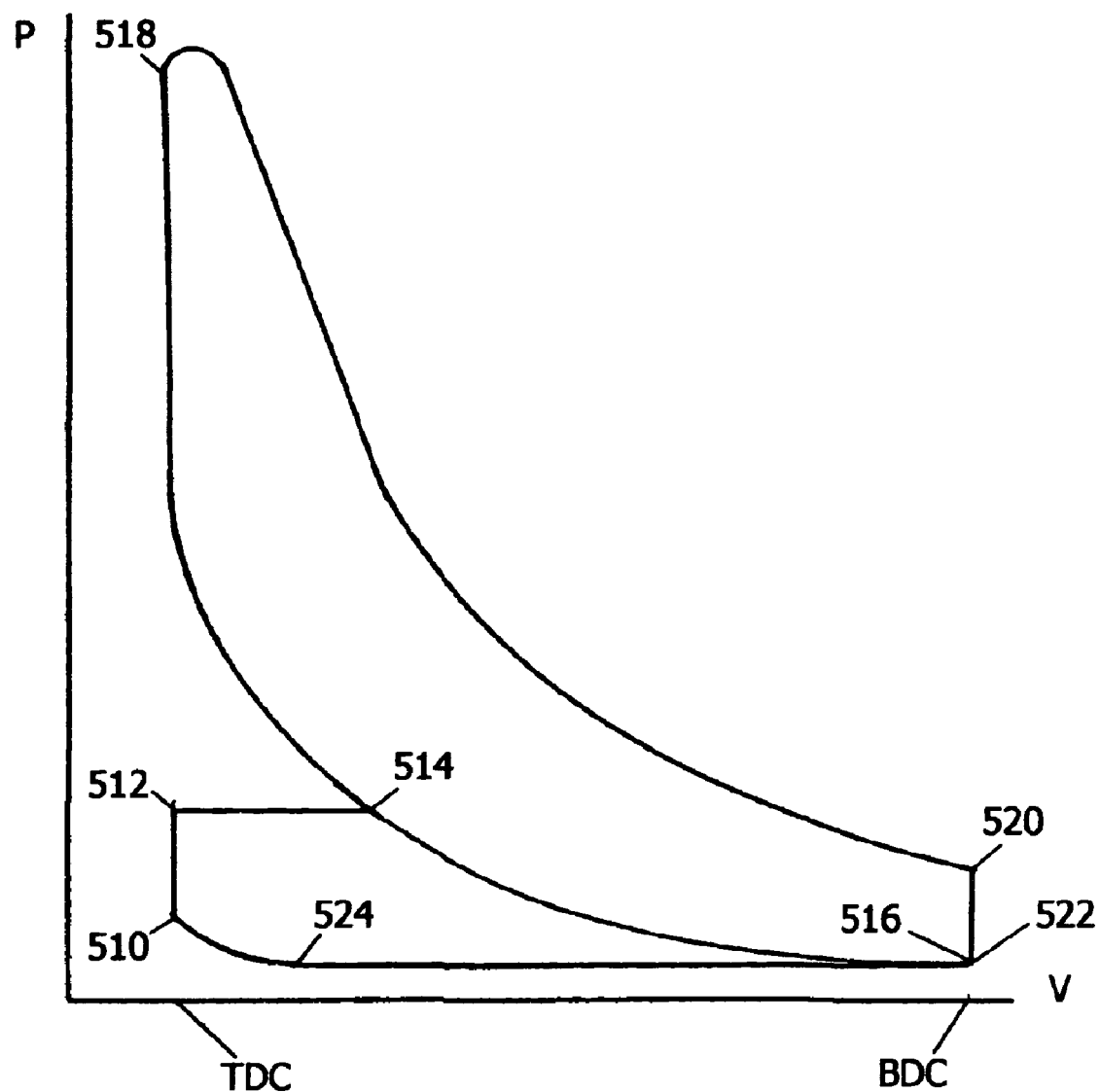
FIG. 16 is a pressure-volume diagram illustrating the first air-power-assisted cycle taking place in a primary cylinder.

A pressure-volume diagram in FIG. 16 further illustrates the first air-power-assisted cycle taking place in primary cylinder 12 (FIG. 15). First valve 24 (FIG. 15) opens at a point 510, and from point 510 to a point 512 pressure in cylinder chamber 20 (FIG. 15) rises to the level of pressure in compressed-air reservoir 46 (FIG. 15). From point 512 to a point 514, first valve 24 remains open, and cylinder chamber 20 receives air from compressed-air reservoir 46 (FIG. 15). This takes place during a first part of the first volume-increasing stroke. Fuel can be added to the air before or after the air enters the cylinder, depending on the type of the engine.

At point 514, first valve 24 closes, and from point 514 to a point 516, all valves are closed, and air expansion takes place in cylinder chamber 20 (FIG. 15). This takes place during a second part of the first volume-increasing stroke.

From point 516 to a point 518, all valves remain closed. Air compression, air/fuel mixture formation, and ignition take place during that period. This process takes place during a first volume-decreasing stroke.

From point 518 to a point 520, all valves are still closed, and combustion and combustion-gas expansion is performed. This takes place during a second volume-increasing stroke.

At point 520, second valve 26 (FIG. 15) opens and remains open until its closure at a point 524. From point 520 to a point 522 (it coincides with point 516 in the drawing), pressure in cylinder chamber 20 drops to the level of pressure in exhaust system 62 (FIG. 15), and from point 522 to a point 524, combustion gas is expelled from cylinder chamber 20 into exhaust system 62. This takes place during a first part of the second volume-decreasing stroke.

From point 524 to point 510, all valves are closed, and a certain amount of residual combustion gas is trapped and compressed in cylinder chamber 20. This takes place during a second part of the volume-decreasing stroke.

Operation of secondary cylinder 72 is identical to that of primary cylinder 12 and can be illustrated by the same pressure-volume diagram shown in FIG. 16. First valve 84 (FIG. 15) opens at a point 510, and from point 510 to a point 512 pressure in cylinder chamber 80 (FIG. 15) rises to the level of pressure in compressed-air reservoir 46 (FIG. 15). From point 512 to a point 514, first valve 84 remains open, and cylinder chamber 80 receives air from compressed-air reservoir 46 (FIG. 15). This takes place during a first part of the first volume-increasing stroke. Fuel can be added to the air before or after the air enters the cylinder, depending on the type of the engine.

At point 514 first valve 84 closes, and from point 514 to a point 516, all valves are closed, and air expansion takes place in cylinder chamber 80 (FIG. 15). This takes place during a second part of the first volume-increasing stroke.

From point 516 to a point 518, all valves are still closed. Air compression, air/fuel mixture formation, and ignition take place during that period. This process takes place during a first volume-decreasing stroke.

From point 518 to a point 520, all valves are still closed, and combustion and combustion-gas expansion is performed. This takes place during a second volume-increasing stroke.

At point 520, second valve 86 (FIG. 15) opens and remains open until its closure at a point 524. From point 520 to a point 522 (it coincides with point 516 in the drawing), pressure in the cylinder chamber 80 drops to the level of pressure in exhaust system 62 (FIG. 15), and from point 522 to a point 524, combustion gas is expelled from cylinder chamber 80 into exhaust system 62. This takes place during a first part of the second volume-decreasing stroke.

From point 524 to point 510, all valves are closed, and a certain amount of residual combustion gas is trapped and compressed in cylinder chamber 80. This takes place during a second part of the second volume-decreasing stroke.

2. Second Air-Power-Assisted Mode

The schematic diagram in FIG. 13 can be used to illustrate the engine operation in the second air-power-assisted mode with a two-stage air expansion. In the drawing, the ducts carrying the airflow and the gas flow are shown in solid lines, while the ducts not carrying the flow are shown in dashed lines. Arrows in the drawing show the overall direction of the air and gas flow.

Control system 122 sets the connections of the engine switching arrangements into a specific pattern required for operation in the second air-power-assisted mode. Switching arrangement 38 is connected to duct 48 and disconnected from duct 44. Switching arrangement 58 is connected to transfer conduit 106 and disconnected from ducts 66 and 64. Switching arrangement 98 is connected to transfer conduit 106 and disconnected from ducts 104 and 102. Switching arrangement 118 is connected to duct 110 and disconnected from duct 108.

Primary cylinder 12 operates as a two-stroke air motor. During each two-stroke cycle in primary cylinder 12, piston 14 performs a volume-increasing stroke, when it moves away from cylinder head 22, followed by a volume-decreasing stroke, when it moves towards cylinder head 22. During a first part of the volume-increasing stroke, first valve 24 is open, and primary cylinder 12 receives compressed air from compressed-air reservoir 46. The air flows from compressed-air reservoir through duct 48, switching arrangement 38, passage 40, first primary manifold 36, first passage 34, first port 32, and through open first valve 24 into cylinder chamber 20. During a second part of the volume-increasing stroke, both first and second valves, 24 and 26, remain closed, and expansion of air trapped in cylinder chamber 20 takes place. The air expands preferably to pressure equal to pressure in transfer conduit 106, which is filled with pressurized air. During a first part of the volume-decreasing stroke, second valve 26 is open, and expanded but still pressurized air is expelled from primary cylinder 12 into transfer conduit 106. The air flows from cylinder chamber 20, through open second valve 26, second port 52, second passage 54, second primary manifold 56, passage 60, and switching arrangement 58 into transfer conduit 106. During a second part of the volume-decreasing stroke, both primary and secondary valves, 24 and 26, are closed, and the residual air remaining in cylinder chamber 20 is recompressed, preferably to a pressure equal to the pressure in compressed-air reservoir 46. During a third part of the volume-decreasing stroke, first valve 24 is open, and a certain amount of residual air is displaced from cylinder chamber 20 back into compressed-air reservoir 46. The air flows from cylinder chamber 20, through open first valve 24, first port 32, first passage 34, first primary manifold 36, passage 40, switching arrangement 36, and duct 48 into compressed-air reservoir 46.

Secondary cylinder 72 operates in a four-stroke internal-combustion cycle. During each four-stroke cycle in secondary cylinder 72, piston 74 performs a first volume-increasing stroke, when it moves away from cylinder head 82, followed by a first volume-decreasing stroke, when it moves towards cylinder head 82, followed by a second volume-increasing stroke, and followed by a second volume-decreasing stroke. During the first part of the first volume-increasing stroke, first valve 84 is open, while the second valve 86 remains closed, and pressurized air is received from transfer conduit 106 into cylinder chamber 80. The air flows through switching arrangement 98, passage 100, first secondary manifold 96, first passage 94, first port 92, and through open first valve 84 into cylinder chamber 80. Fuel is added to the air either before or after its entrance into cylinder 72. During the second part of the first volume increasing stroke, both first and second valves, 84 and 86, are closed, and expansion of compressed air takes place in cylinder chamber 80. During the first volume-decreasing stroke, both first and second valves, 84 and 86, remain closed, and compression of air trapped in cylinder chamber 80 takes place. Ignition of the air/fuel mixture takes place close to the end of that stroke. During the second volume-increasing stroke, both first and second valves, 84 and 86, remain closed, and combustion of the air/fuel mixture and expansion of the combustion gas takes place in cylinder chamber 80. During a first part of the second volume-decreasing stroke, second valve 86 is open, and combustion gas is expelled from secondary cylinder 72 into exhaust system 62. The gas flows from cylinder chamber 80, through open second valve 86, second port 112, second passage 114, second secondary manifold 116, passage 120, switching arrangement 118, and duct 110 into exhaust system 62. During a second part of the second volume-decreasing stroke, second valve 86 is closed, and a certain amount of residual combustion gas is trapped in cylinder chamber 80. Each four-stroke cycle lasts two engine revolutions.

Figure 17:
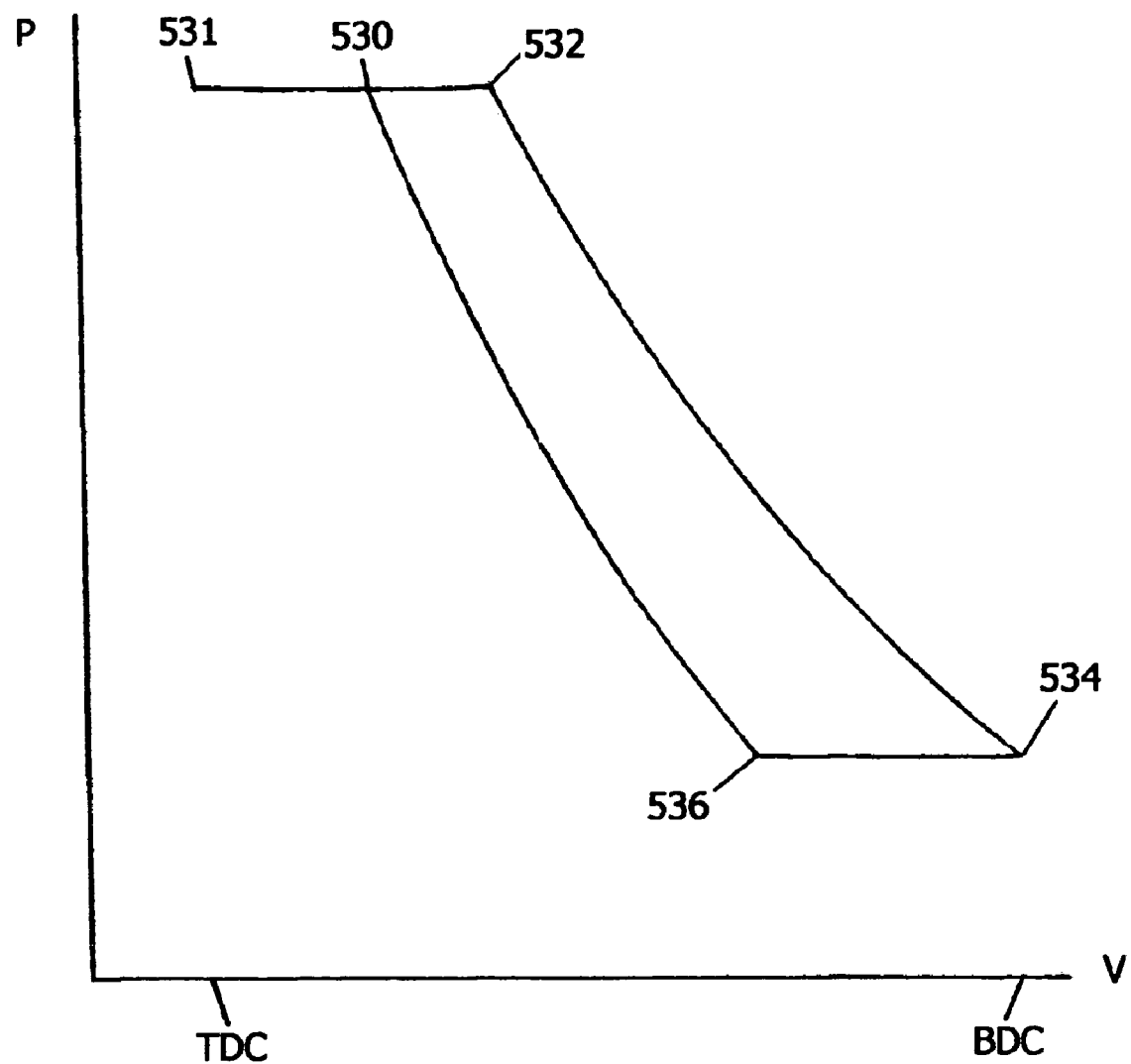
FIG. 17 is a pressure-volume diagram illustrating the two-stroke air-motor cycle taking place in a primary cylinder.

A pressure-volume diagram in FIG. 17 further illustrates the two-stroke air-motor cycle in primary cylinder 12. From a point 531 to a point 532, first valve 24 (FIG. 13) is open, and air is received from compressed-air reservoir 46 (FIG. 13) into cylinder chamber 20 (FIG. 13). This takes place during a first part of the volume-increasing stroke.

At point 532, first valve 24 closes, and from point 532 to a point 534, all valves are closed, and air expansion takes place in cylinder chamber 20. This takes place during a second part of the volume-increasing stroke.

At point 534, second valve 26 (FIG. 13) opens and remains open until its closure at a point 536. From point 534 to point 536 the expanded air is displaced from cylinder chamber 20 into transfer conduit 106 (FIG. 13). This takes place during a first part of the volume-decreasing stroke.

From point 536 to a point 530, all valves are closed, and residual air is re-compressed to a pressure approximately equal to pressure in compressed-air reservoir 46. This takes place during a second part of the volume-decreasing stroke.

From point 530 to point 531, first valve 24 is open and a certain amount of residual air is displaced from cylinder chamber 20 back into compressed-air reservoir 46. This takes place during a third part of the volume-decreasing stroke.

The pressure-volume diagram in FIG. 16 can be used for further illustration of the four-stroke internal-combustion cycle in secondary cylinder 72, First valve 84 (FIG. 13) opens at a point 510, and from point 510 to a point 512, pressure in cylinder chamber 80 (FIG. 13) rises to the level of pressure in transfer conduit 106 (FIG. 13). From point 512 to a point 514, first valve 84 remains open, and cylinder chamber 80 receives air from transfer conduit 106 (FIG. 13). This takes place during a first part of the first volume-increasing stroke. Fuel can be added to the air before or after the air enters the cylinder, depending on the type of the engine.

At point 514, first valve 84 closes, and from point 514 to a point 516, all valves are closed, and air expansion takes place in cylinder chamber 80 (FIG. 13). This takes place during a second part of the first volume-increasing stroke. From point 516 to a point 518, all valves are still closed. Air compression, air/fuel mixture formation, and ignition take place during that period. This process takes place during a first volume-decreasing stroke.

From point 518 to a point 520, all valves are still closed, and combustion and combustion-gas expansion is performed. This takes place during a second volume-increasing stroke.

At point 520, second valve 86 (FIG. 13) opens and remains open until its closure at a point 524. From point 520 to a point 522 (it coincides with point 516 in the drawing), pressure in cylinder chamber 80 drops to the level of pressure in exhaust system 62 (FIG. 13), and from point 522 to point 524, combustion gas is expelled from cylinder chamber 80 into exhaust system 62. This takes place during a first part of the second volume-decreasing stroke.

From point 524 to point 510, all valves are closed, and a certain amount of residual combustion gas is trapped and compressed in cylinder chamber 80. This takes place during a second part of the volume-decreasing stroke.

Control system 122 (FIG. 2) is programmed to control the air-power-assisted operation in a manner that assures that the process generates a propulsion force of required magnitude, as determined by the magnitude of the signal generated by sensor 121 (FIG. 2). The magnitude of the propulsion force increases or decreases with an increase or a decrease, respectively, in the net positive work-per-cycle performed on the piston in each of the engine cylinders. It also depends on frequency with which the cycles are repeated, and therefore it increases or decreases with an increase or a decrease, respectively, in the transmission ratio. Thus, the propulsion force can be varied by varying the work-per-cycle, or by varying the transmission ratio, or by varying both.

Two key contributors to the work-per-cycle are work performed by compressed air and work performed by combustion gas. Work performed by compressed air is a function of the timing of opening and closing of first valve 24 and first valve 84 (FIG. 15), which determine the quantity of air received into the primary and secondary cylinders, respectively. Work performed by combustion gas depends on the quantity of fuel added to the air in the cylinder. Thus, the work-per-cycle can be varied by varying five parameters: timings of first valve 24 opening and closing, timing of first valve 84 opening and closing, and the quantity of fuel added to the air-charge. Control system 122 (FIG. 2) controls the propulsion force by varying any, some, or all of the above parameters, and by varying the transmission ratio according to a program contained in the control system software. In vehicles with manual transmission control, it is the vehicle driver who varies the transmission ratio.

The air-power assisted operation offers significant advantages in fuel economy, exhaust emission, and costs. The fact that the above described air-power-assisted four-stroke cycle includes two power strokes, one with compressed air and another with combustion gas, is a significant advantage over a conventional four-stroke internal combustion cycle including only one power stroke. Work performed by compressed air during one power stroke is added to work performed by combustion gas during a second power stroke. This reduces the work that the combustion gas must perform and, thus, reduces the quantity of fuel required. Since work performed by compressed air represents energy that was previously saved, a substantial reduction in fuel consumption is achieved.

The additional work performed by compressed air in both the primary and the secondary cylinders increases the magnitude of the peak torque that can be produced by the engine. An increase in the peak engine torque and power, without an increase in engine displacement, creates an opportunity for a reduction in engine size (smaller engine displacement). This is a significant advantage, since a smaller engine consumes less fuel during part-load operation.

Another important advantage of using stored compressed air to perform the combustion cycle is that it can achieve a very substantial reduction in the amount of nitrogen oxide produced in the combustion chamber. The method involves retention of a significant amount of combustion gas in the cylinder, at the end of one engine cycle, and mixing it with pre-cooled intake air at the beginning of the next cycle.

To reduce nitrogen oxide emission, a certain amount of exhaust gas is added to the intake air in most internal-combustion engines. This reduces the peak combustion temperature and thus restrains the nitrogen oxide formation. The more exhaust gas is added, the less nitrogen oxide is produced. In most cases, a portion of the exhaust gas is diverted from the exhaust system, cooled in a special exhaust gas cooler, and recirculated back into the engine cylinders. Low pressure of the cooled exhaust gas limits the amount of gas that can be recirculated.

A much simpler concept involves retaining a portion of the combustion gas in the cylinder by closing the exhaust valve early. Unfortunately, in this case, it is the high temperature of the retained combustion gas that limits the amount of gas that can be retained. The present invention offers a way to resolve this problem by cooling the intake air. This method is especially useful when used in conjunction with air-hybrid operation that involves compression of air and its subsequent expansion. Cooling the air while it is still at high pressure and temperature and, then, expanding it in the engine cylinders is an effective method of reducing its heat content. It is especially effective in a system that uses two-stage compression and two-stage expansion. Such system offers an opportunity for a very substantial reduction in the intake air heat content. Mixing the retained hot combustion gas with intake air that has substantially reduced heat content avoids excessively high temperature of the air and combustion gas mixture. The temperature of this mixture can be controlled by controlling the amount of heat taken out of the air. In this way, a substantial amount of combustion gas can be retained and a significant reduction in nitrogen oxide emission can be achieved.

A schematic diagram illustrating an example of a system for controlled cooling of compressed air directly in the compressed-air reservoir is shown in FIG. 5B. In other cases, a separate heat exchanger can be used.

Two-Stroke Internal Combustion

FIGS. 2, 13, 15, 17, and 18

Whenever there is compressed air in the compressed-air reservoir, the engine can operate in a two-stroke internal-combustion mode. There are two types of that mode, a first two-stroke internal-combustion mode and a second two-stroke internal-combustion mode. In the first two-stroke internal-combustion mode, both the primary and the secondary cylinders each perform a two-stroke internal-combustion cycle. In the second two-stroke internal-combustion mode, a two stroke air-motor cycle is performed in the primary cylinder, and a two-stroke internal-combustion cycle is performed in the secondary cylinder.

1. First Two-Stroke Internal-Combustion Mode.

The schematic diagram in FIG. 15 can be used to illustrate the operation in the first two-stroke internal-combustion mode. In the drawing, the ducts carrying the airflow and the gas flow are shown in solid lines, while the ducts not carrying the flow are shown in dashed lines. Arrows in the drawing show the overall direction of the air and gas flow.

Control system 122 sets the connections of the engine switching arrangements into a specific pattern required for operation in the first two-stroke internal combustion mode. Switching arrangement 38 is connected to duct 48 and disconnected from duct 44. Switching arrangement 58 is connected to duct 64 and disconnected from duct 66 and transfer conduit 106. Switching arrangement 98 is connected to duct 104 and disconnected from transfer conduit 106 and duct 102. Switching arrangement 118 is connected to duct 110 and disconnected from duct 108.

During each two-stroke cycle in primary cylinder 12, piston 14 performs a volume-increasing stroke, when it moves away from cylinder head 22, followed by a volume-decreasing stroke, when it moves towards cylinder head 22. During the second part of the volume-decreasing stroke, first valve 24 is open, while the second valve 26 remains closed, and compressed air is received from compressed-air reservoir 46 into cylinder chamber 20. The air flows through duct 48, switching arrangement 38, passage 40, first primary manifold 36, first passage 34, first port 32, and through open first valve 24 into cylinder chamber 20. Fuel is added to the air either before or after its entrance into cylinder 12. During the third part of the volume decreasing stroke, both first and second valves, 24 and 26, are closed, and additional compression of compressed air takes place in cylinder chamber 20. Ignition of the air/fuel mixture takes place close to the end of that stroke. During the volume-increasing stroke, both first and second valves, 24 and 26, remain closed, and combustion of the air/fuel mixture and expansion of the combustion gas takes place in cylinder chamber 20. During a first part of the volume-decreasing stroke, second valve 26 is open, and combustion gas is expelled from primary cylinder 12 into exhaust system 62. The air flows from cylinder chamber 20, through open second valve 26, second port 52, second passage 54, second primary manifold 56, passage 60, switching arrangement 58, and duct 64 into exhaust system 62.

Secondary cylinder 72 operates in the same way as primary cylinder 12. During each two-stroke cycle in secondary cylinder 72, piston 74 performs a volume-increasing stroke, when it moves away from cylinder head 82, followed by a volume-decreasing stroke, when it moves towards cylinder head 82. During the second part of the volume-decreasing stroke, first valve 84 is open, while the second valve 86 remains closed, and compressed air is received from compressed-air reservoir 46 into cylinder chamber 80. The air flows through duct 104, switching arrangement 98, passage 100, first secondary manifold 96, first passage 94, first port 92, and through open first valve 84 into cylinder chamber 80. Fuel is added to the air either before or after its entrance into cylinder 72. During the third part of the volume decreasing stroke, both first and second valves, 84 and 86, are closed, and additional compression of compressed air takes place in cylinder chamber 80. Ignition of the air/fuel mixture takes place close to the end of that stroke. During the volume-increasing stroke, both first and second valves, 84 and 86, remain closed, and combustion of the air/fuel mixture and expansion of the combustion gas takes place in cylinder chamber 80. During a first part of the volume-decreasing stroke, second valve 86 is open, and combustion gas is expelled from primary cylinder 72 into exhaust system 62. The air flows from cylinder chamber 80, through open second valve 86, second port 112, second passage 114, second secondary manifold 116, passage 120, switching arrangement 118, and duct 110 into exhaust system 62.

Figure 18:
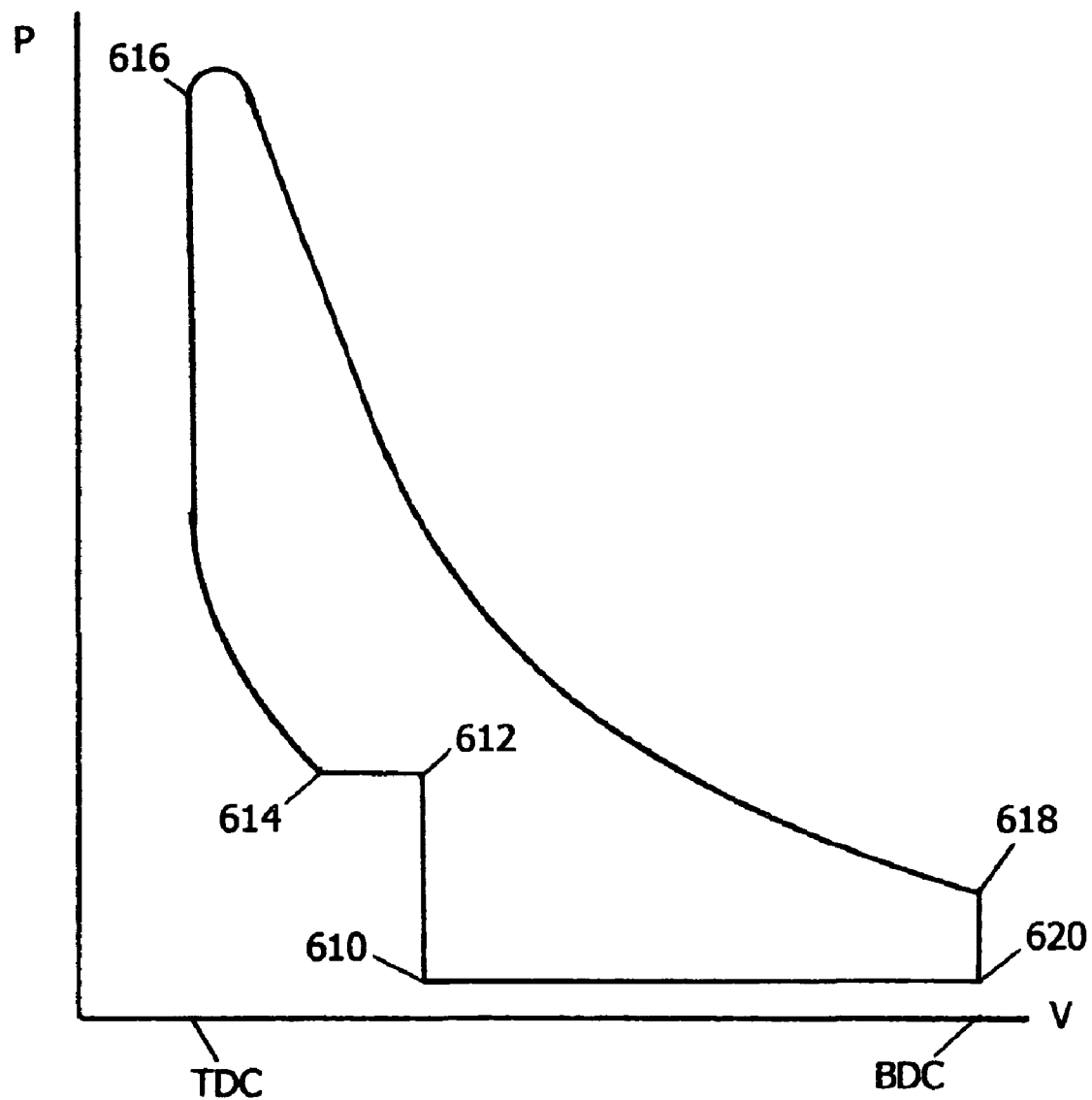
FIG. 18 is a pressure-volume diagram illustrating the operation in the first two-stroke internal-combustion mode in both primary and secondary cylinders.

Pressure-volume diagram in FIG. 18 further illustrates the operation in the first two-stroke internal-combustion mode in both primary and secondary cylinders. In primary cylinder 12, first valve 24 (FIG. 15) opens at a point 610, and from point 610 to a point 612, pressure in cylinder chamber 20

(FIG. 15) rises to the level of pressure in compressed-air reservoir 46. From point 612 to a point 614, air is received from compressed-air reservoir 46 into cylinder chamber 20. This takes place during a second part of the volume-decreasing stroke. Fuel can be added to the air before or after the air enters the cylinder, depending on the type of the engine.

First valve 24 closes at point 614 and from point 614 to a point 616, all valves remain closed. Air compression, air/fuel mixture formation, and ignition take place during that period. This process takes place during a third part of the volume-decreasing stroke.

From point 616 to a point 618, all valves are still closed, and combustion and combustion-gas expansion is performed. This takes place during a volume-increasing stroke.

At point 618, second valve 26 (FIG. 15) opens and remains open until its closure at point 610. From point 618 to a point 620, pressure in the cylinder chamber 20 drops to the level of pressure in exhaust system 62 (FIG. 15), and from point 620 to point 610, combustion gas is expelled from cylinder chamber 20 into exhaust system 62. This takes place during a first part of the volume-decreasing stroke.

In secondary cylinder 72, first valve 84 (FIG. 15) opens at a point 610, and from point 610 to a point 612, pressure in cylinder chamber 80 (FIG. 15) rises to the level of pressure in compressed-air reservoir 46. From point 612 to a point 614, air is received from compressed-air reservoir 46 into cylinder chamber 80. This takes place during a second part of the volume-decreasing stroke. Fuel can be added to the air before or after the air enters the cylinder, depending on the type of the engine.

First valve 84 closes at point 614 and from point 614 to a point 616, all valves remain closed. Air compression, air/fuel mixture formation, and ignition take place during that period. This process takes place during a third part of the volume-decreasing stroke.

From point 616 to a point 618, all valves are still closed, and combustion and combustion-gas expansion is performed. This takes place during a volume-increasing stroke.

At point 618, second valve 86 (FIG. 15) opens and remains open until its closure at point 610. From point 618 to a point 620, pressure in the cylinder chamber 80 drops to the level of pressure in exhaust system 62 (FIG. 15), and from point 620 to point 610, combustion gas is expelled from cylinder chamber 80 into exhaust system 62. This takes place during a first part of the volume-decreasing stroke.

2. Second Two-Stroke Internal-Combustion Mode.

The schematic diagram in FIG. 13 can be used to illustrate the operation in the second two-stroke internal-combustion mode. In the drawing, the ducts carrying the airflow and the gas flow are shown in solid lines, while the ducts not carrying the flow are shown in dashed lines. Arrows in the drawing show the overall direction of the air and gas flow.

Control system 122 sets the connections of the engine switching arrangements into a specific pattern required for operation in the second two-stroke internal-combustion mode. Switching arrangement 38 is connected to duct 48 and disconnected from duct 44. Switching arrangement 58 is connected to transfer conduit 106 and disconnected from ducts 64 and 66. Switching arrangement 98 is connected to transfer conduit 106 and disconnected from ducts 102 and 104. Switching arrangement 118 is connected to duct 110 and disconnected from duct 108.

Primary cylinder 12 operates as a two-stroke air motor. During each two-stroke cycle in primary cylinder 12, piston 14 performs a volume-increasing stroke, when it moves away from cylinder head 22, followed by a volume-decreasing stroke, when it moves towards cylinder head 22. During a first part of the volume-increasing stroke, first valve 24 is open, and primary cylinder 12 receives compressed air from compressed-air reservoir 46. The air flows from compressed-air reservoir through duct 48, switching arrangement 38, passage 40, first primary manifold 36, first passage 34, first port 32, and through open first valve 24 into cylinder chamber 20. During a second part of the volume-increasing stroke, both first and second valves, 24 and 26, remain closed, and expansion of air trapped in cylinder chamber 20 takes place. The air expands preferably to the level of pressure in the transfer conduit 106, which is filled with pressurized air. During a first part of the volume-decreasing stroke, second valve 26 is open, and expanded but still pressurized air is expelled from primary cylinder 12 into transfer conduit 106. The air flows from cylinder chamber 20, through open second valve 26, second port 52, second passage 54, second primary manifold 56, passage 60, and switching arrangement 58 into transfer conduit 106. During a second part of the volume-decreasing stroke, both primary and secondary valves, 24 and 26, are closed, and the residual air remaining in cylinder chamber 20 is recompressed, preferably to a pressure equal to the pressure in compressed-air reservoir 46. During a third part of the volume-decreasing stroke, first valve 24 is open, and a certain part of the residual air is displaced from cylinder chamber 20 back into compressed-air reservoir 46.

Secondary cylinder 72 operates in a two-stroke internal-combustion cycle. During each two-stroke cycle in secondary cylinder 72, piston 74 performs a volume-increasing stroke, when it moves away from cylinder head 82, followed by a volume-decreasing stroke, when it moves towards cylinder head 82. During the second part of the volume-decreasing stroke, first valve 84 is open, while the second valve 86 remains closed, and compressed air is received from transfer conduit 106 into cylinder chamber 80. The air flows through switching arrangement 98, passage 100, first secondary manifold 96, first passage 94, first port 92, and through open first valve 84 into cylinder chamber 80. Fuel is added to the air either before or after its entrance into cylinder 72. During the third part of the volume decreasing stroke, both first and second valves, 84 and 86, are closed, and additional compression of compressed air takes place in cylinder chamber 80. Ignition of the air/fuel mixture takes place close to the end of that stroke. During the volume-increasing stroke, both first and second valves, 84 and 86, remain closed, and combustion of the air/fuel mixture and expansion of the combustion gas takes place in cylinder chamber 80. During a first part of the volume-decreasing stroke, second valve 86 is open, and combustion gas is expelled from primary cylinder 72 into exhaust system 62. The air flows from cylinder chamber 80, through open second valve 86, second port 112, second passage 114, second secondary manifold 116, passage 120, switching arrangement 118, and duct 110 into exhaust system 62.

A pressure-volume diagram in FIG. 17 further illustrates the two-stroke air-motor cycle in primary cylinder 12. From point 531 to point 532, air is received from compressed-air reservoir into cylinder chamber 20. This takes place during a first part of the volume-increasing stroke.

At point 532, first valve 24 closes, and from point 532 to point 534, all valves are closed, and air expansion takes place in cylinder chamber 20. This takes place during a second part of the volume-increasing stroke.

At point 534, second valve 26 opens and remains open until its closure at point 536. From point 534 to point 536 the expanded air is displaced from cylinder chamber 20 into transfer conduit 106 (FIG. 13). This takes place during a first part of the volume-decreasing stroke.

From point 536 to point 530, residual air is re-compressed to a pressure approximately equal to pressure in compressed-air reservoir 46. This takes place during a second part of the volume-decreasing stroke.

From point 530 to point 531, first valve 24 is open and a certain amount of residual air is displaced from cylinder chamber 20 back into compressed-air reservoir 46. This takes place during a third part of the volume-decreasing stroke.

Pressure-volume diagram in FIG. 18 can further illustrate the operation of secondary cylinder 72 in the second two-stroke internal-combustion mode. In secondary cylinder 72, first valve 84 (FIG. 13) opens at a point 610, and from point 610 to a point 612, pressure in cylinder chamber 80 (FIG. 13) rises to the level of pressure in transfer conduit 106. From point 612 to a point 614, air is received from transfer conduit 106 into cylinder chamber 80. This takes place during a second part of the volume-decreasing stroke. Fuel can be added to the air before or after the air enters the cylinder, depending on the type of the engine.

First valve 84 closes at point 614 and, from point 614 to a point 616, all valves remain closed. Air compression, air/fuel mixture formation, and ignition take place during that period. This process takes place during a third part of the volume-decreasing stroke.

From point 616 to a point 618, all valves are still closed, and combustion and combustion-gas expansion is performed. This takes place during a volume-increasing stroke.

At point 618, second valve 86 (FIG. 13) opens and remains open until its closure at point 610. From point 618 to a point 620, pressure in cylinder chamber 80 drops to the level of pressure in exhaust system 62 (FIG. 13), and from point 620 to point 610, combustion gas is expelled from cylinder chamber 80 into exhaust system 62. This takes place during a first part, of the volume-decreasing stroke.

Control system 122 (FIG. 2) controls the two-stroke internal-combustion mode in the same way as the air-power-assisted mode. The factors affecting the magnitude of the propulsion force are the same as in the case of the air-power-assisted mode. The propulsion force increases or decreases with an increase or a decrease, respectively, in the net positive work-per-cycle, and with an increase or a decrease, respectively, in the transmission ratio. As in the air-power-assisted mode, the work-per-cycle can be varied by varying the valve timing. Control system 122 (FIG. 2) controls the propulsion force by varying the valve timing and by varying the transmission ratio according to a program contained in the control system software. In vehicles with manual transmission control, it is the vehicle driver who varies the transmission ratio.

Charging the cylinders with compressed air during each volume-decreasing stroke reduces the amount of compression work required. This reduces the work, which the combustion gas must perform and, thus, reduces the quantity of fuel required. Since the work performed by compressed air represents energy, which was previously saved, a substantial reduction in fuel consumption is achieved.

Operation of primary cylinders can be switched from a four-stroke cycle to a two-stroke cycle, or vice versa, simply by changing the sequence and frequency of operation of the engine valves, injectors, and spark plugs (when applicable). Such a change can be accomplished in one engine cycle. Ability to selectively switch the engine operation from a four-stroke cycle to a two-stroke cycle and back is an important advantage over conventional internal combustion engines, which, depending on their design, can operate only either as four-stroke, or as two-stroke engines. A switch from the four-stroke to the two-stroke cycle doubles the number of combustion events at a given engine speed, which leads to a significant step-up in engine torque and power. This is especially useful during acceleration from a low vehicle speed, when a sudden increase in torque is very desirable.

Conventional Four-stroke Internal Combustion

FIG. 2 and FIG. 19

Figure 19:
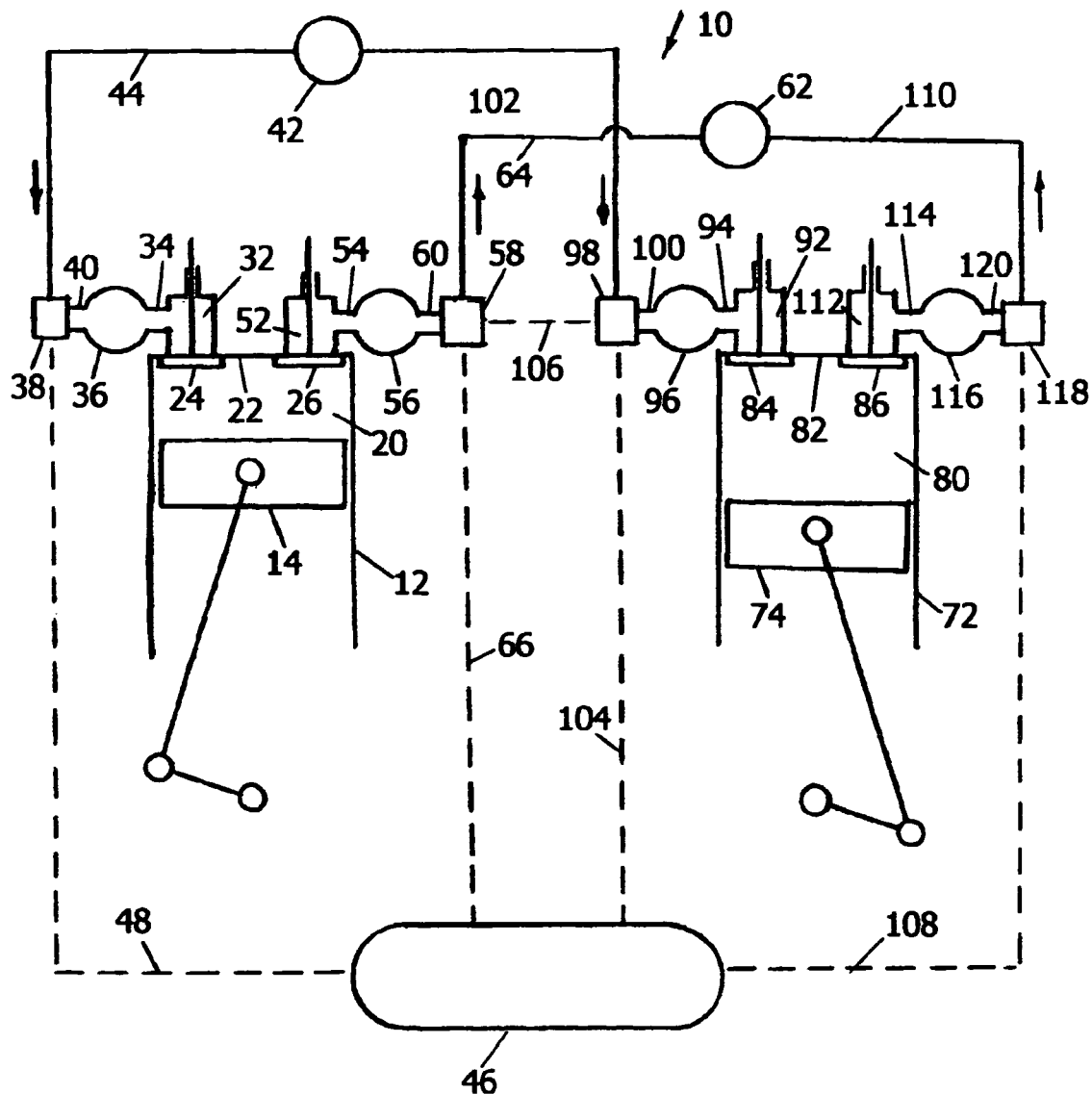
FIG. 19 is a schematic diagram illustrating the engine operation in the conventional four-stroke internal-combustion mode.

The engine can also operate in a conventional four-stroke internal-combustion mode. FIG. 19 is a schematic diagram illustrating operation in the conventional four-stroke internal-combustion mode. In the drawing, the ducts carrying the airflow and the gas flow are shown in solid lines, while the ducts not carrying the flow are shown in dashed lines. Arrows in the drawing show the overall direction of the air and gas flow.

Control system 122 (FIG. 2) sets the connections of the engine switching arrangements into a specific pattern required for operation in the conventional four-stroke internal combustion mode. Switching arrangement 38 is connected to duct 44 and disconnected from duct 48. Switching arrangement 58 is connected to duct 64 and disconnected from duct 66 and transfer conduit 106. Switching arrangement 98 is connected to duct 102 and disconnected from transfer conduit 106 and duct 104. Switching arrangement 118 is connected to duct 110 and disconnected from duct 108.

During each four-stroke cycle in primary cylinder 12, piston 14 performs a first volume-increasing stroke, when it moves away from cylinder head 22, followed by a first volume-decreasing stroke, when it moves towards cylinder head 22, followed by a second volume-increasing stroke, and followed by a second volume-decreasing stroke. During the first volume-increasing stroke, first valve 24 is open, while the second valve 26 remains closed, and air intake from outside atmosphere takes place. The air flows through intake system 42, duct 44, switching arrangement 38, passage 40, first primary manifold 36, first passage 34, first port 32, and through open first valve 24 into cylinder chamber 20. Fuel is added to the air either before or after its entrance into cylinder 12. During the first volume-decreasing stroke, both first and second valves, 24 and 26, remain closed, and compression of air trapped in cylinder chamber 20 takes place. Ignition of the air/fuel mixture takes place close to the end of that stroke. During the second volume-increasing stroke, both first and second valves, 24 and 26, remain closed, and combustion of the air/fuel mixture and expansion of the combustion gas takes place in cylinder chamber 20. During a second volume-decreasing stroke, second valve 26 is open, and combustion gas is expelled from primary cylinder 12 into exhaust system 62. The air flows from cylinder chamber 20, through open second valve 26, second port 52, second passage 54, second primary manifold 56, passage 60, switching arrangement 58, and duct 64 into exhaust system 62. Each four-stroke cycle lasts two engine revolutions.

Operation of secondary cylinder 72 is the same as that of primary cylinder 12. During each four-stroke cycle in secondary cylinder 72, piston 74 performs a first volume-increasing stroke, when it moves away from cylinder head 82, followed by a first volume-decreasing stroke, when it moves towards cylinder head 82, followed by a second volume-increasing stroke, and followed by a second volume-decreasing stroke. During the first volume-increasing stroke, first valve 84 is open, while the second valve 86 remains closed, and air intake from outside atmosphere takes place. The air flows through intake system 42, duct 102, switching arrangement 98, passage 100, first primary manifold 96, first passage 94, first port 92, and through open first valve 84 into cylinder chamber 80. Fuel is added to the air either before or after its entrance into secondary cylinder 72. During the first volume-decreasing stroke, both first and second valves, 84 and 86, remain closed, and compression of air trapped in cylinder chamber 80 takes place. Ignition of the air/fuel mixture takes place close to the end of that stroke. During the second volume-increasing stroke, both first and second valves, 84 and 86, remain closed, and combustion of the air/fuel mixture and expansion of the combustion gas takes place in cylinder chamber 80. During a second volume-decreasing stroke, second valve 86 is open, and combustion gas is expelled from secondary cylinder 72 into exhaust system 62. The air flows from cylinder chamber 80, through open second valve 86, second port 112, second passage 114, second primary manifold 116, passage 120, switching arrangement 118, and duct 110 into exhaust system 62. Each four-stroke cycle lasts two engine revolutions.

Air-Motor Operation

FIGS. 2, 13, 15, 20, and 21

The engine can operate either in a two-stage air-motor mode or in a single-stage air-motor mode.

1. Two-Stage Air-Motor Mode.

FIG. 13 illustrates the engine operation in the two-stage air-motor mode. In the drawing, the ducts carrying the airflow are shown in solid lines, while the ducts not carrying the flow are shown in dashed lines. Arrows in the drawing show the overall direction of the airflow.

Control system 122 sets the connections of the engine switching arrangements into a specific pattern required for operation in the two-stage air-motor mode. Switching arrangement 38 is connected to duct 48 and disconnected from duct 44. Switching arrangement 58 is connected to transfer conduit 106 and disconnected from ducts 66 and 64. Switching arrangement 98 is connected to transfer conduit 106 and disconnected from ducts 104 and 102. Switching arrangement 118 is connected to duct 110 and disconnected from duct 108.

Primary cylinder 12 operates as a first stage of the air motor. During each two-stroke cycle in primary cylinder 12, piston 14 performs a volume-increasing stroke, when it moves away from cylinder head 22, followed by a volume-decreasing stroke, when it moves towards cylinder head 22. During a first part of the volume-increasing stroke, first valve 24 is open, and primary cylinder 12 receives compressed air from compressed-air reservoir 46. The air flows from compressed-air reservoir 46 through duct 48, switching arrangement 38, passage 40, first primary manifold 36, first passage 34, first port 32, and through open first valve 24 into cylinder chamber 20. During a second part of the volume-increasing stroke, both first and second valves, 24 and 26, remain closed, and expansion of air, trapped in cylinder chamber 20, takes place. The air expands preferably until its pressure is equal to the pressure in transfer conduit 106, which is filled with pressurized air. During a first part of the volume-decreasing stroke, second valve 26 is open, and expanded but still pressurized air is expelled from primary cylinder 12 into transfer conduit 106. The air flows from cylinder chamber 20, through open second valve 26, second port 52, second passage 54, second primary manifold 56, passage 60, and switching arrangement 58 into transfer conduit 106. During a second part of the volume-decreasing stroke, both primary and secondary valves, 24 and 26, are closed, and the residual air remaining in cylinder chamber 20 is re-compressed to a pressure approximately equal to the pressure in compressed-air reservoir 46. During a third part of the volume-decreasing stroke, first valve 24 is open, and a part of the residual air is displaced from cylinder chamber 20 back into compressed-air reservoir 46. The air flows from cylinder chamber 20, through open first valve 24, first port 32, first passage 34, first primary manifold 36, passage 40, switching arrangement 38, and duct 48 into compressed-air reservoir 46.

Secondary cylinder 72 operates as a second stage of the air motor. During each two-stroke cycle in secondary cylinder 72, piston 74 performs a volume-increasing stroke, when it moves away from cylinder head 82, followed by a volume-decreasing stroke, when it moves towards cylinder head 82. During a first part of the volume-increasing stroke, first valve 84 is open, and secondary cylinder 72 receives compressed air from transfer conduit 106. The air flows from transfer conduit 106 through switching arrangement 98, passage 100, first secondary manifold 96, first passage 94, first port 92, and through open first valve 84 into cylinder chamber 80. During a second part of the volume-increasing stroke, both first and second valves, 84 and 86, remain closed, and a second expansion of air trapped in cylinder chamber 80 takes place. During a first part of the volume-decreasing stroke, second valve 86 is open, and expanded air is expelled from primary cylinder 72 into exhaust system 62. The air flows from cylinder chamber 80, through open second valve 86, second port 112, second passage 114, second secondary manifold 116, passage 120, and duct 110 into exhaust system 62. During a second part of the volume-decreasing stroke, both primary and secondary valves, 84 and 86, are closed, and the residual air remaining in cylinder chamber 80 is re-compressed.

Figure 20:
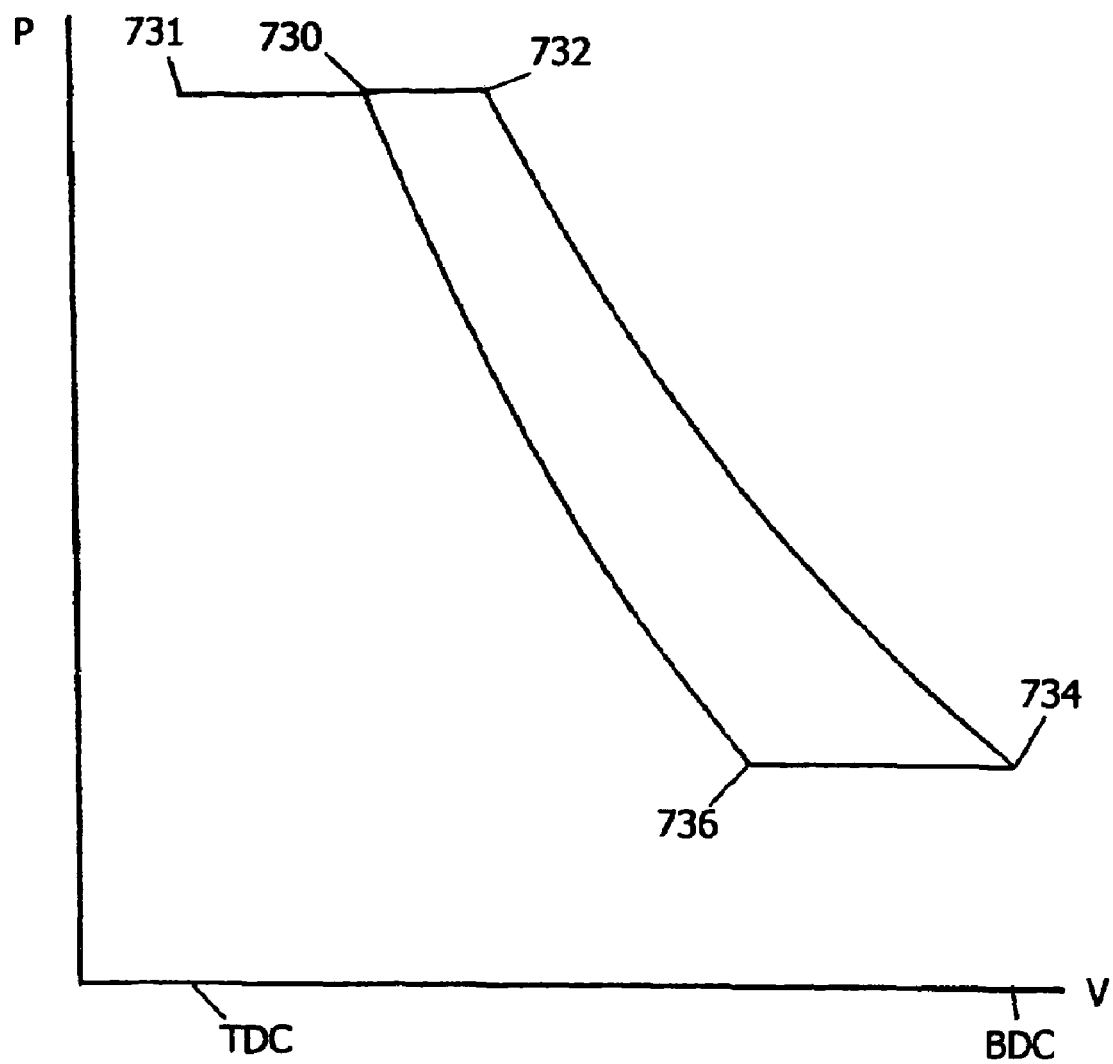
FIG. 20 is a pressure-volume diagram illustrating the first stage of the two-stage air-motor cycle taking place in a primary cylinder.
Figure 21:
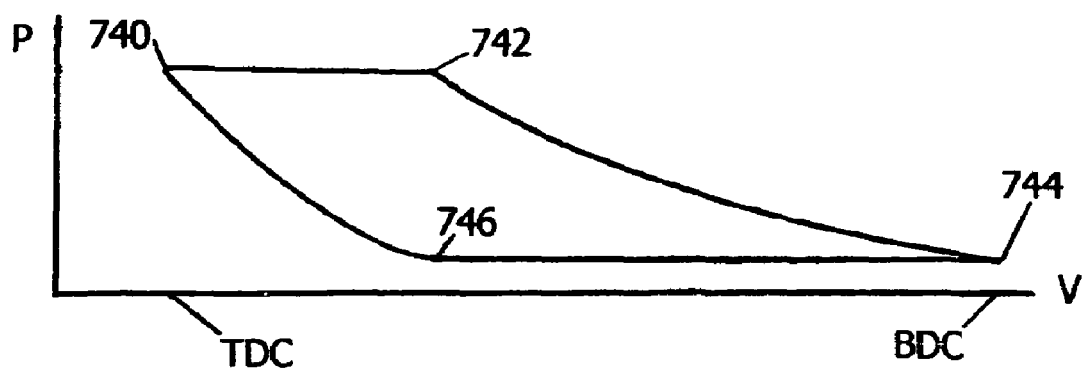
FIG. 21 is a pressure-volume diagram illustrating the second stage of the two-stage air-motor cycle taking place in a secondary cylinder.

Pressure-volume diagrams in FIGS. 20 and 21 further illustrate the two-stage air-motor cycle. FIG. 20 illustrates the first stage taking place in primary cylinder 12. From point 731 to point 732, first valve 24 is open and air is received from compressed-air reservoir 46 into cylinder chamber 20. This takes place during a first part of the volume-increasing stroke.

At point 732, first valve 24 closes, and from point 732 to a point 734, all valves are closed and air expansion takes place in cylinder chamber 20. This takes place during a second part of the volume-increasing stroke.

At point 734, second valve 26 (FIG. 13) opens and remains open until its closure at a point 736. From point 734 to point 736 the expanded air is displaced from cylinder chamber 20 into transfer conduit 106 (FIG. 13). This takes place during a first part of the volume-decreasing stroke.

From point 736 to point 730, residual air is re-compressed to a pressure approximately equal to pressure in compressed-air reservoir 46. This takes place during a second part of the volume-decreasing stroke.

From point 730 to point 731, first valve 24 is open and some of the residual air is displaced from cylinder chamber 20 back into compressed-air reservoir 46.

The pressure-volume diagram in FIG. 21 illustrates the second stage taking place in secondary cylinder 72. First valve 84 opens at a point 740 and closes at a point 742. From point 740 to point 742, air is received from transfer conduit 106 into cylinder chamber 80. This takes place during the first part of the volume-increasing stroke.

From point 742 to a point 744, all valves are closed, and a second stage of air expansion takes place. This occurs during a second part of the volume-increasing stroke.

Second valve 86 opens at point 744 and remains open until its closure at a point 746. From point 744 to point 746, air is expelled from cylinder chamber 80 into exhaust system 62. This takes place during a first part of the volume-decreasing stroke.

From point 746 to point 740, all valves are closed and residual air is compressed to a pressure preferably equal to pressure in transfer conduit 106. This takes place during a second part of the volume-decreasing stroke.

2. Single-Stage Air-Motor Mode

FIG. 15 illustrates the engine operation in the single-stage air-motor mode. In the drawing, the ducts carrying the airflow are shown in solid lines, while the ducts not carrying the flow are shown in dashed lines. Arrows in the drawing show the overall direction of the airflow.

Control system 122 sets the connections of the engine switching arrangements into a specific pattern required for operation in the single-stage air-motor mode. Switching arrangement 38 is connected to duct 48 and disconnected from duct 44. Switching arrangement 58 is connected to duct 64 and disconnected from duct 66 and transfer conduit 106. Switching arrangement 98 is connected to duct 104 and disconnected from transfer conduit 106 and duct 102. Switching arrangement 118 is connected to duct 110 and disconnected from duct 108.

During each two-stroke cycle in primary cylinder 12, piston 14 performs a volume-increasing stroke, when it moves away from cylinder head 22, followed by a volume-decreasing stroke, when it moves towards cylinder head 22. During a first part of the volume-increasing stroke, first valve 24 is open and primary cylinder 12 receives compressed air from compressed-air reservoir 46. The air flows from compressed-air reservoir through duct 48, switching arrangement 38, passage 40, first primary manifold 36, first passage 34, first port 32, and through open first valve 24 into cylinder chamber 20. During a second part of the volume-increasing stroke, both first and second valves, 24 and 26, remain closed, and expansion of air trapped in cylinder chamber 20 takes place. During a first part of the volume-decreasing stroke, second valve 26 is open, and expanded air is expelled from primary cylinder 12 into exhaust system 62. The air flows from cylinder chamber 20, through open second valve 26, second port 52, second passage 54, second primary manifold 56, passage 60, switching arrangement 58, and duct 64 into exhaust system 62. During a second part of the volume-decreasing stroke, both primary and secondary valves, 24 and 26, are closed, and the residual air remaining in cylinder chamber 20 is re-compressed.

Secondary cylinder 72 operates in the same way as primary cylinder 12. During each two-stroke cycle in secondary cylinder 72, piston 74 performs a volume-increasing stroke, when it moves away from cylinder head 82, followed by a volume-decreasing stroke, when it moves towards cylinder head 82. During a first part of the volume-increasing stroke, first valve 84 is open, and secondary cylinder 72 receives compressed air from compressed-air reservoir 46. The air flows through duct 104, switching arrangement 98, passage 100, first secondary manifold 96, first passage 94, first port 92, and through open first valve 84 into cylinder chamber 80. During a second part of the volume-increasing stroke, both first and second valves, 84 and 86, remain closed, and expansion of air trapped in cylinder chamber 80 takes place. During a first part of the volume-decreasing stroke, second valve 86 is open, and expanded air is expelled from primary cylinder 72 into exhaust system 62. The air flows from cylinder chamber 80, through open second valve 86, second port 112, second passage 114, second secondary manifold 116, passage 120, and duct 110 into exhaust system 62. During a second part of the volume-decreasing stroke, both primary and secondary valves, 84 and 86, are closed, and the residual air remaining in cylinder chamber 80 is re-compressed.

The pressure-volume diagram shown in FIG. 21 can be used to illustrate the cycles taking place in both primary and secondary cylinders. In primary cylinder 12, first valve 24 (FIG. 15) opens at point 740 and closes at point 742. From point 740 to point 742, air is received from compressed-air reservoir 46 (FIG. 15) into cylinder chamber 20. This takes place during the first part of the volume-increasing stroke.

From point 742 to point 744, all valves are closed, and air expansion takes place. This occurs during a second part of the volume-increasing stroke.

Second valve 26 opens at point 744 and it remains open until its closure at point 746. From point 744 to point 746, air is expelled from cylinder chamber 20 into exhaust system 62. This takes place during a first part of the volume-decreasing stroke.

From point 746 to point 740, all valves are closed and residual air is compressed to a pressure preferably equal to pressure in compressed-air reservoir 46. This takes place during a second part of the volume-decreasing stroke.

Secondary cylinder 72 operates in identical manner. First valve 84 opens at point 740 and closes at point 742. From point 740 to point 742, air is received from compressed-air reservoir 46 into cylinder chamber 80. This takes place during the first part of the volume-increasing stroke.

From point 742 to point 744, all valves are closed, and air expansion takes place in cylinder chamber 80. This occurs during a second part of the volume-increasing stroke.

Second valve 86 opens at point 744 and remains open until its closure at a point 746. From point 744 to point 746, air is expelled from cylinder chamber 80 into exhaust system 62. This takes place during a first part of the volume-decreasing stroke.

From point 746 to point 740, all valves are closed and residual air is compressed to a pressure preferably equal to pressure in compressed-air reservoir 46. This takes place during a second part of the volume-decreasing stroke.

Control system 122 (FIG. 2) is programmed to control the air-motor operation in a manner which assures that the process generates a propulsion force of required magnitude, as determined by the magnitude of the signal generated by accelerator pedal position sensor 121 (FIG. 2). The magnitude of the propulsion force increases or decreases with an increase or a decrease, respectively, in the net positive work-per-cycle performed on the piston in each of the engine cylinders. It also depends on frequency with which the cycles are repeated, and therefore it increases or decreases with an increase or a decrease, respectively, in the transmission ratio. Thus, the propulsion force can be varied by varying the work-per-cycle, or by varying the transmission ratio, or by varying both.

Thanks to operational flexibility offered by ability to quickly activate and deactivate the engine valves, the frequency of the cycles repetition can also be reduced, whenever needed, by selectively omitting some of the cycles. For example, the cycle can be performed once every other engine revolution, while during the in-between-cycle revolutions the valves are deactivated. This reduces the propulsion force in half, without any change in the work-per-cycle and the transmission ratio. Omission of some of the cycles is an additional method, which the control system can use to control the magnitude of the propulsion force.

The work-per-cycle in each cylinder is a function of the timing of the engine valves openings and closings. These timings control various parameters contributing to the amount of work-per-cycle performed, such as the quantity of air received into the cylinder chamber, the ratio of air expansion, the quantity of air displaced out of the cylinder, and the ratio of residual-air compression.

Control system 122 (FIG. 2) controls and varies the propulsion force, produced by air-motor operation, by varying the valve timing and the transmission ratio according to a program contained in the control system software. In vehicles with manual transmission control, it is the vehicle driver who varies the transmission ratio.

The two-stage air-motor mode offers a significant advantage over a single-stage air-motor mode in terms of achievable acceleration torque. At equal engine size, the peak positive acceleration torque can be much higher. The increase in peak acceleration torque is due to the fact that, at a comparable compression ratio, the positive work-per-cycle performed during the first stage of expansion is much greater than the work-per-cycle performed during the second stage. This means that an engine using two stages of expansion can produce a greater torque than an engine using only one stage of expansion. Greater torque is an important advantage when the vehicle is accelerated from zero speed. However, if the air pressure in the compressed-air reservoir is low, two-stage expansion becomes less efficient, and a single-stage expansion should be used.

The above description of the air-motor operation emphasized an engine operating as a two-stage air motor. However, those skilled in art will appreciate that, with some modifications, the engine can also operate as a multi-stage air motor using three or a greater number of expansion stages. While two expansion stages are likely to be sufficient in most cases, the possibility of using a greater number of expansion stages should not be precluded and should remain the prerogative of the system designer.

DESCRIPTION OF THE FIRST ALTERNATIVE EMBODIMENT

Figure 22:
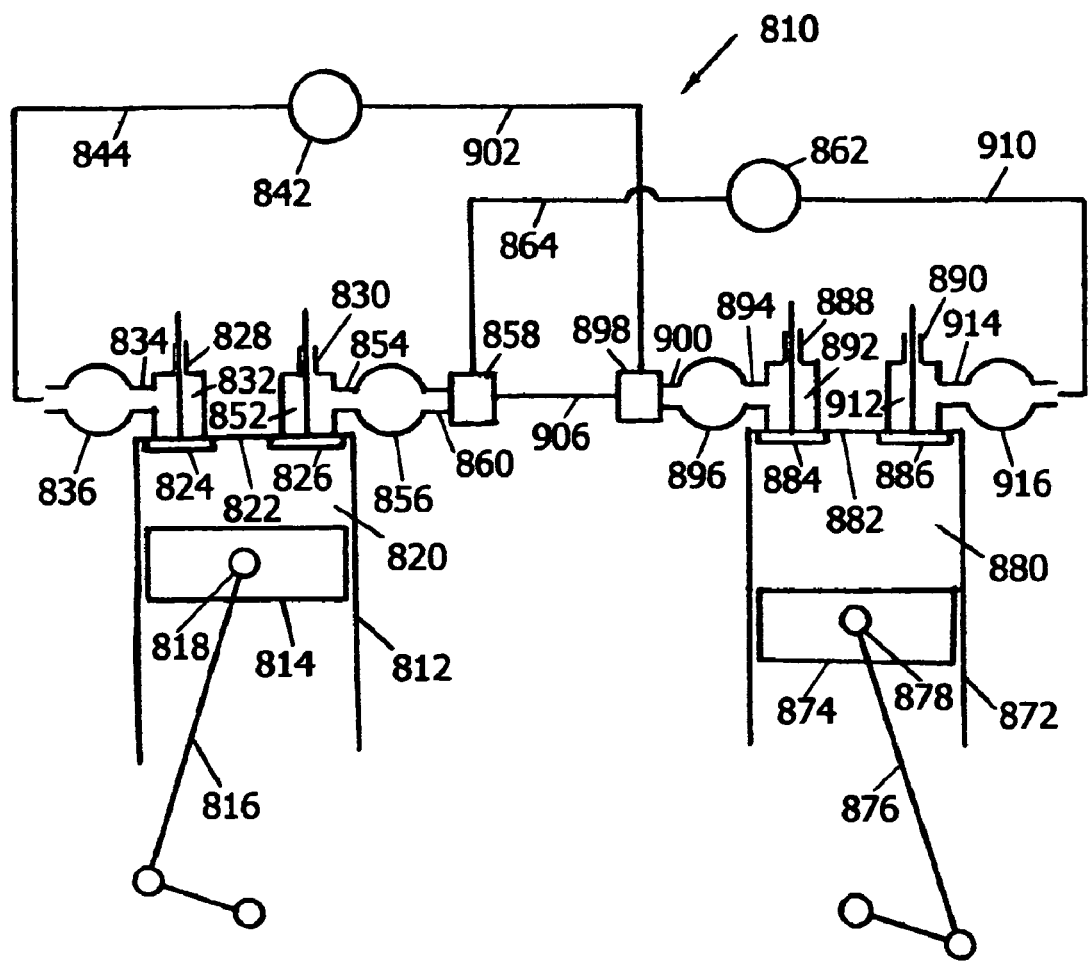
FIG. 22 is a schematic, cross-sectional side-view of two engine cylinders and their gas-flow connections to outside atmosphere and to each other in the first alternative embodiment.
Figure 23:
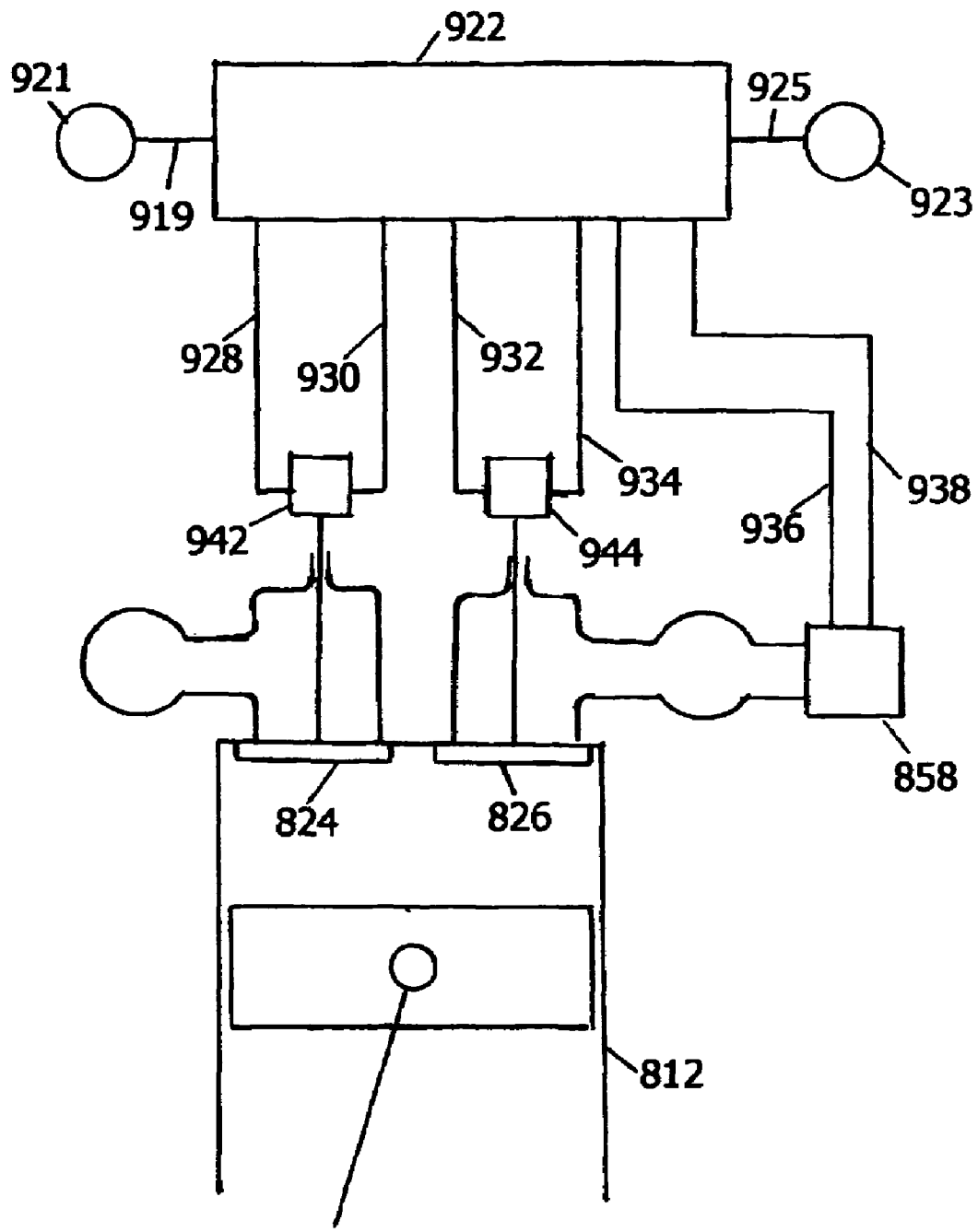
FIG. 23 is a schematic cross-sectional side-view of an engine cylinder illustrating typical schematics of electrical connections controlling operation of valves and switching arrangements under the control of a control system in the first alternative embodiment.
Figure 24:
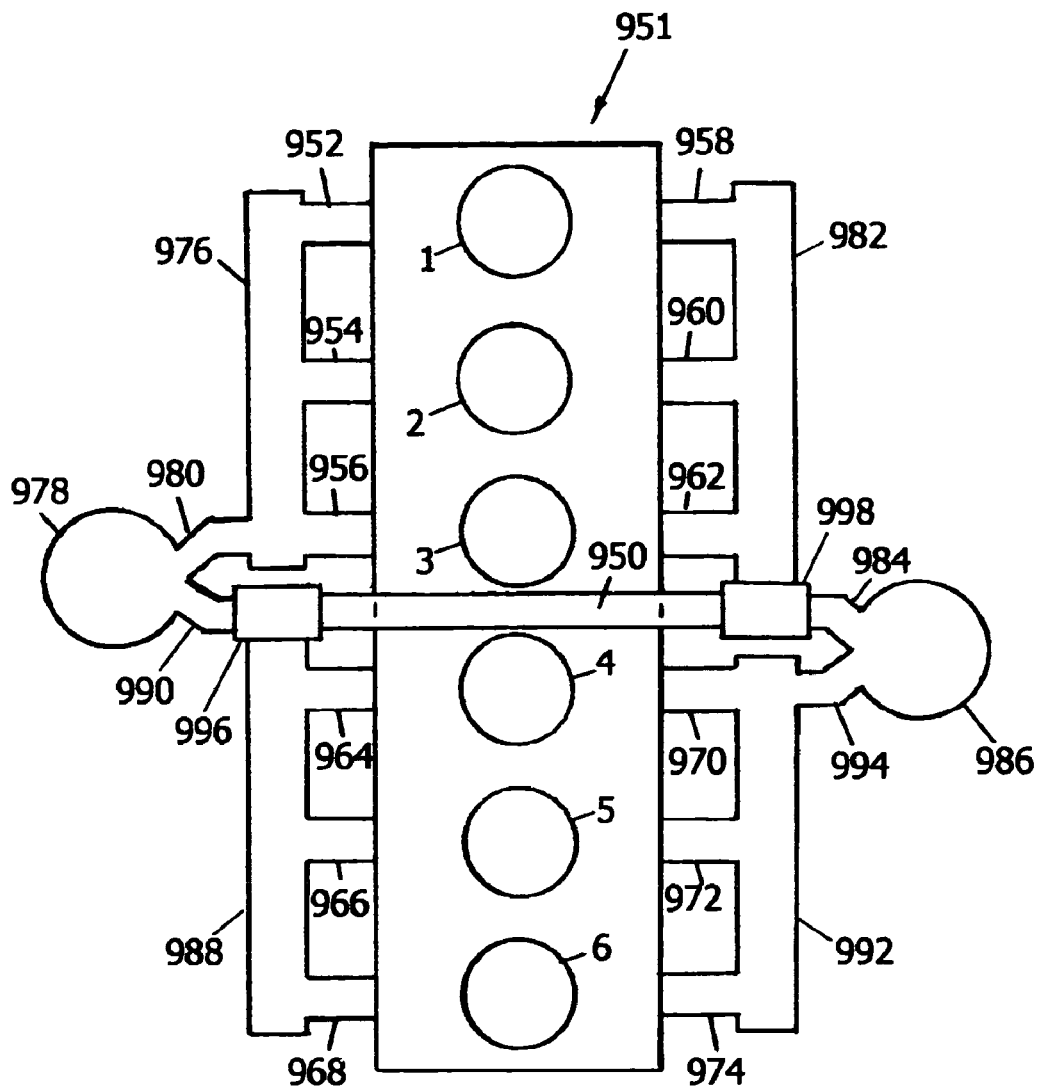
FIG. 24 is a schematic diagram of gas-flow conduits in a six-cylinder in-line engine, arranged in accordance with the first alternative embodiment.

FIGS. 22 to 24

A first alternative embodiment of the present invention is illustrated in FIGS. 22 and 23. FIG. 22 is a schematic, cross-sectional side-view of two engine cylinders and their gas-flow connections to outside atmosphere and to each other. An engine 810 has at least two cylinders, including at least one primary cylinder 812 and at least one secondary cylinder 872. The design of the primary and secondary cylinders is identical, but they may perform different functions, depending on the mode of the engine operation.

Primary cylinder 812 contains a piston 814, which is mounted upon a connecting rod 816 by a wrist pin 818 and can reciprocate in cylinder 812, thus varying the volume of a cylinder chamber 820 enclosed between piston 814 and a cylinder head 822 attached to the top of cylinder 812. There are two types of normally-closed valves in primary cylinder 812, a first valve 824 and a second valve 826. Valves 824 and 826 are installed in cylinder head 822 and are slideably mounted in guides 828 and 830, respectively. Depending on the needs of the engine, there may be more than one valve of each type in each cylinder.

First valve 824 is shown in its closed position in which it separates cylinder chamber 820 from a first port 832 which opens into a first passage 834. First passage 834 connects to a first primary manifold 836, to which all first ports and all first passages from all primary cylinders are connected. First primary manifold 836 is connected to an intake system 842, via a duct 844. Intake system 842 is connected to outside atmosphere.

Second valve 826 is shown in its closed position in which it separates cylinder chamber 820 from a second port 852 which opens into a second passage 854. Second passage 854 connects to a second primary manifold 856, to which all second ports and all second passages from all primary cylinders are connected. Second primary manifold 856 connects to a two-way switching arrangement 858, via a passage 860. Switching arrangement 858 can be selectively connected either to an exhaust system 862, via a duct 864, or to a two-way switching arrangement 898, via a transfer conduit 906. Exhaust system 862 is connected to outside atmosphere, usually through a system of exhaust pipes, a muffler, a catalyst, etc The concept of two-way switching arrangement 858 was described in a previous text and is illustrated in FIG. 3.

Secondary cylinder 872 contains a piston 874, which is mounted upon a connecting rod 876 by a wrist pin 878 and can reciprocate in cylinder 872, thus varying the volume of a cylinder chamber 880 enclosed between piston 874 and a cylinder head 882 attached to the top of cylinder 872. If cylinders 812 and 872 belong to the same bank of cylinders, cylinder head 882 is the same head as cylinder head 822. There are two types of normally-closed valves in cylinder 872, a first valve 884 and a second valve 886. Valves 884 and 886 are installed in cylinder head 882 and are slideably mounted in guides 888 and 890, respectively. Depending on the needs of the engine, there may be more than one valve of each type in each cylinder.

First valve 884 is shown in its closed position in which it separates cylinder chamber 880 from a first port 892 which opens into a first passage 894. First passage 894 connects to a first secondary manifold 896, to which all first ports and all first passages from all secondary engine cylinders are connected. First secondary manifold 896 connects to a two-way switching arrangement 898 via a passage 900. Switching arrangement 898 can be selectively connected either to intake system 842, via a duct 902, or to two-way switching arrangement 858, via transfer conduit 906. The concept of two-way switching arrangement 898 was described in a previous text and is illustrated in FIG. 3.

Second valve 886 is shown in its closed position in which it separates cylinder chamber 880 from a second port 912 which opens into a second passage 914. Second passage 914 connects to a second secondary manifold 916, to which all second ports and all second passages from all secondary cylinders are connected. Second secondary manifold 916 is connected to exhaust system 862, via duct 910.

FIG. 23 is a schematic cross-sectional side-view of an engine cylinder illustrating a typical schematic of electrical connections controlling operation of valves and switching arrangements under the control of a control system 922. It is shown as applied to primary cylinder 812, but all other cylinders are controlled in the same or in similar way.

Control system 922 is an on-board computer programmed to control operation of various components of the engine and the vehicle in accordance with a strategy program incorporated into its software. It receives input signals from a system of sensors, installed in the engine and in the vehicle, and sends out output signals to actuators controlling operation of various components of the system. The signals generated by the sensors inform the control system about vehicle driver's demands for specific vehicle propulsion or braking force, as the case may be. A sensor 921, installed on the vehicle accelerator pedal and connected to control system 922 via an electric line 919, supplies a variable magnitude signal representing the magnitude of the propulsion force demanded by the vehicle driver. A sensor 923, installed on the vehicle brake pedal and connected to control system 922 via an electric line 925, supplies a variable magnitude signal representing the magnitude of the braking force demanded by the vehicle driver. Propulsion force is force acting on the vehicle in a direction of its motion. Braking force is force acting on the vehicle in a direction opposite to its motion. Other input signals (not shown in the drawing) carry information on physical and operational conditions in various parts and components of the engine and the vehicle. The control system evaluates the received information and, in accordance with its internal logic, controls operation of the engine and other vehicle components, so as to satisfy the driver's demands while maintaining optimum fuel consumption efficiency.

Control system 922 controls operation of first valve 824 and second valve 826 by sending control signals to valve actuators 942 and 944, respectively, which effectuate opening and closing of their respective valves. It also controls all valves in all other engine cylinders. The engine employs a camless valvetrain that uses electrohydraulic actuators instead of a camshaft. Such system can provide a fully variable valve timing, lift and event duration. It can also selectively deactivate individual valves and switch the engine operation from four-stroke to two-stroke and back. A reference to some recently developed camless valvetrains and their descriptions was given in Description of the Preferred Embodiment.

Each valve actuator includes two solenoid valves, one controlling the engine valve opening and another one for controlling the valve closing. Accordingly, each valve actuator receives two separate control signals, one for valve opening and one for valve closing. Actuator 942 receives signals for valve opening and closing via lines 928 and 930, respectively. Actuator 944 receives signals for valve opening and closing via lines 932 and 934, respectively. Timing of each valve opening and closing is determined by timing of respective control signals received by its actuator. Varying duration of the signals can vary valve lift.

Those skilled in art will appreciate in view of this disclosure that other methods and systems for variable engine valves actuation may be used according to the present invention. These may include electromechanical or pneumatic camless systems, as well as variety of camshaft-based variable systems, such as hydraulic lost motion, variable mechanism, and other systems. A design and operation of a two-mode camshaft-based valve actuation system, which is especially suitable for the first alternative embodiment, is described in a section entitled "Camshaft-driven Two-mode Engine Valve Operation" in a later text.

Control system 922 controls two-way switching arrangement 858 (FIG. 23). It also controls all the switching arrangements in all other engine cylinders. A description of a typical two-way switching arrangement was given in Description of the Preferred Embodiment and was illustrated in FIG. 3. Control system 922 controls two-way switching arrangement 858 by sending control signals via lines 936 and 938.

The above description described a system comprising one primary and one secondary cylinder, but the same general principle can be applied to a system with more than two cylinders. An example of how the first alternative embodiment can be arranged in a multi-cylinder engine, including more than two cylinders, is described below.

FIG. 24 is a schematic diagram of gas-flow conduits in a six-cylinder in-line engine, arranged in accordance with the first alternative embodiment. In an engine 951, cylinders 1, 2, and 3 are the primary cylinders, and the cylinders 4, 5, and 6 are the secondary cylinders. Manifolds 976 and 982 are first and second primary manifolds, respectively. Manifolds 988 and 992 are first and second secondary manifolds, respectively. A switching arrangement 996 is attached to first secondary manifold 988, and a switching arrangement 998 is attached to second primary manifold 982. A gas transfer conduit 950 runs from switching arrangement 998 to switching arrangement 996.

First passages 952, 954, and 956 can connect primary cylinders 1, 2, and 3, respectively, to first primary manifold 976 that is connected to an intake system 978 through a duct 980. Second passages 958, 960, and 962 can connect primary cylinders 1, 2, and 3 to second primary manifold 982 that is connected to switching arrangement 998. Switching arrangement 998 can be selectively connected either to an exhaust system 986, through a duct 984, or to switching arrangement 996, through gas transfer conduit 950.

First passages 964, 966, and 968 can connect secondary cylinders 4, 5, and 6, respectively, to first secondary manifold 988 that is connected to switching arrangement 996. Switching arrangement 996 can be selectively connected either to an intake system 978, through a duct 990, or to switching arrangement 998, through gas transfer conduit 950. Second passages 970, 972, and 974 can connect secondary cylinders 4, 5, and 6 to second secondary manifold 992 that is connected to exhaust system 986 through a duct 994.

DESCRIPTION OF OPERATION OF THE FIRST ALTERNATIVE EMBODIMENT

FIGS. 11, 12, 23, 25, and 26

The system described in the Description of a First Alternative Embodiment can operate in two propulsion modes, two-stage gas-expansion mode and conventional internal-combustion mode.

Two-Stage Gas Expansion

FIGS. 11, 12, 23, and 25

The two-stage gas expansion is a vehicle propulsion mode intended to minimize the engine fuel consumption. When operating in the two-stage gas-expansion mode, some of the engine cylinders, the primary cylinders, perform a conventional internal combustion cycle. Other engine cylinders, the secondary cylinders, perform a two-stroke gas-expansion cycle. There is no pressure blowdown in the primary cylinders at the end of expansion stroke. Instead, the still pressurized combustion gas is transferred from the primary cylinders into the secondary cylinders. There, it is subjected to a second stage of expansion and exhausted into the exhaust system. Subjecting the gas to a second stage of expansion extracts an additional amount of useful energy. This increases the efficiency of the engine and reduces its fuel consumption.

The timing of opening and closing of the first valves in the secondary cylinders is such that the volume of gas received into the secondary cylinders, during two engine revolutions, is preferably not greater than the displacement of the primary cylinders. The displacement of an engine cylinder is equal to the cylinder volume less its clearance volume.

Figure 25:
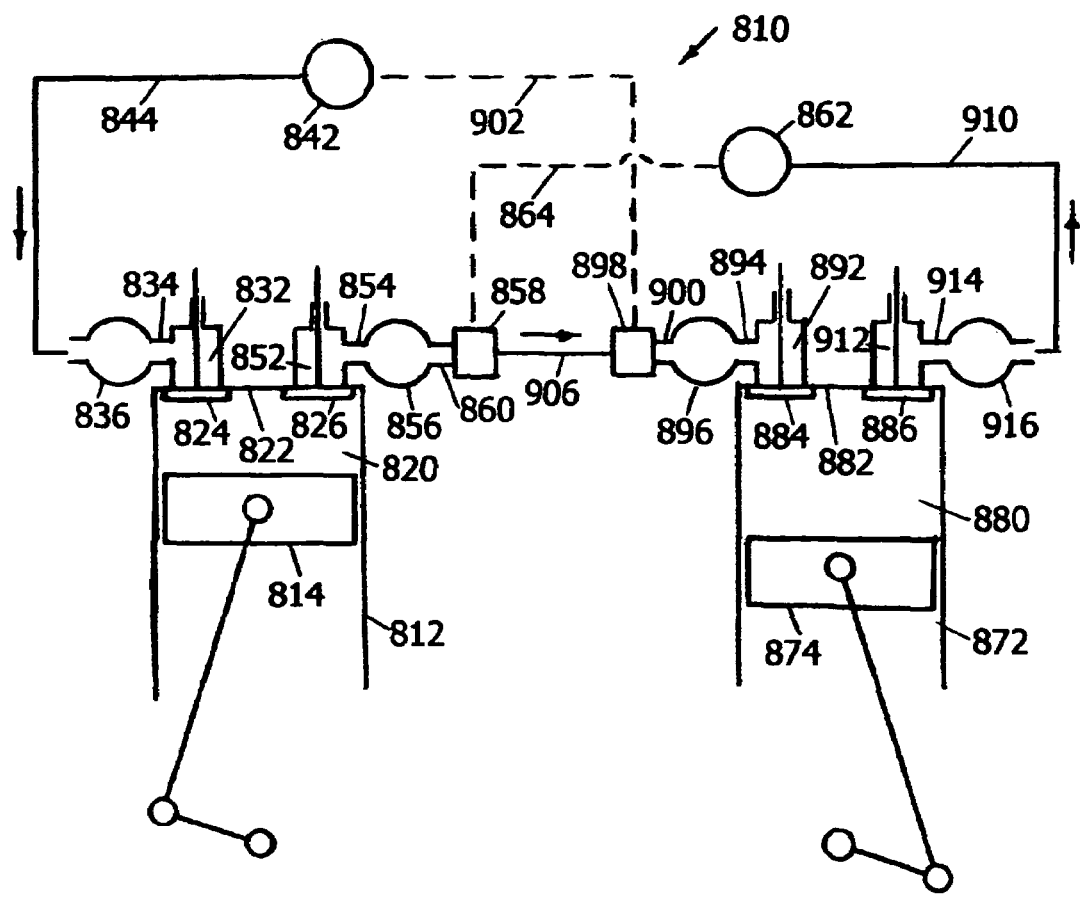
FIG. 25 is a schematic diagram illustrating the engine operation in the two-stage gas-expansion mode in the first alternative embodiment.

FIG. 25 is a schematic diagram illustrating the engine operation in the two-stage gas-expansion mode. In the drawing, the ducts carrying the airflow and the gas flow are shown in solid lines, while the ducts not carrying the flow are shown in dashed lines. Arrows in the drawing show the overall direction of the air and gas flow.

Control system 922 (FIG. 23) sets the connections of the engine switching arrangements into a specific pattern required for operation in the first two-stage gas-expansion mode. Switching arrangement 858 is connected to transfer conduit 906 and disconnected from duct 864. Switching arrangement 898 is connected to transfer conduit 906 and disconnected from duct 902.

During each four-stroke cycle in primary cylinder 812, piston 814 performs a first volume-increasing stroke, when it moves away from cylinder head 822, followed by a first volume-decreasing stroke, when it moves towards cylinder head 822, followed by a second volume-increasing stroke, and followed by a second volume-decreasing stroke. During the first volume-increasing stroke, first valve 824 is open, while the second valve 826 remains closed, and air intake from outside atmosphere takes place. The air flows through intake system 842, duct 844, first primary manifold 836, first passage 834, first port 832, and through open first valve 824 into cylinder chamber 820. Fuel is added to the air either before or after its entrance into cylinder 812. During the first volume-decreasing stroke, both first and second valves, 824 and 826, remain closed, and compression of air trapped in cylinder chamber 820 takes place. Ignition of the air/fuel mixture takes place close to the end of that stroke. During the second volume-increasing stroke, both first and second valves, 824 and 826, remain closed, and combustion of the air/fuel mixture and expansion of the combustion gas takes place in cylinder chamber 820. During a second volume-decreasing stroke, second valve 826 is open, and pressurized combustion gas is expelled from primary cylinder 812 into transfer conduit 906. The air flows from cylinder chamber 820, through open second valve 826, second port 852, second passage 854, second primary manifold 856, passage 860, and switching arrangement 858 into transfer conduit 906. Each four-stroke cycle lasts two engine revolutions.

Secondary cylinder 872 operates in a two-stroke cycle. During each two-stroke cycle piston 874 performs a volume-increasing stroke, when it moves away from cylinder head 882, followed by a volume-decreasing stroke, when it moves towards cylinder head 882. During a first part of the volume-increasing stroke, first valve 884 is open, and secondary cylinder 872 receives pressurized combustion gas from transfer conduit 906. The air flows through switching arrangement 898, passage 900, first secondary manifold 896, first passage 894, first port 892, and through open first valve 884 into cylinder chamber 880. During a second part of the volume-increasing stroke, both first and second valves, 884 and 886, remain closed, and a second expansion of the combustion gas takes place in cylinder chamber 880. During the volume-decreasing stroke, second valve 886 is open, and exhaust of combustion gas from secondary cylinder 872 into exhaust system 862 takes place. The air flows from cylinder chamber 880, through open second valve 886, second port 912, second passage 914, second secondary manifold 916, and duct 910 into exhaust system 862. Two two-stroke cycles in cylinder 872 take place during time it takes for one four-stroke cycle in cylinder 812.

The above described two-stage gas-expansion mode is further illustrated in pressure-volume diagrams in FIGS. 11 and 12. FIG. 11 illustrates the four-stroke internal-combustion cycle taking place in primary cylinder 812 (FIG. 25). First valve 824 (FIG. 25) opens at a point 310, and from point 310 to a point 312 pressure in cylinder chamber 820 (FIG. 25) drops to the level of pressure in intake system 842 (FIG. 25). From point 312 to a point 314, first valve 824 remains open, and cylinder chamber 820 receives air from intake system 842. This takes place during a first volume-increasing stroke. Fuel can be added to the air before or after the air enters the cylinder, depending on the type of the engine.

At point 314, first valve 824 closes, and from point 314 to a point 316, all valves are closed. Air compression, air/fuel mixture formation, and ignition take place during that period. This process takes place during a first volume-decreasing stroke.

From point 316 to a point 318, all valves are still closed, and combustion and combustion-gas expansion is performed. This takes place during a second volume-increasing stroke.

At point 318, second valve 826 (FIG. 25) opens and remains open until its closure at point 310. During that period, pressurized combustion gas is expelled from cylinder chamber 820 into transfer conduit 906 (FIG. 25). This takes place during a second volume-decreasing stroke.

Pressure-volume diagram in FIG. 12 further illustrates the two-stroke gas-expansion cycle taking place in secondary cylinder 872 (FIG. 25). First valve 884 (FIG. 25) opens at a point 320, and from point 320 to a point 322 pressure in cylinder chamber 880 (FIG. 25) rises to the level of pressure in transfer conduit 906 (FIG. 25). From point 322 to a point 324, first valve 884 remains open, and cylinder chamber 880 receives pressurized combustion gas from transfer conduit 906. This takes place during a first part of the volume-increasing stroke.

At point 324, first valve 884 closes, and from point 324 to a point 326, all valves are closed. A second stage of combustion-gas expansion takes place during that period. This process takes place during a second part of the volume-increasing stroke.

At point 326, second valve 886 (FIG. 25) opens and remains open until its closure at point 320. From point 326 to a point 328, gas pressure drops to the level of pressure in exhaust system 862 (FIG. 25). Then, from point 328 to point 320, the twice-expanded combustion gas is expelled from cylinder chamber 880 into exhaust system 862 (FIG. 25). This takes place during a volume-decreasing stroke.

Conventional Four-Stroke Internal Combustion

Figure 26:
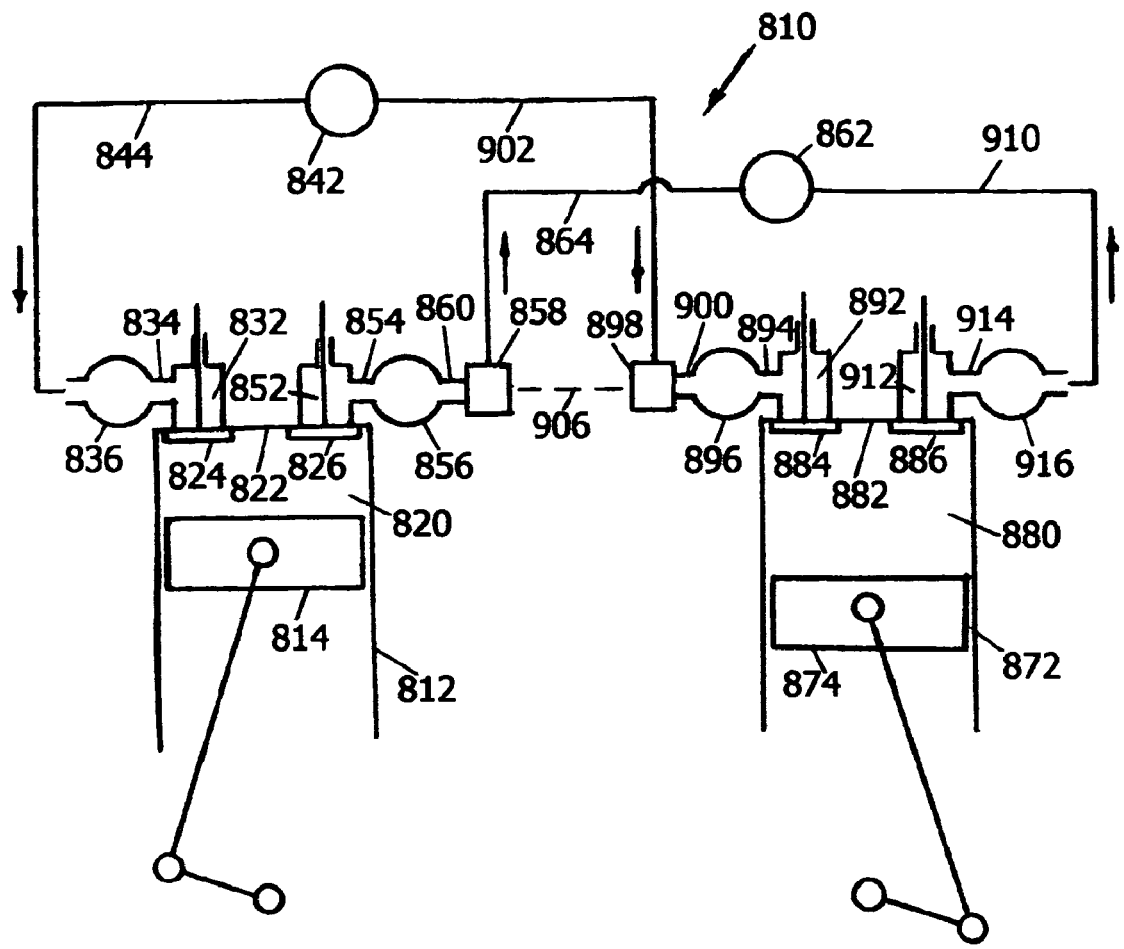
FIG. 26 is a schematic diagram illustrating the engine operation in the conventional four-stroke internal-combustion mode in the first alternative embodiment.

FIGS. 23 and 26

The engine can also operate in a conventional four-stroke internal-combustion mode. FIG. 26 is a schematic diagram illustrating operation in the conventional four-stroke internal-combustion mode. In the drawing, the ducts carrying the airflow and the gas flow are shown in solid lines, while the ducts not carrying the flow are shown in dashed lines. Arrows in the drawing show the overall direction of the air and gas flow.

Control system 922 (FIG. 23) sets the connections of the engine switching arrangements into a specific pattern required for operation in the conventional four-stroke internal combustion mode. Switching arrangement 858 is connected to duct 864 and disconnected from transfer conduit 906. Switching arrangement 898 is connected to duct 902 and disconnected from transfer conduit 906.

During each four-stroke cycle in primary cylinder 812 (FIG. 26), piston 814 performs a first volume-increasing stroke, when it moves away from cylinder head 822, followed by a first volume-decreasing stroke, when it moves towards cylinder head 822, followed by a second volume-increasing stroke, and followed by a second volume-decreasing stroke. During the first volume-increasing stroke, first valve 824 is open, while the second valve 826 remains closed, and air intake from outside atmosphere takes place. The air flows through intake system 842, duct 844, first primary manifold 836, first passage 834, first port 832, and through open first valve 824 into cylinder chamber 820. Fuel is added to the air either before or after its entrance into cylinder 812. During the first volume-decreasing stroke, both first and second valves, 824 and 826, remain closed, and compression of air trapped in cylinder chamber 820 takes place. Ignition of the air/fuel mixture takes place close to the end of that stroke. During the second volume-increasing stroke, both first and second valves, 824 and 826, remain closed, and combustion of the air/fuel mixture and expansion of the combustion gas takes place in cylinder chamber 820. During a second volume-decreasing stroke, second valve 826 is open, and combustion gas is expelled from primary cylinder 812 into exhaust system 862. The air flows from cylinder chamber 820, through open second valve 826, second port 852, second passage 854, second primary manifold 856, passage 860, switching arrangement 858, and duct 864 into exhaust system 862. Each four-stroke cycle lasts two engine revolutions.

Operation of secondary cylinder 872 (FIG. 26) is the same as that of primary cylinder 812. During each four-stroke cycle in secondary cylinder 872, piston 874 performs a first volume-increasing stroke, when it moves away from cylinder head 882, followed by a first volume-decreasing stroke, when it moves towards cylinder head 882, followed by a second volume-increasing stroke, and followed by a second volume-decreasing stroke. During the first volume-increasing stroke, first valve 884 is open, while the second valve 886 remains closed, and air intake from outside atmosphere takes place. The air flows through intake system 842, duct 902, switching arrangement 898, passage 900, first primary manifold 896, first passage 894, first port 892, and through open first valve 884 into cylinder chamber 880. Fuel is added to the air either before or after its entrance into secondary cylinder 872. During the first volume-decreasing stroke, both first and second valves, 884 and 886, remain closed, and compression of air trapped in cylinder chamber 880 takes place. Ignition of the air/fuel mixture takes place close to the end of that stroke. During the second volume-increasing stroke, both first and second valves, 884 and 886, remain closed, and combustion of the air/fuel mixture and expansion of the combustion gas takes place in cylinder chamber 880. During a second volume-decreasing stroke, second valve 886 is open, and combustion gas is expelled from secondary cylinder 872 into exhaust system 862. The air flows from cylinder chamber 880, through open second valve 886, second port 912, second passage 914, second primary manifold 916, and duct 910 into exhaust system 862. Each four-stroke cycle lasts two engine revolutions.

Camshaft-Driven Two-Mode Engine Valve Operation

FIGS. 27, 27A to 27D, and 28

The concept of the first alternative embodiment is much simpler than the concept of the preferred embodiment, because it involves only two modes of engine operation. Therefore the method of engine valve actuation, in the first alternative embodiment, can also be substantially simpler than in the preferred embodiment. For example, a relatively simple camshaft-based valve-actuation system can be used. Using a camshaft-based system can offer a substantial cost advantage relative to some other systems, such as, for example, the electrohydraulic system, because it requires a much smaller number of expensive electronic devices.

To operate the valves in the primary cylinders, a camshaft-based valve-actuation system can utilize a conventional camshaft that operates the valves in the same single mode, regardless of the mode of engine operation. This is because, in both the conventional and the two-stage gas-expansion modes, the primary cylinders operate in the same four-stroke internal-combustion cycle that requires opening each valve once during each camshaft revolution. However, valve operation in the secondary cylinders requires a two-mode camshaft-based system. In one mode, when the engine operates in a conventional internal-combustion mode, and the secondary cylinders operate in a four-stroke cycle, the camshaft should be able to open each valve once during every camshaft revolution. In another mode, when the engine operates in the two-stage gas-expansion mode, and the secondary cylinders operate in a two-stroke cycle, the camshaft should be able to open each valve twice during each camshaft revolution. Such a two-mode camshaft-based system and its operation are described below.

FIG. 27 is a schematic diagram illustrating a camshaft-driven two-mode engine valve operation suitable for use in the first alternative mode. It is used to operate valves in secondary cylinders. The system and the method of operation described below are capable to operate an engine valve in two different modes. In a first mode, the engine valve opens once every camshaft revolution for a relatively long period of time—usually slightly longer than the duration of the engine piston stroke. This mode of valve operation is used during the conventional four-stroke internal-combustion mode of the engine operation. In a second mode, the engine valve opens twice, during each camshaft revolution. If it is a first valve, it opens twice for relatively short periods of time. If it is a second valve, it opens twice for relatively long periods of time. This second mode of valve operation is used during the two-stage gas-expansion mode of the engine operation.

A camshaft 1010 rotates with half the crankshaft speed. It has three camlobes, a first camlobe 1012 and two second camlobes, 1014, and 1016, for each engine valve. A lateral crossection of camlobe 1012, showing its shape in a plane perpendicular to the camshaft axis, is shown in FIG. 27A. It has a single lobe 1018. Camlobes 1014 and 1016 are identical. A lateral crossection of camlobe 1014 (the same as camlobe 1016), showing its shape in a plane perpendicular to the camshaft axis, is shown in FIG. 27B. It has two lobes, 1020 and 1022, on opposite ends of its circumference.

Rotation of camshaft 1010 controls motion of an engine valve 1024 by operating an actuator 1000 that can apply a valve-opening force to a valve tappet 1026. A valve spring 1028 provides a valve-closing force. Actuator 1000 has three main moving parts—a first input member 1030, a second input member 1032, and an output member 1034. First input member 1030 is driven by camlobe 1012. Second input member 1032 is driven by camlobes 1014 and 1016. Output member 1034 drives engine valve 1024.

Figure 27D:
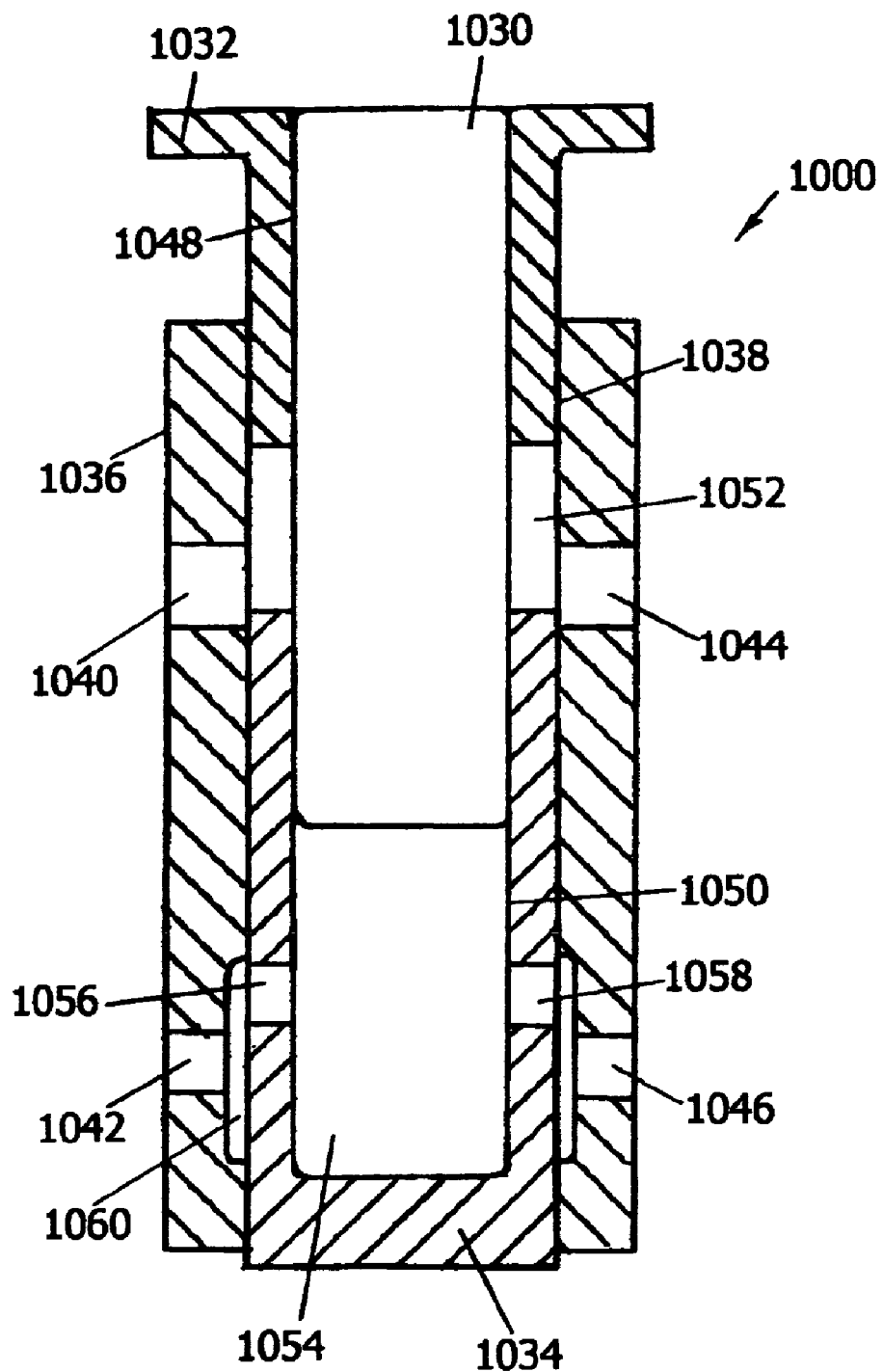
FIG. 27D is an enlarged crossection of the actuator in FIG. 27.

An enlarged crossection of actuator 1000 is shown in FIG. 27D. An actuator housing 1036 is attached to the engine cylinder head (not shown). Housing 1036 has a cylindrical hole 1038 (FIG. 27D), coaxial with the axis of engine valve 1024 (FIG. 27), two inlet ports, 1040 and 1042, and two outlet ports, 1044 and 1046. Second input member 1032 and output member 1034 slidingly fit into hole 1038. First input member 1030 slidingly fits into a cylindrical hole 1048, inside second input member 1032, and into a cylindrical hollow 1050 inside output member 1034. The installation of the three members, inside actuator 1000, forms two hydraulic chambers—a ring-shaped first chamber 1052 and a cylindrical second chamber 1054. First chamber 1052 is always connected to inlet port 1040 and outlet port 1044. Second chamber 1054 is always connected to inlet port 1042 and outlet port 1046, through holes 1056 and 1058 and annulus 1060.

A control valve 1078 (FIG. 27) has three hydraulic ports—a first inlet port 1080, a second inlet port 1082, and an outlet port 1084. Typically, control valve 1078 is a solenoid valve, but other types of control valve actuation, such as vacuum, pneumatic, or hydraulic actuators can also be used. The design of internal connections inside control valve 1078 is such that it can selectively operate in one or another of two modes. In a first mode, outlet port 1084 is connected to first inlet port 1080 and disconnected from second inlet port 1082, as shown in FIG. 27. In a second mode, outlet port 1084 is connected to second inlet port 1082 and disconnected from first inlet port 1080, as shown in FIG. 27C. A control system 1090 can selectively set the operation of control valve 1078 either into the first or into the second mode by sending control signals to control valve 1078, via an electric cable 1092.

A pump 1062 (FIG. 27) receives incompressible hydraulic fluid from a sump 1064, through a pipe 1066, and pumps the fluid through a pipe 1068 to a fork 1071. There, the hydraulic path divides into two branches, an upper branch 1002 and a lower branch 1004. Upper branch 1002 includes a first inlet pipe 1070, inlet port 1040, chamber 1052 (FIG. 27D), outlet port 1044, and a first outlet pipe 1086 leading to first inlet port 1080 in control valve 1078. Lower branch 1004 includes a second inlet pipe 1072, inlet port 1042, annulus 1060 (FIG. 27D), outlet port 1046, and a second outlet pipe 1088 leading to second inlet port 1082 in control valve 1078. Check valves 1074 and 1076 are incorporated into inlet pipes 1070 and 1072, respectively. Check valves 1090 and 1092 are incorporated into outlet pipes 1086 and 1088, respectively. The check valves prevent backflow of fluid from actuator 1000 to fork 1071, and from control valve 1078 to actuator 1000.

If control valve 1078 operates in the first mode, the fluid flows from fork 1071 to control valve 1078 through upper branch 1002 and there is no flow through lower branch 1004, because second outlet pipe 1088 is dead-ended at second inlet port 1082. If, on the other hand, control valve 1078 operates in the second mode (FIG. 27C), the fluid flows from fork 1071 to control valve 1078 through lower branch 1004 and there is no flow through upper branch 1002, because first outlet pipe 1086 is dead-ended at first inlet port 1080.

From outlet port 1084 (FIG. 27), the fluid flows through a pipe 1094 into a pressure regulator 1086 and, from there, returns to sump 1064 through a pipe 1088. Pressure regulator 1086 keeps the system, upstream of the regulator, under a pressure that is sufficient to assure that first input member 1030 and second input member 1032 remain in physical contact with camlobes 1012, 1014, and 1016, and output member 1034 remains in physical contact with valve tappet 1026, but is insufficient to overcome the preload of valve spring 1028.

To operate the engine in the conventional four-stroke internal-combustion mode, control system 1090 sets control valve 1078 operation into the first mode, as shown in FIG. 27. In that mode, fluid can freely flow into and out of chamber 1052 (FIG. 27D), and motion of second input member 1032, driven by camlobes 1014 and 1016, has no effect on output member 1034. On the other hand, fluid in chamber 1054 (FIG. 27D) is trapped there, and motion of first input member 1030, driven by camlobe 1012, is transmitted, through the trapped fluid, to output member 1034 that drives engine valve 1024. As a result, the motion of engine valve 1024 is determined by the shape of camlobe 1012. Engine valve 1024 opens once every camshaft 1010 revolution, with duration and timing of its opening determined by camlobe 1012.

To operate the engine in the two-stage gas-expansion mode, control system 1090 sets control valve 1078 operation into the second mode, as shown in FIG. 27C. In that mode, fluid can freely flow into and out of chamber 1054 (FIG. 27D), and motion of first input member 1030, driven by camlobe 1012, has no effect on output member 1034. On the other hand, fluid in chamber 1052 (FIG. 27D) is trapped there, and motion of second input member 1032, driven by camlobes 1014 and 1016, is transmitted, through the trapped fluid, to output member 1034 that drives engine valve 1024. As a result, the motion of engine valve 1024 is determined by the shape of camlobes 1014 and 1016. Engine valve 1024 opens twice every camshaft 1010 revolution, with duration and timing of its opening determined by camlobes 1014 and 1016 . . . .

Figure 28:
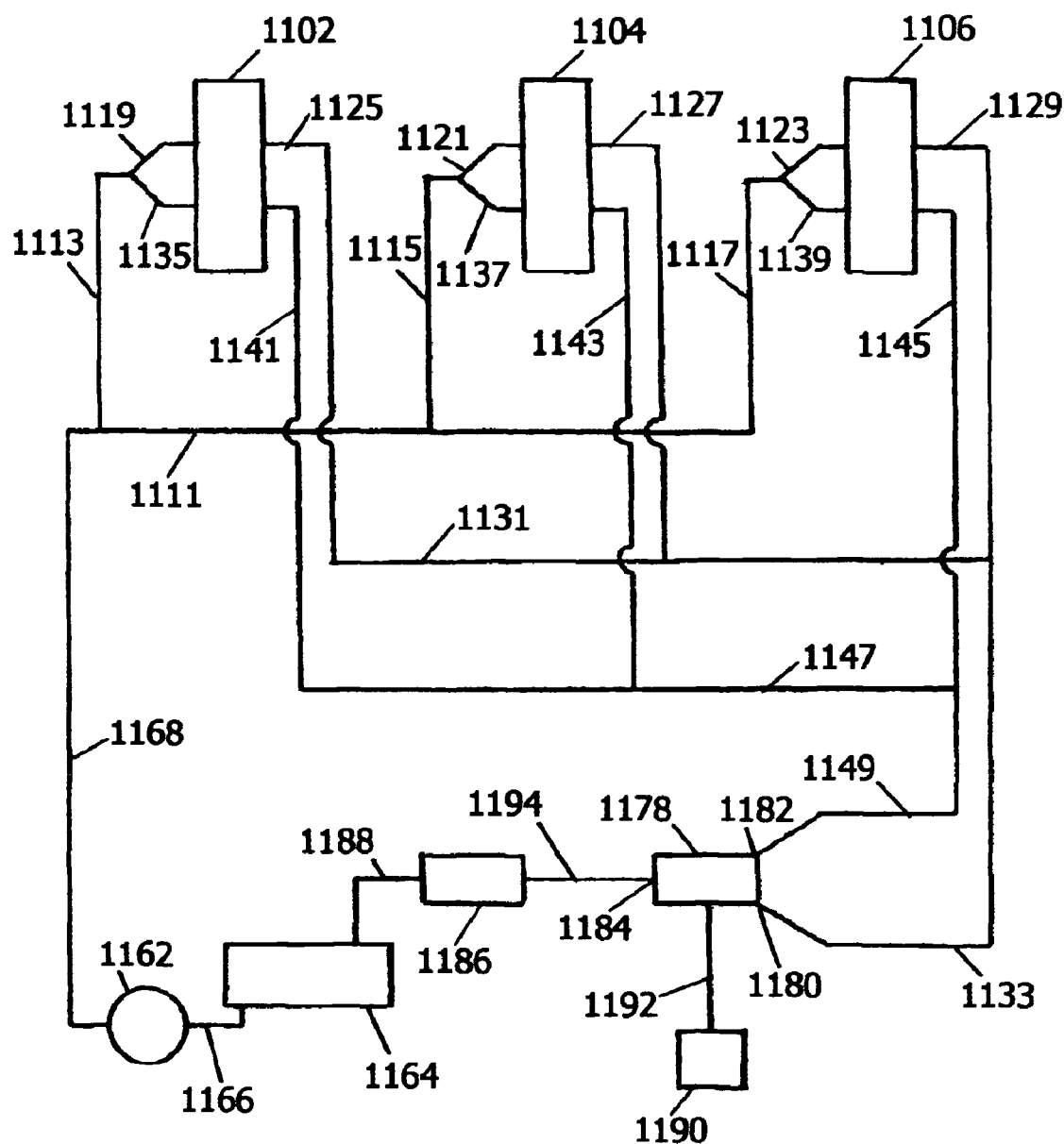
FIG. 28 is an enlarged crossection of the actuator 1000 used in the camshaft-driven two-mode engine valve actuation system.

In a multicylinder engine, a single control valve can control all actuators operating all valves in all secondary cylinders. This is illustrated in FIG. 28. FIG. 28 is a schematic diagram showing how a single control valve 1178, designed and controlled in the same way as control valve 1078 in FIG. 27, controls a group of actuators, 1102, 1104, and 1106, each designed in the same way as actuator 1000 in FIGS. 27 and 27D. Each actuator is equipped with a complement of four check valves (not shown), as it was shown in FIG. 27.

A pump 1162 receives hydraulic fluid from a sump 1164, through a pipe 1166, and pumps it through a pipe 1168 into a common rail 1111 that branches out into pipes 1113, 1115, and 1117 leading to actuators 1102, 1104, and 1106, respectively. Control system 1190 can selectively and alternatively set control valve 1178 into a first or a second mode of operation by sending control signals via a cable 1192.

When control valve 1178 is in the first mode, fluid flows into actuators 1102, 1104, and 1106 through first inlet pipes 1119, 1121, and 1123, respectively, and flows out of the above actuators through first outlet pipes 1125, 1127, and 1129, respectively. Pipes 1125, 1127, and 1129 bring the fluid into a common rail 1131 that connects to a pipe 1133 conveying the fluid to a first inlet port 1180 in control valve 1178.

When control valve 1178 is in the second mode, fluid flows into actuators 1102, 1104, and 1106 through second inlet pipes 1135, 1137, and 1139, respectively, and flows out of the above actuators through second outlet pipes 1141, 1143, and 1145, respectively. Pipes 1141, 1143, and 1145 bring the fluid into a common rail 1147 that connects to a pipe 1149 conveying the fluid to a second inlet port 1182 in control valve 1178.

From outlet port 1184, in control valve 1178, the fluid flows through a pipe 1194 into a pressure regulator 1186 and, from there, returns to sump 1164 through a pipe 1188. Pressure regulator 1186 performs the same function as in the system illustrated in FIG. 27.

The group of actuators, shown in FIG. 28, is limited to three actuators, but the same organizing principle can be applied to a much larger group that would operate all valves in all secondary cylinders and could be controlled by a single control valve. Identical actuators can be used for all valves in all secondary cylinders, but differently shaped camlobes are used to operate the first and second valves.

The above description of the two-mode camshaft-based valve actuation system described an arrangement, in which the camshaft-driven two-mode actuator acts directly on the tappet of the engine valve. Those skilled in art will appreciate in view of this disclosure that other types of arrangements, in which a two-mode actuator actuates an engine valve, may be used to effectuate the two mode valve operation, according to the present invention. For example, in some engines, the camshaft is not installed above the cylinder head, but is located in the proximity of the crankshaft, and the camshaft-induced motion is transmitted to the engine valve through a mechanical system that includes a pushrod. In such engine, the two-mode actuator would be interposed between the camshaft and the pushrod, and the actuator housing would be attached to some stationary part of the engine. Even in engines with over-the-head camshaft, the camshaft is often not directly over the valve and acts on the valve through a system of levers. In such case, the two-mode actuator can act on the valve through a system of levers. If the engine cylinder has two first valves and/or two second valves, two valves of the same type can be joined by a rigid bridge, and the actuator would act on the bridge, thus moving the two valves together. Other variations of the basic design are possible. For example, the above description describes a camshaft with three camlobes acting on two input members. Those skilled in art will appreciate that two camlobes can perform the same function. Using three camlobes improves the design, because it contributes to symmetrical distribution of forces and to reduced friction, but in principle, only two camlobes are needed to drive the two input members. Some changes to the design of the two-mode actuator are possible too. The above described actuator employs a design that features a coaxial arrangement of the input and output members, a circular crossection of each member and only one member of each type. It is clear, however, that such arrangement and such shape of the input and output members are not mandatory for performance of the required function. The two input members may be parallel to each other, the crossection of all or some of the members may be non-circular, and the design may incorporate more than one member of each type, operating in-parallel. There may be mechanical stops, inside the actuator, that insure that there is some minimal clearance between the camlobes and the input members when the engine valve is closed. There may also be more than one valve spring and other spring-like components or substances, such as compressed gas, may be used to close the engine valve. A variety of liquids can serve as the incompressible hydraulic fluid, including diesel fuel. Those skilled in art will appreciate in view of this disclosure that the above listed modifications and numerous other changes can be implemented without deviating from the basic concept, according to the present invention.

DESCRIPTION OF THE SECOND ALTERNATIVE EMBODIMENT

FIGS. 22 to 24 and FIG. 29

An engine capable to operate with a two-stage gas expansion, as described in the Description of the First Alternative Embodiment and illustrated in FIGS. 22 to 24, can be combined with an on-board electric propulsion system capable to absorb the energy of the vehicle motion during braking, store it, and use it to assist in vehicle propulsion at a later time. This combines the fuel economy advantage of braking energy recovery during frequent braking and acceleration, typical for city driving, and an improvement in fuel consumption due to the two-stage gas expansion during cruising with approximately constant speed, typical for highway driving. Achieving a substantial reduction in fuel consumption both in city and in highway driving leads to a significantly better fuel economy results than what can be expected in conventional electric hybrid vehicles using electric propulsion combined with a conventional internal-combustion engine.

Figure 29:
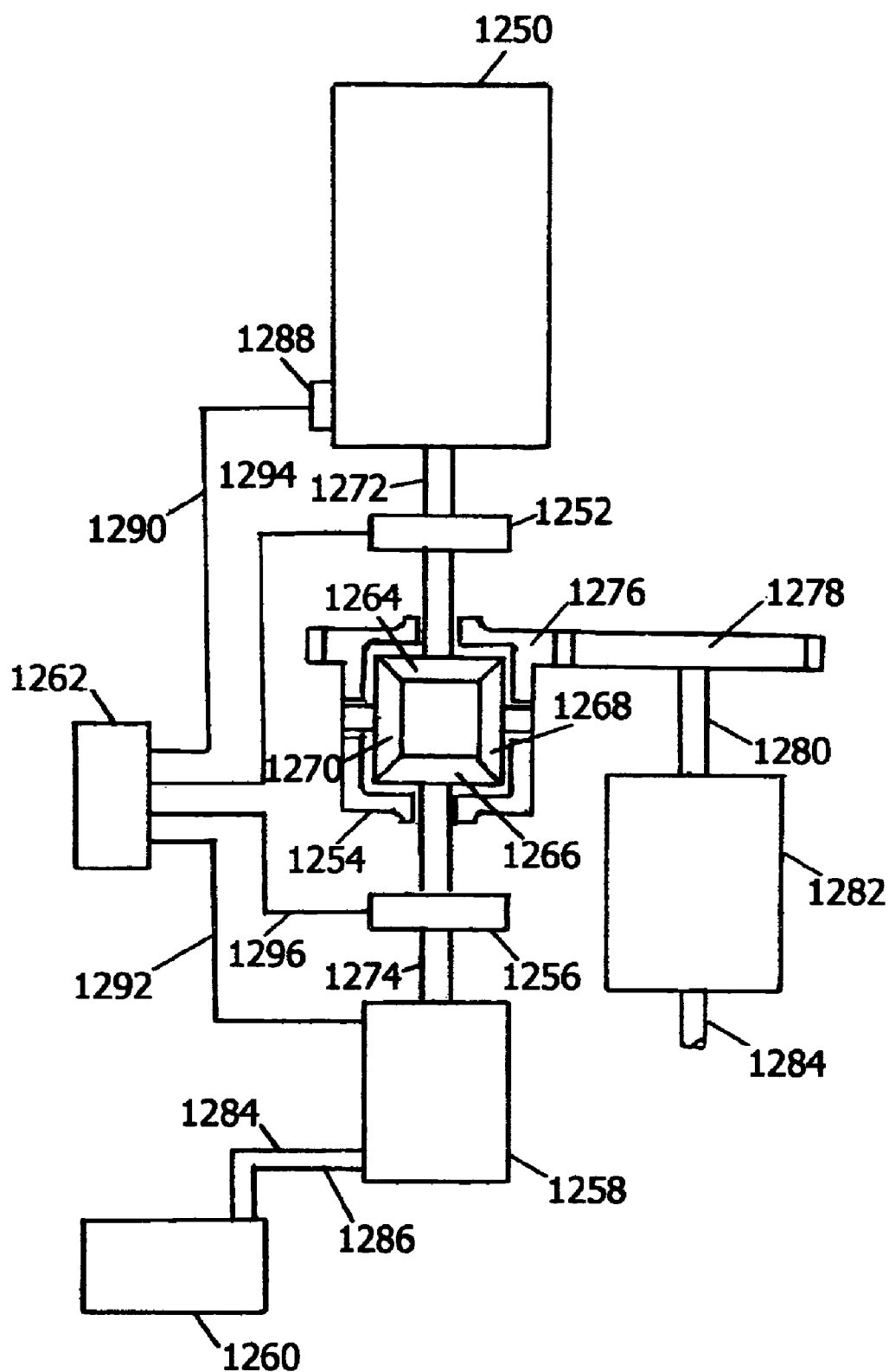
FIG. 29 is a schematic diagram illustrating the second alternative embodiment illustrating a two-stage gas-expansion system combined with an electric-hybrid system.

FIG. 29 is a schematic diagram illustrating the second alternative embodiment. The system includes an engine 1250, which is capable to operate in the two-stage gas-expansion mode, an engine brake 1252, a gear housing 1254, a motor brake 1256, an electric motor/generator 1258, an electric battery 1260, and a control system 1262. Four bevel gears, 1264, 1266, 1268, and 1270, are rotatably mounted inside gear housing 1254, which itself is rotatable about an axis of rotation coinciding with axes of rotation of gears 1264 and 1266. Each of the four bevel gears is engaged with two adjacent bevel gears. Together with rotatable gear housing 1254, the four bevel gears form a planetary gear arrangement. An engine shaft 1272 is coupled to bevel gear 1264. Engine brake 1252 can be either engaged, when it prevents rotation of engine shaft 1272, or disengaged, when it permits rotation of engine shaft 1272. A motor shaft 1274 is coupled to bevel gear 1266. Motor brake 1256 can be either engaged, when it prevents rotation of motor shaft 1274, or disengaged, when it permits rotation of motor shaft 1274. Engagement and disengagement of brakes 1252 and 1256 is performed by built-in electrohydraulic or electropneumatic actuators (not shown) controlled by control system 1262.

A gear 1276, which is integral with gear housing 1254, is engaged with a gear 1278. Gear 1278 is coupled to transmission input shaft 1280 that drives transmission 1282. Transmission output shaft carries the torque to or from the vehicle wheels. Motor/generator 1258 is electrically connected to electric battery 1260 via a power cable 1284 and a ground cable 1286. Alternatively, a ground cable can connect the battery to the vehicle body.

Control system 1262 controls operation of engine 1250 via a multi-wire cable 1290, which carries a multitude of control signals to a distributor box 1288. From distributor box 1288, control signals are forwarded to individual engine components and systems, such as valves, switching arrangements, etc. Control system 1262 also controls operation of motor/generator 1258, via a cable 1292, and operation of engine and motor brakes 1252 and 1256, via cables 1294 and 1296, respectively. A control program, incorporated into the control system software, is designed to assure that engine 1250 and motor/generator 1258 cooperate in a manner that assures that the vehicle achieves the best fuel economy, while operating in accordance with the driver's demands.

DESCRIPTION OF OPERATION OF THE SECOND ALTERNATIVE EMBODIMENT

FIG. 29

Braking

During braking, engine brake 1252 (FIG. 29) is engaged, thus preventing rotation of engine shaft 1272 and bevel gear 1264. Motor brake 1256 is disengaged, thus permitting rotation of motor shaft 1274 and bevel gear 1266. A torque, generated by vehicle momentum, comes from the vehicle wheels and is transferred through transmission output shaft 1284, transmission 1282, transmission input shaft 1280, gear 1278, and gear 1276 to gear housing 1254. Since rotation of bevel gear 1264 is prevented, rotation of gear housing 1254 causes rotation of bevel gear 1266 and motor shaft 1274 that drives motor/generator 1258. In this case, motor/generator 1258 operates as an electric generator producing an electric current that charges electric battery 1260. A reaction torque of the motor/generator is transmitted back to the vehicle wheels, where it produces a vehicle braking force. Control system 1262 controls the magnitude of the vehicle braking force in accordance with the driver's demand by controlling the motor/generator torque.

Acceleration

During acceleration the vehicle can be driven either by the motor/generator or by the engine. Motor/generator 1258 can drive the vehicle, if the required torque does not exceed its capacity and there is sufficient electric charge in battery 1260. In that case, motor/generator 1258 can drive the vehicle by operating as an electric motor drawing energy from battery 1260. As in the case of braking, engine brake 1252 is engaged and motor brake 1256 is disengaged, and rotation and the torque of motor shaft 1274 is transmitted through bevel gear 1266, gear housing 1254, gear 1276, gear 1278, transmission input shaft 1280, transmission 1282, and transmission output shaft 1284 to the vehicle wheels, thus producing a vehicle propulsion force. Control system 1262 controls the magnitude of the vehicle propulsion force in accordance with the driver's demand by controlling the motor/generator torque.

When the electric charge in battery 1260 drops below a certain predetermined level, control system 1262 stops operation of motor/generator 1258, and engine 1250 takes over the task of acceleration. Motor brake 1256 becomes engaged, thus preventing rotation of motor shaft 1274 and bevel gear 1266. Engine brake 1252 becomes disengaged, thus permitting rotation of engine shaft 1272 and bevel gear 1264. Engine torque is transmitted through engine shaft 1272, bevel gear 1264, gear housing 1254, gear 1276, gear 1278, transmission input shaft 1280, transmission 1282, and transmission output shaft 1284 to the vehicle wheels. Depending on the magnitude of the required torque, the engine can operate either in a two-stage gas expansion mode or in a conventional internal-combustion mode. Control system 1262 is programmed to operate the engine in the two-stage gas expansion mode whenever possible, as determined by the control system internal logic. This assures a better fuel economy.

In some cases, motor/generator 1258 and engine 1250 can complement each other. In such case, both engine brake 1252 and motor brake 1256 are disengaged, and both motor/generator 1258 and engine 1250 operate, supplying their torques to gear housing 1254 through bevel gears 1264 and 1266, respectively. The resulting torque is then transferred to the vehicle wheels. Control system 1262 controls and coordinates operation of both motor/generator 1258 and engine 1250 in accordance with a program incorporated in its software.

Cruise

During cruise at approximately constant speed, engine brake 1252 is disengaged, while motor brake 1256 is engaged. The engine torque is transmitted through engine shaft 1272, bevel gear 1264, gear housing 1254, gear 1276, gear 1278, transmission input shaft 1280, transmission 1282, and transmission output shaft 1284 to the vehicle wheels. Since the required torque, during cruise, is relatively low, control system 1262 operates the engine in the two-stage gas-expansion mode.

Stop

During vehicle stops, the engine is shut down for the duration of each stop, thus saving fuel. When it is time to drive again, the vehicle is initially driven by motor/generator 1258, until engine 1250 takes over.

CONCLUSION, RAMIFICATIONS, AND SCOPE OF INVENTION

Accordingly, it should be evident to the reader that the method and the system of the present invention can assure a substantial improvement in vehicle fuel economy and a reduction in harmful exhaust emission. This is accomplished by combining a hybrid operation during stop-and-go operation, typical for city driving, with the two-stage gas-expansion operation during cruising, typical for highway driving. As a result, a significant improvement in fuel consumption and exhaust emission is achieved both in the city and on the highway.

Although the description above contains many specificities, these should not be construed as limiting the scope of the invention, but as merely providing illustrations of some of the presently preferred embodiments of this invention. For example, although the description considered an air hybrid and an electric hybrid, other types of hybrids, such as, for example, fluid power hybrid can be used too within the scope of the present invention. Although the description mostly refers to road vehicles such as automobiles, the present invention can also be used in all-terrain vehicles, motorcycles, railroad engines, tractors, military vehicles, etc.

Thus the scope of the invention should be determined by the appended claims and their legal equivalents, rather than by the examples given.

I claim:

1. A method of operating a vehicle, said method comprising the steps of:
   (a) providing an engine mounted in said vehicle and coupled to at least one vehicle wheel for its propulsion and braking, said engine including:
      (1) at least two cylinders and a cylinder chamber within each of said at least two cylinders, said at least two cylinders including at least one primary cylinder and at least one secondary cylinder,
      (2) a head mounted to said at least two cylinders, and
      (3) a piston in each of said at least two cylinders, with the piston to head and cylinder relationship being such that the volume of said cylinder chamber shrinks during a volume-decreasing stroke when said piston moves towards said head, and expands during a volume-increasing stroke, when said piston moves away from said head,
   (b) providing a control means for controlling the operation of said engine and said vehicle in response to driver's demands and in accordance with a control program incorporated in said control means,
   (c) providing a gas-transfer means for transferring gas between said at least one primary cylinder and said at least one secondary cylinder,
   (d) providing a gas exchange controlling means for selectively, variably, and alternatively connecting said at least two cylinders to outside atmosphere and to said gas-transfer means, in timed relation to said engine operation,
   (e) responding to a demand for a vehicle propulsion force by operating said engine in a mode selected from a set of propulsion modes in accordance with said control program, said set of propulsion modes comprising a two-stage gas-expansion mode, said two-stage gas-expansion mode including the steps of:
      (1) repeatedly performing a four-stroke internal combustion cycle in said at least one primary cylinder, said four-stroke internal combustion cycle including the steps of:
         (A) receiving air and fuel into said at least one primary cylinder during a first volume-increasing stroke,
         (B) compression of said air inside said at least one primary cylinder during a first volume-decreasing stroke,
         (C) combustion of air and fuel mixture inside said at least one primary cylinder, whereby said air and fuel mixture is converted into a combustion gas inside said at least one primary cylinder, (D) expansion of said combustion gas inside said at least one primary cylinder during a second volume-increasing stroke, said expansion being terminated without a gas blow-down at the end of said second volume-increasing stroke, whereby said combustion gas performs useful mechanical work on a piston and still remains pressurized at the end of said second volume-increasing stroke, and (E) expulsion of pressurized combustion gas from said at least one primary cylinder into said gas-transfer means during a second volume-decreasing stroke, said expulsion being performed without a reduction in said pressurized combustion gas pressure, whereby said pressurized combustion gas still retains a substantial amount of internal energy that was not dissipated during a blowdown, (2) using said gas-transfer means for transferring said pressurized combustion gas from said at least one primary cylinder into said at least one secondary cylinder, said transferring being performed without any increase in said pressurized combustion gas pressure and temperature and without adding additional air and fuel, and (3) repeatedly performing a two-stroke gas-expansion cycle in said at least one secondary cylinder, said two-stroke gas-expansion cycle taking place during one engine revolution and two said two-stroke gas-expansion cycles taking place in said secondary cylinder during time it takes for one four-stroke internal-combustion cycle in said primary cylinder, said two-stroke gas-expansion cycle including the steps of:

(A) receiving said pressurized combustion gas from said transfer means into said at least one secondary cylinder during a first part of a volume-increasing stroke, volume of said pressurized combustion gas received into said secondary cylinder during two two-stroke cycles being not greater than volume displaced from said primary cylinder during each four-stroke cycle, whereby only a first part of the piston stroke is needed to receive said pressurized combustion gas into said secondary cylinder and a second part of said piston stroke is available to perform further gas expansion, and whereby said at least one secondary cylinder becomes filled with combustion gas only and no additional air and fuel are added to its content, (B) performing a further expansion of said pressurized combustion gas in said at least one secondary cylinder during a second part of said volume-increasing stroke, said further expansion being performed without being preceded by gas compression and combustion in said secondary cylinder, whereby there is no combustion in said at least one secondary cylinder, and whereby useful mechanical work performed on a piston in said at least one secondary cylinder uses only internal energy still retained in said pressurized combustion gas after its expulsion from said at least one primary cylinder, and (C) expelling said combustion gas from said at least one secondary cylinder during a volume-decreasing stroke, whereby said further expansion of said combustion gas in said at least one secondary cylinder extracts additional useful energy from said combustion gas without using additional fuel energy, and whereby said engine fuel consumption is reduced.

2. The method of claim 1 further including the steps of:

(a) providing an air-reservoir means mounted in said vehicle for receiving, storage and discharge of compressed air, (b) providing a gas exchange controlling means for selectively, variably, and alternatively connecting said at least two cylinders to said air-reservoir means, and (c) operating said engine in a compression-braking mode in response to a demand for a vehicle braking force, when said vehicle is in motion, said compression-braking mode comprising the steps of:

(1) selectively and alternatively connecting said at least one primary cylinder to outside atmosphere and to said gas-transfer means, (2) selectively and alternatively connecting said at least one secondary cylinder to said gas-transfer means and to said air-reservoir means, and (3) repeatedly performing a two-stage compressor cycle, said two-stage compressor cycle including the steps of:

(A) receiving air from outside atmosphere into said at least one primary cylinder and compressing said air inside said cylinder chamber, (B) substantially transferring said air from said at least one primary cylinder into said at least one secondary cylinder, (C) performing additional compression of said air in said cylinder chamber within said at least one secondary cylinder, and (D) substantially transferring said air from said at least one secondary cylinder into said air-reservoir means.

3. The method of claim 2 wherein said operation of said engine in a compression-braking mode further comprises the steps of:

(a) selectively and alternatively connecting said at least two cylinders to outside atmosphere and to said air-reservoir means, and (b) repeatedly performing a single-stage compressor cycle in each of said at least two cylinders, said single-stage compressor cycle including the steps of:

(1) receiving air from outside atmosphere into said cylinder chamber and compressing said air inside said cylinder chamber within each of said at least two cylinders, and (2) substantially transferring said air from said cylinder chamber into said air-reservoir means.

4. The method of claim 2 wherein the step of receiving air and fuel into said at least one primary cylinder, during operation in said two-stage gas-expansion mode, further includes the steps of:

(a) selectively connecting said at least one primary cylinder to said air-reservoir means, (b) receiving said air from said air-reservoir means into said cylinder chamber within said at least one primary cylinder during a first part of a first volume-increasing stroke, and (c) expanding said air in said cylinder chamber during a second part of said volume-increasing stroke, whereby work performed by air, during said first volume-increasing stroke, is added to work performed by combustion gas during a second volume-increasing stroke, whereby some of the vehicle braking energy, previously converted into energy of compressed air stored in said air-reservoir means, is recovered, and whereby said vehicle fuel consumption is reduced.

5. The method of claim 2 wherein said set of propulsion modes further comprises a first air-power-assisted mode, said first air-power-assisted mode including repeated performance of a four-stroke internal-combustion cycle in each of said at least two cylinders, said four-stroke internal-combustion cycle including the steps of:
  (a) selectively and alternatively connecting said at least two cylinders to said air-reservoir means and to atmosphere,
  (b) receiving air from said air-reservoir means into each of said at least two cylinders during a first part of a first volume-increasing stroke in each cylinder,
  (c) expanding said air inside said cylinder chamber within each of said at least two cylinders during a second part of said first volume-increasing stroke, and
  (d) using said air to complete said four-stroke internal-combustion cycle including expansion of combustion gas during a second volume-increasing stroke,
  whereby work performed by air during said first volume-increasing stroke is added to work performed by combustion gas during said second volume-increasing stroke,
  whereby said engine power can be increased, and
  whereby said vehicle fuel consumption is reduced.

6. The method of claim 2 wherein said set of propulsion modes further comprises a second air-power-assisted mode, said second air-power-assisted mode including repeated performance of a two-stroke air-motor cycle in said at least one primary cylinder, and repeated performance of a four-stroke internal-combustion cycle in said at least one secondary cylinder, said two-stroke air-motor cycle including the steps of:
  (a) selectively and alternatively connecting said at least one primary cylinder to said air-reservoir means and to said gas-transfer means,
  (b) receiving air from said air-reservoir means into said at least one primary cylinder during a first part of said volume increasing-stroke,
  (c) expanding said air in said cylinder chamber within said at least one primary cylinder during a second part of said volume-increasing stroke, and
  (d) expelling said air from said at least one primary cylinder into said gas-transfer means during said volume-decreasing stroke,
  and said four-stroke internal-combustion cycle including the steps of:
  (a) selectively and alternatively connecting said at least one secondary cylinder to said gas-transfer means and to atmosphere,
  (b) receiving air from said gas-transfer means into said at least one secondary cylinder during a first part of a first volume-increasing stroke,
  (c) performing a second expansion of said air inside said cylinder chamber within said at least one secondary cylinder during a second part of said first volume-increasing stroke, and
  (d) using said air to complete said four-stroke internal-combustion cycle including expansion of combustion gas during a second volume-increasing stroke,
  whereby work performed by air in said at least one secondary cylinder during said first volume-increasing stroke is added to work performed by combustion gas during said second volume-increasing stroke,
  whereby work performed by air in said at least one primary cylinder supplements work performed in said at least one secondary cylinder, and
  whereby said engine fuel consumption is reduced.

7. The method of claim 2 wherein said set of propulsion modes further comprises a first two-stroke internal-combustion mode including repeated performance of a two-stroke internal-combustion cycle in each of said at least two cylinders, said two-stroke internal-combustion cycle including the steps of:
  (a) selectively and alternatively connecting said at least two cylinders to said air-reservoir means and to atmosphere,
  (b) receiving air from said air-reservoir means into said at least two cylinders during a second part of a volume-decreasing stroke in each cylinder,
  (c) compressing said air inside said cylinder chamber within each of said at least two cylinders during a third part of said volume-decreasing stroke,
  (d) using said air to perform combustion and combustion-gas expansion inside said cylinder chamber within each of said at least two cylinders during a volume-increasing stroke, and
  (e) expelling exhaust gas from said cylinder chamber within each of said at least two cylinders during a first part of said volume-decreasing stroke.

8. The method of claim 2 wherein said set of propulsion modes further comprises a second two-stroke internal-combustion mode, said second two-stroke internal-combustion mode including repeated performance of a two-stroke air-motor cycle in
  (b) receiving air from said air-reservoir means into said at least one primary cylinder during a first part of said volume increasing-stroke,
  (c) expanding said air in said cylinder chamber within said at least one primary cylinder said at least one primary cylinder, and repeated performance of a two-stroke internal-combustion cycle in said at least one secondary cylinder, said two-stroke air-motor cycle including the steps of:
  (a) selectively and alternatively connecting said at least one primary cylinder to said air-reservoir means and to said gas-transfer means, during a second part of said volume-increasing stroke, and
  (d) expelling said air from said at least one primary cylinder into said gas-transfer means during said volume-decreasing stroke,
  and said two-stroke internal-combustion cycle including the steps of:
  (a) selectively and alternatively connecting said at least one secondary cylinder to said gas-transfer-means and to atmosphere,
  (b) receiving air from said gas-transfer means into said at least one secondary cylinder during a second part of a volume-decreasing stroke,
  (c) compressing said air inside said cylinder chamber within said at least one secondary cylinder during a third part of said volume-decreasing stroke,
  (d) using said air to perform combustion and combustion-gas expansion inside said cylinder chamber within said at least one secondary cylinder during a volume-increasing stroke, and
  (e) expelling exhaust gas from said cylinder chamber within said at least one secondary cylinder during a first part of said volume-decreasing stroke.

9. The method of claim 2 wherein said set of propulsion modes further comprises a conventional four-stroke internal-combustion mode including repeated performance of a four-stroke internal-combustion cycle in each of said at least two cylinders, said four-stroke internal-combustion cycle including the steps of selectively connecting said at least two cylinders to atmosphere, receiving air from atmosphere into said at least two cylinders, and using said air to perform a conventional four-stroke internal-combustion cycle.

10. The method of claim 2 wherein said set of propulsion modes further comprises a two-stage air-motor mode including repeated performance of a first stage of a two-stage air-motor cycle in said at least one primary cylinder, and repeated performance of a second stage of said two-stage air-motor cycle in said at least one secondary cylinder, said first stage of said two-stage air-motor cycle including the steps of:
- (a) selectively and alternatively connecting said at least one primary cylinder to said air-reservoir means and to said gas-transfer-means,
- (b) receiving air from said air-reservoir means into said at least one primary cylinder during a first part of a volume increasing-stroke,
- (c) expanding said air in said cylinder chamber within said at least one primary cylinder during a second part of said volume-increasing stroke, and
- (d) expelling said air from said at least one primary cylinder into said gas-transfer means during a volume-decreasing stroke, and said second stage of said two-stage air-motor cycle including the steps of:
- (a) selectively and alternatively connecting said at least one secondary cylinder to said gas-transfer-means and to outside atmosphere,
- (b) receiving air from said gas-transfer means into said at least one secondary cylinder during a first part of a volume-increasing stroke,
- (c) performing a second expansion of said air inside said cylinder chamber within said at least one secondary cylinder during a second part of said volume-increasing stroke, and
- (d) expelling said air from said at least one secondary cylinder during a volume-decreasing stroke.

11. The method of claim 2 wherein said set of propulsion modes further comprises a single-stage air-motor mode including repeated performance of a two-stroke air-motor cycle in each of said at least two cylinders, said two-stroke air-motor cycle including the steps of:
- (a) selectively and alternatively connecting said at least two cylinders to said air-reservoir means and to atmosphere,
- (b) receiving air from said air-reservoir means into said cylinder chamber in each of said at least two cylinders during a first part of a volume-increasing stroke in each cylinder,
- (c) expanding said air inside said cylinder chamber within each of said at least two cylinders during a second part of said volume-increasing stroke, and
- (d) expelling said air from said cylinder chamber within each of said at least two cylinders during a volume-decreasing stroke.

12. The method of claim 2 further comprising the steps of:
- (a) providing a heating jacket surrounding said air-reservoir means,
- (b) providing a gas flow control means for controlling flow of exhaust gas through said heating jacket,
- (c) providing a temperature sensor for measuring temperature of air inside said air-reservoir means,
- (d) providing said control means with information from said temperature sensor and with ability to cooperate with said gas flow control means to control said flow of exhaust gas through said heating jacket,
- (e) flowing exhaust gas through said heating jacket during operation of said engine, whereby escape of heat from the air in said air-reservoir means is substantially reduced, and
- (f) using said control means to control said flow of exhaust gas in a manner which assures that said temperature of air inside said air-reservoir means is maintained within a predetermined range.

13. The method of claim 1 wherein the step of receiving air and fuel into said at least one primary cylinder, during operation in said two-stage gas-expansion mode, further includes the steps of selectively connecting said at least one primary cylinder to outside atmosphere and receiving said air from outside atmosphere.

14. A method of operating a vehicle, said method comprising the steps of:
- (a) providing an engine mounted in said vehicle and coupled to at least one vehicle wheel for its propulsion and braking, said engine including:
  - (1) at least two cylinders and a cylinder chamber within each of said at least two cylinders, said at least two cylinders including at least one primary cylinder and at least one secondary cylinder,
  - (2) a head mounted to said at least two cylinders, and
  - (3) a piston in each of said at least two cylinders, with the piston to head and cylinder relationship being such that the volume of said cylinder chamber shrinks during a volume-decreasing stroke when said piston moves towards said head, and expands during a volume-increasing stroke, when said piston moves away from said head,
- (b) providing an air-reservoir means mounted in said vehicle for receiving, storage and discharge of compressed air,
- (c) providing a control means for controlling the operation of said engine and said vehicle in response to driver's demands and in accordance with a control program incorporated in said control means,
- (d) providing a gas exchange controlling means for selectively, variably, and alternatively connecting said at least two cylinders to outside atmosphere and to said air-reservoir means, in timed relation to said engine operation,
- (e) providing a cooling means for cooling said compressed air, said cooling means including a fluid conduit that is in contact with said compressed air, and a cooling fluid flowing through said fluid conduit,
- (f) providing a fluid flow control valve for controlling flow of cooling fluid through said fluid conduit,
- (g) providing a temperature sensor for measuring temperature of said compressed air,
- (h) providing said control means with information from said temperature sensor and with ability to cooperate with said fluid control valve to control said flow of cooling fluid through said fluid conduit,
- (i) using said control means to control said flow of cooling fluid in a manner which assures that said compressed air is cooled to within a predetermined range of temperature in accordance with a program contained in said control means, whereby the temperature of air and gas, during the engine cycle, can be controlled for best fuel economy and exhaust emission results,
- (j) operating said engine in a compression-braking mode in response to a demand for a vehicle braking force, when said vehicle is in motion, by operating said engine as a compressor driven by vehicle momentum, said compressor compressing air and pumping it into said air-reservoir means for storage therein, whereby said vehicle braking force is produced, whereby energy of the vehicle motion is transformed into energy of compressed air stored in said air-reservoir means, and whereby said energy of compressed air is available to assist in said vehicle propulsion at a later time, (k) using said cooling means for cooling said compressed air, whereby the heat content of said compressed air is substantially reduced, (l) responding to a demand for a vehicle propulsion force by operating said engine in a mode selected from a set of propulsion modes in accordance with said control program, said set of propulsion modes comprising an air-power-assisted mode wherein said engine receives cooled compressed air from said air-reservoir means and uses said cooled compressed air to repeatedly perform an internal-combustion cycle, and a conventional internal combustion mode wherein said engine receives air from outside atmosphere and uses said air to repeatedly perform an internal-combustion cycle, and (m) changing said engine operation from one propulsion mode to another one selected from said set of propulsion modes in accordance with said control program.

15. The method of claim 14 wherein said air-power-assisted mode includes a first air-power-assisted mode, said first air-power-assisted mode comprising the steps of:

(a) selectively and alternatively connecting said at least two cylinders to said air-reservoir means and to atmosphere, (b) receiving air from said air-reservoir means into said cylinder chamber during a first part of a first volume-increasing stroke, and mixing it with a remaining portion of combustion gas retained in said cylinder chamber after the end of the previous cycle, (c) expanding said air inside said cylinder chamber during a second part of said first volume-increasing stroke, whereby the heat content of said air is further reduced, and (d) using said air to complete said four-stroke internal-combustion cycle including the steps of:

(1) expansion of combustion gas during a second volume-increasing stroke, (2) expelling a portion of said combustion gas from said cylinder chamber into outside atmosphere during a first part of a second volume-decreasing stroke, and (3) retaining remaining portion of said combustion gas in said cylinder chamber during a second part of said second volume-decreasing stroke, whereby a substantial amount of combustion gas can be retained in said cylinder chamber for mixing with air in the next cycle without causing excessively high temperature of the mixture of air and combustion gas, whereby the peak temperature during combustion is reduced, and whereby harmful emission of nitrogen oxide is reduced.

16. The method of claim 14 further including the steps of:

(a) providing an air-transfer means for transferring air from said at least one primary cylinder into said at least one secondary cylinder, and (b) providing a gas exchange controlling means for selectively connecting said at least two cylinders to said gas-transfer means, and wherein said air-power-assisted mode further comprises a second air-power-assisted mode, said second air-power-assisted mode including repeated performance of a two-stroke air-motor cycle in said at least one primary cylinder, and repeated performance of a four-stroke internal-combustion cycle in said at least one secondary cylinder, said two-stroke air-motor cycle including the steps of:

(a) selectively and alternatively connecting said at least one primary cylinder to said air-reservoir means and to said air-transfer means, (b) receiving air from said air-reservoir means into said at least one primary cylinder during a first part of said volume-increasing stroke, (c) expanding said air in said cylinder chamber within said at least one primary cylinder during a second part of said volume-increasing stroke, whereby the heat content of said air is further reduced, and (d) transferring said air from said at least one primary cylinder into said gas-transfer means during said volume-decreasing stroke, and said four-stroke internal-combustion cycle including the steps of:

(a) selectively and alternatively connecting said at least one secondary cylinder to said gas-transfer means and to atmosphere, (b) receiving air from said gas-transfer means into said at least one secondary cylinder during a first part of a first volume-increasing stroke, and mixing it with a remaining portion of combustion gas retained in said cylinder chamber after the end of the previous cycle, (c) performing a second expansion of said air inside said cylinder chamber within said at least one secondary cylinder during a second part of said first volume-increasing stroke, whereby the heat content of said air is further reduced, and (d) using said air to complete said four-stroke internal-combustion cycle including the steps of:

(1) expansion of combustion gas during a second volume-increasing stroke, (2) expelling a portion of said combustion gas from said cylinder chamber into outside atmosphere during a first part of a second volume-decreasing stroke, and (3) retaining remaining portion of said combustion gas in said cylinder chamber during a second part of said second volume-decreasing stroke, whereby a substantial amount of combustion gas can be retained in said cylinder chamber for mixing with air in the next cycle without causing excessively high temperature of the mixture of air and combustion gas, whereby the peak temperature during combustion is reduced, and whereby harmful emission of nitrogen oxide is reduced.

* * * * *